(12) United States Patent
Sato

(10) Patent No.: US 10,198,178 B2
(45) Date of Patent: Feb. 5, 2019

(54) ELECTRONIC APPARATUS WITH SPLIT DISPLAY AREAS AND SPLIT DISPLAY METHOD

(71) Applicant: KYOCERA CORPORATION, Kyoto (JP)

(72) Inventor: Takayuki Sato, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 7 days.

(21) Appl. No.: 15/140,343

(22) Filed: Apr. 27, 2016

(65) Prior Publication Data

US 2016/0239203 A1   Aug. 18, 2016

Related U.S. Application Data

(63) Continuation of application No. PCT/JP2014/078555, filed on Oct. 28, 2014.

(30) Foreign Application Priority Data

Oct. 29, 2013   (JP) .................................. 2013-224504

(51) Int. Cl.
*G06F 3/0488* (2013.01)
*G06F 3/14* (2006.01)
(Continued)

(52) U.S. Cl.
CPC ........ *G06F 3/04886* (2013.01); *G06F 3/0481* (2013.01); *G06F 3/04817* (2013.01);
(Continued)

(58) Field of Classification Search
CPC ............. G06F 3/04817; G06F 3/04842; G06F 3/04883; G06F 3/04886
See application file for complete search history.

(56) References Cited

U.S. PATENT DOCUMENTS 7,705,833 B2   4/2010   Kim
2008/0158189 A1*   7/2008   Kim ..................... G06F 3/04886
345/173
(Continued)

FOREIGN PATENT DOCUMENTS

JP   H11-134159 A   5/1999
JP   2008-134348 A   6/2008
(Continued)

OTHER PUBLICATIONS

Nishiuehara, Hiroaki 'Word 2010 Zenkinou Bible', 'Bunsho Gamen o Jouge ni Bunkatsu suru', Nov. 25, 2010, 1st Edition, p. 078.
(Continued)

*Primary Examiner* — Chun-Nan Lin
(74) *Attorney, Agent, or Firm* — Duane Morris LLP

(57) ABSTRACT

An electronic apparatus, a non-transitory computer readable recording medium, and display method of an electronic apparatus are disclosed. In one embodiment, an electronic apparatus comprises a display that displays an image in a display area, an operation detector that detects an operation on the display area, and a controller that controls the display. The controller has a split display mode in which the controller splits a first display area included in the display area into a plurality of split areas and controls display contents of each of the plurality of split areas independently of one another. In the split display mode, the controller causes the display to display an operation target image with which a setting for each of the plurality of split areas is made.

18 Claims, 55 Drawing Sheets

(51) Int. Cl.
*G06F 3/0481* (2013.01)
*G06F 3/0484* (2013.01)
*G06T 3/40* (2006.01)
*H04M 1/02* (2006.01)
G09G 5/14 (2006.01)
G09G 5/34 (2006.01)

(52) U.S. Cl.
CPC ...... *G06F 3/04842* (2013.01); *G06F 3/04883* (2013.01); *G06F 3/1423* (2013.01); *G06T 3/40* (2013.01); *H04M 1/0202* (2013.01); *G06F 2203/04803* (2013.01); *G09G 5/14* (2013.01); *G09G 5/34* (2013.01); *G09G 2354/00* (2013.01)

(56) References Cited

U.S. PATENT DOCUMENTS

| | | | |
|---|---|---|---|
| 2012/0127201 A1* | 5/2012 | Kim | G09G 5/377 345/633 |
| 2012/0297339 A1 | 11/2012 | Ito | |
| 2013/0125045 A1* | 5/2013 | Sun | G06F 3/04883 715/788 |
| 2013/0147849 A1* | 6/2013 | Kwak | G09G 5/14 345/666 |
| 2013/0187861 A1* | 7/2013 | Lavallee | G06F 9/543 345/173 |
| 2013/0324192 A1* | 12/2013 | Lee | H04M 1/0266 455/557 |
| 2014/0075394 A1* | 3/2014 | Nawle | H04M 1/72519 715/863 |
| 2014/0098932 A1* | 4/2014 | Profio | A61B 6/032 378/19 |
| 2014/0164966 A1* | 6/2014 | Kim | G06F 3/04886 715/769 |
| 2014/0181724 A1* | 6/2014 | Kim | H04N 21/4316 715/775 |
| 2014/0229888 A1* | 8/2014 | Ko | G06F 3/04886 715/783 |
| 2014/0298268 A1* | 10/2014 | Kang | G06F 3/04847 715/841 |
| 2015/0109400 A1* | 4/2015 | Wang | G06F 3/0481 348/14.03 |

FOREIGN PATENT DOCUMENTS

| | | |
|---|---|---|
| JP | 2008-165735 | 7/2008 |
| JP | 2013-047945 A | 3/2013 |
| JP | 2013-171505 A | 9/2013 |

OTHER PUBLICATIONS

Official Action in Japanese Patent Application No. 2013-224504, dated Feb. 7, 2017, and English translation, in 4 pages.
'Sokushuu! Office 97 Katsuyo no Kimo', "Microsoft Excel 97 no Katsuyo", ASCII, Japan ASCII Co., Ltd., Apr. 1, 1997, vol. 21, Article 4, p. 409.
International Search Report in International Patent Application No. PCT/JP2014/078555, dated Jan. 13, 2015 in 2 pages.
'NTT docomo Next series Galaxy Note II SC-02E Toriatsukai Setsumeisho (AndroidTM 4.1 Muke)', [online], 1.2$^{nd}$ edition, NTT Docomo Inc., Oct. 2012, pp. 139-141. [retrieval date Dec. 18, 2014, Internet <URL: https://www.nttdocomo.co.jp/support/trouble/manual/download/sc02e/download.html>.
Written Opinion of the International Searching Authority in International Patent Application No. PCT/JP2014/078555 dated Jan. 13, 2015 and Statement of Relevance of Non-English references cited therein, in 8 pages.
'ASP V28~Systemwalker ListWORKS Sosa Tebikisho', '3.3.5 Chohyo o Bunkatsu shite Hyoji suru', 1$^{st}$ edition, Fujitsu Ltd., May 2013, p. 104-108.
'Excel Mania Shoshinisha no Tameno Excel Nyumon Koza', Window no Bunkatsu, [online], Apr. 8, 2013, [retrieval date Dec. 18, 2014, Internet <http://web.archive.org/web/20130408061007/http://excel.ara3.net/1/windowdiv.htm>.
Official Action in Japanese Patent Application No. 2013-224504, dated Nov. 8, 2016, and English translation, in 10 pages.
'Togo Un'yo Kanri System HOPSS3/AS Chohyo Bunsan Shutsuryoku User's Guide', 6$^{th}$ edition, Hitachi Ltd., Jan. 1998, p. 148-152.
'TruLux', [online], Oct. 11, 2013 [retrieval date Dec. 18, 2014, Internet <URL: http://web.archive.org/web/20131011115056/http://www.trulux.net/tab/tlx-tab7w.html> , in 6 pages.
Official Action dated Jan. 30, 2018 in corresponding Japanese Patent Application No. 2017-091767 with Statement of Relevance of Non-English References.
Official Action dated May 8, 2018 in corresponding Japanese Patent Application No. 2017-091767 with Statement of Relevance of Non-English References.

* cited by examiner

F I G . 4
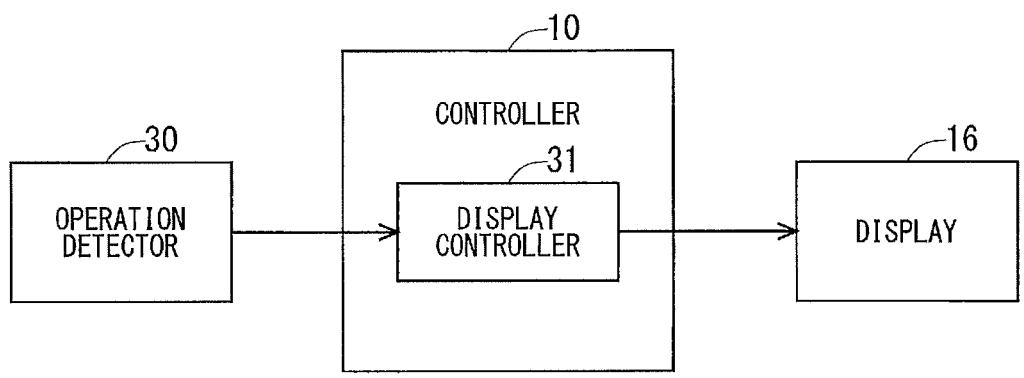
F I G . 5
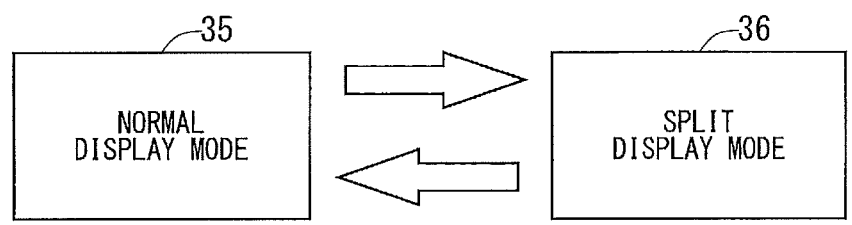

| | OPERATION ON OPERATION TARGET IMAGE | DETAILS OF PROCESSING |
|---|---|---|
| No. 1 | DRAG OPERATION | RESIZE SPLIT AREAS |
| No. 2 | TAP OPERATION | TRANSPOSE IMAGES DISPLAYED IN SPLIT AREAS |
| No. 3 | LONG TOUCH OPERATION | SWITCH TO SETTING MODE |

F I G . 1 3
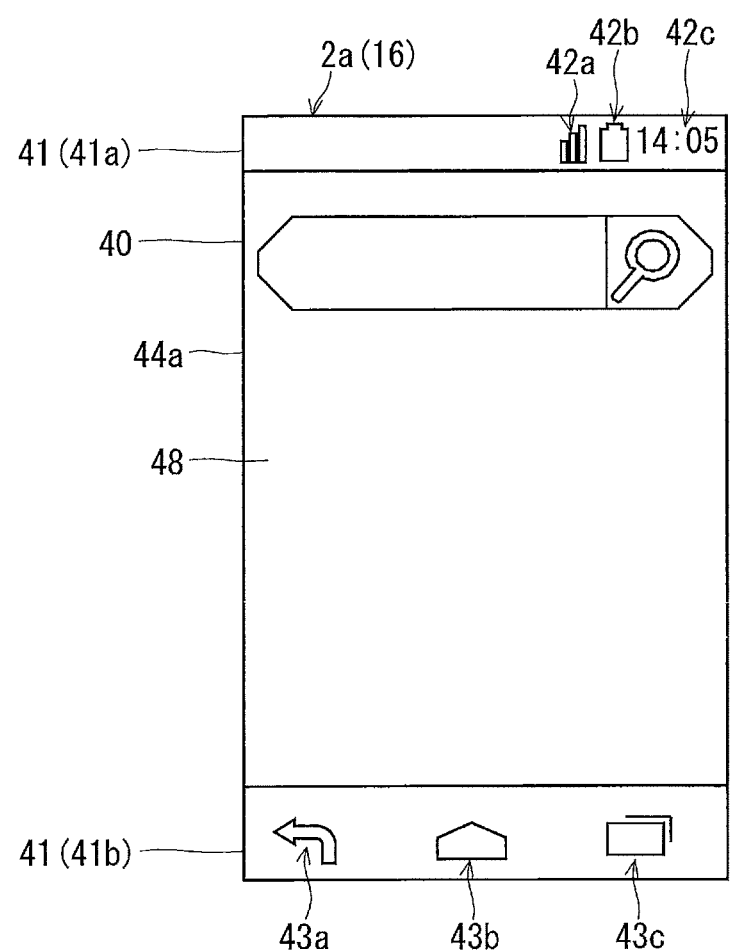

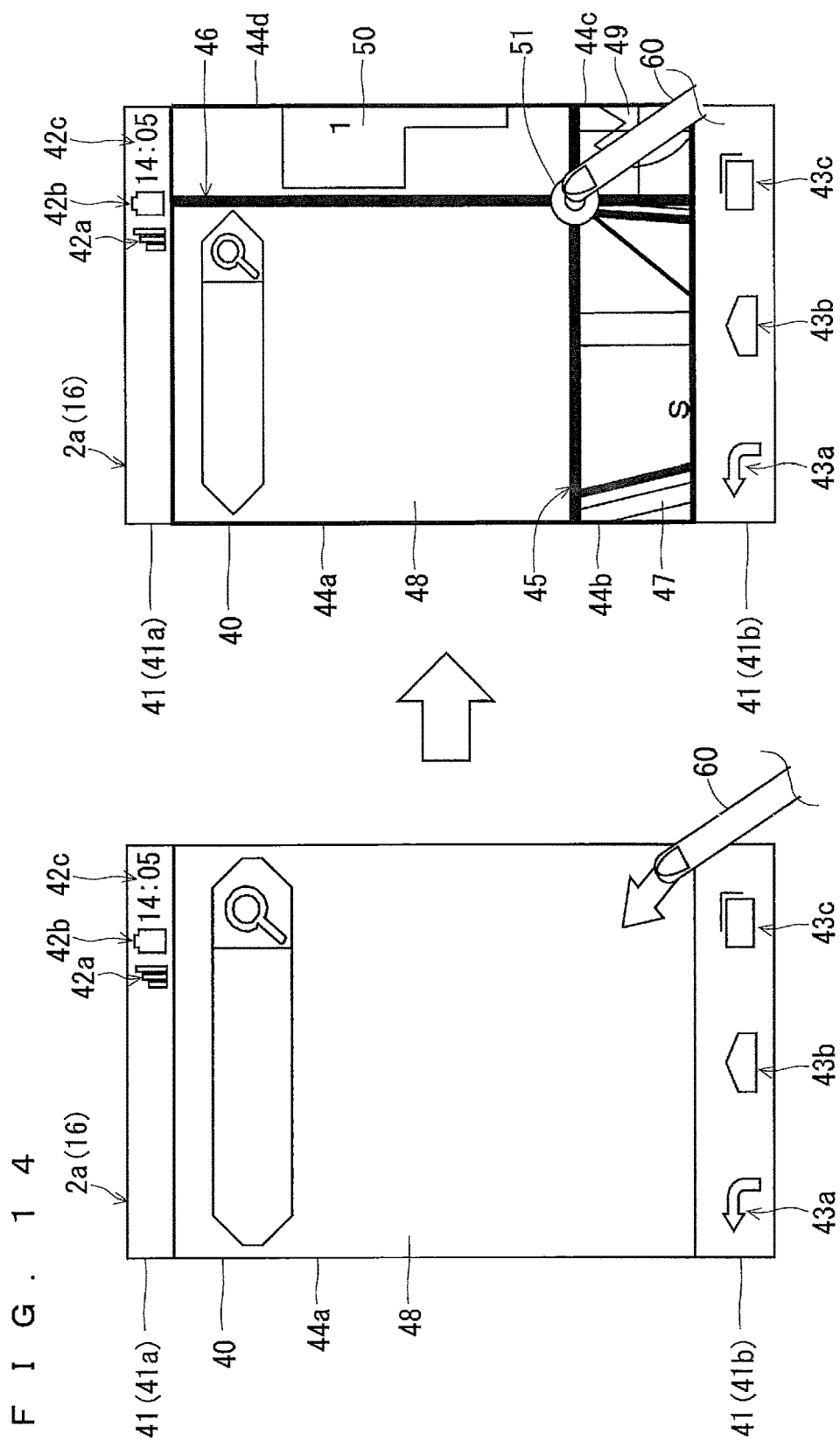

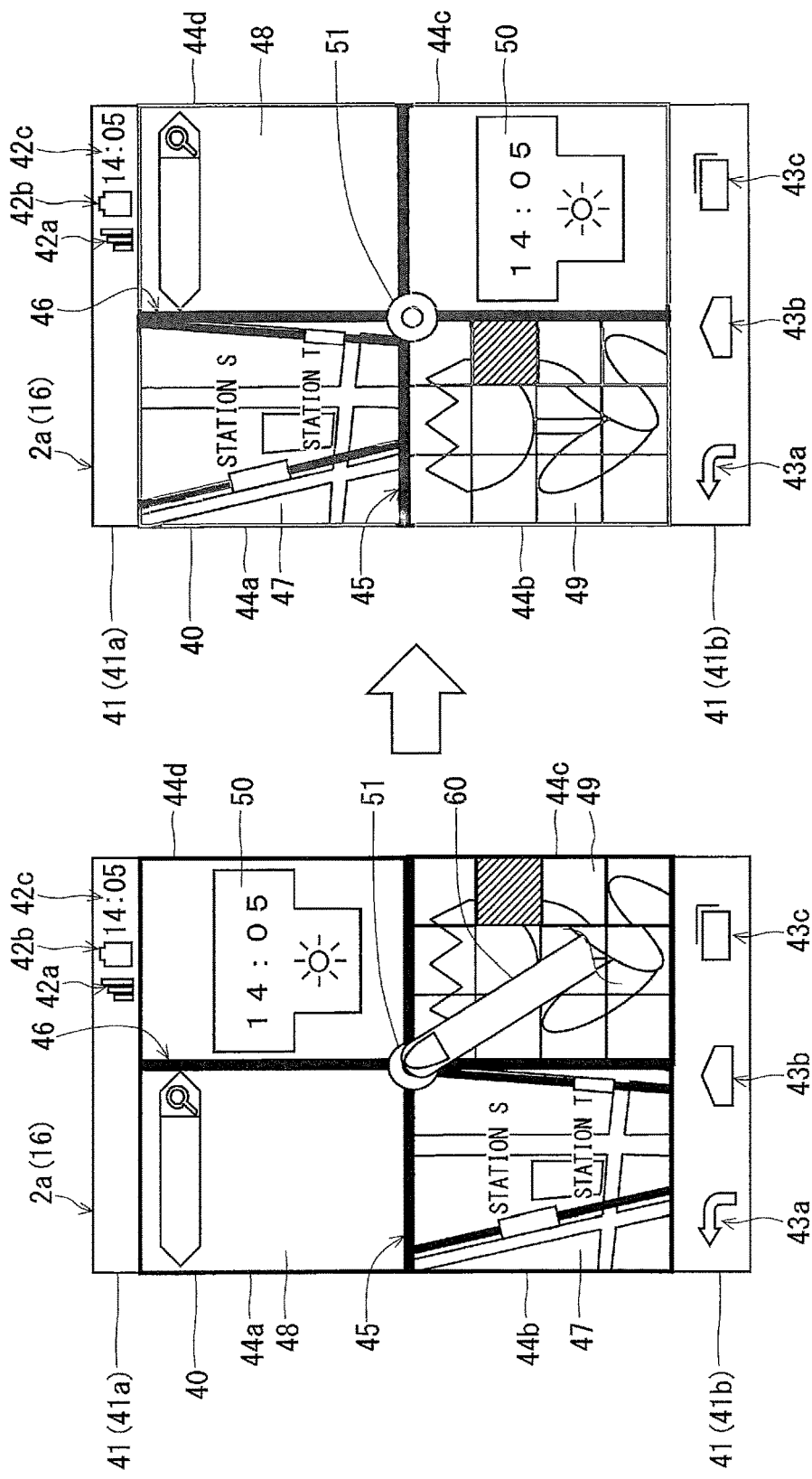

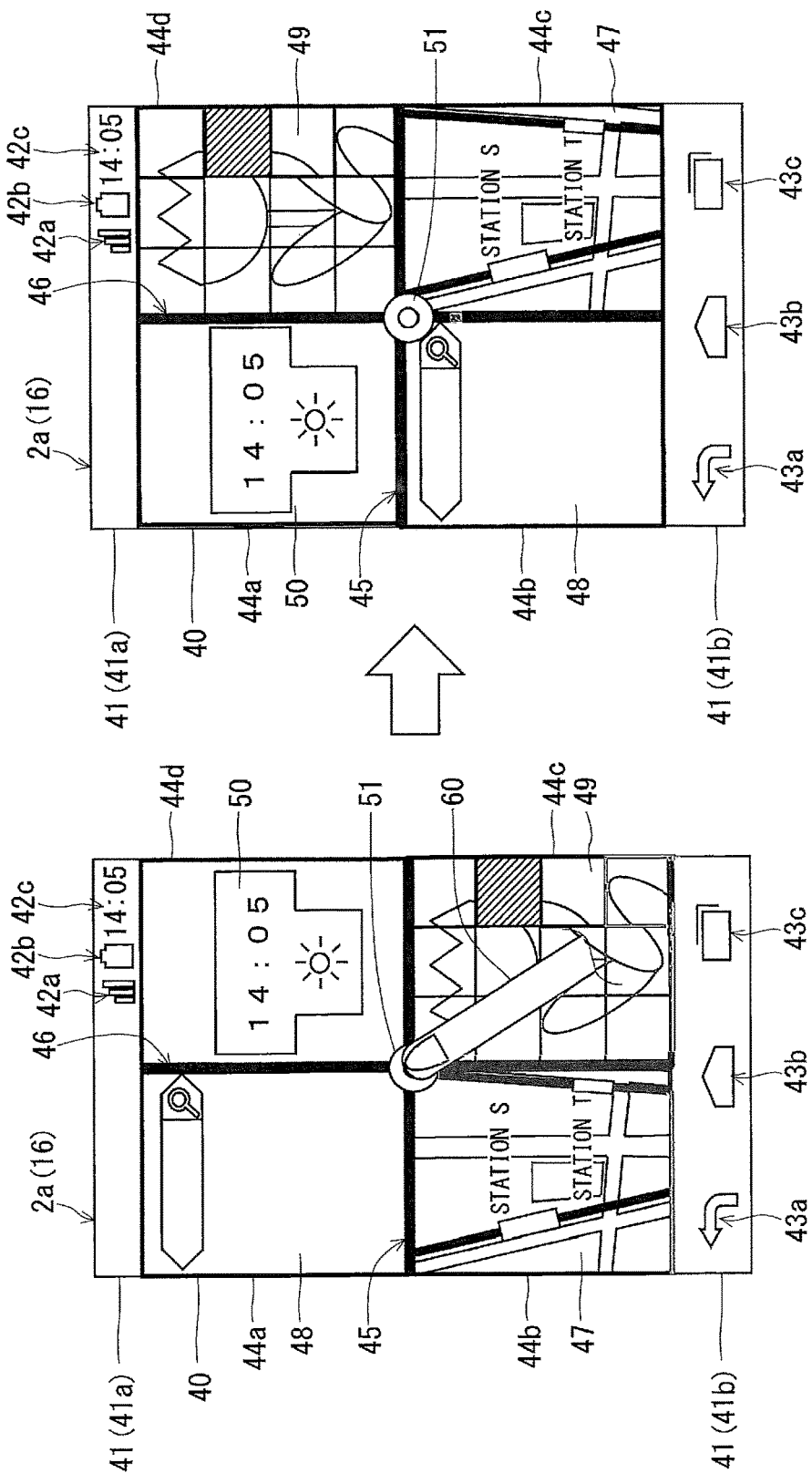

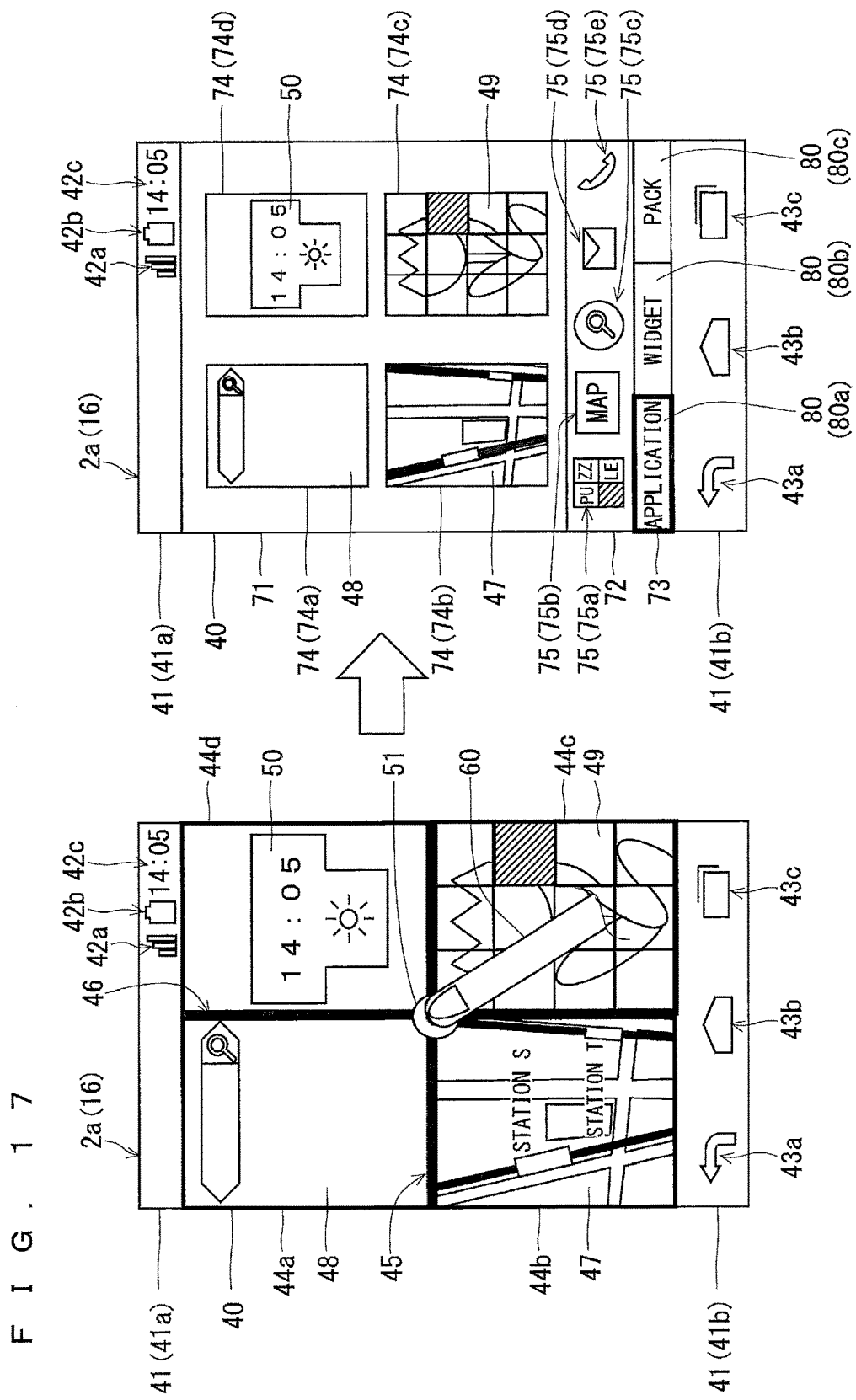

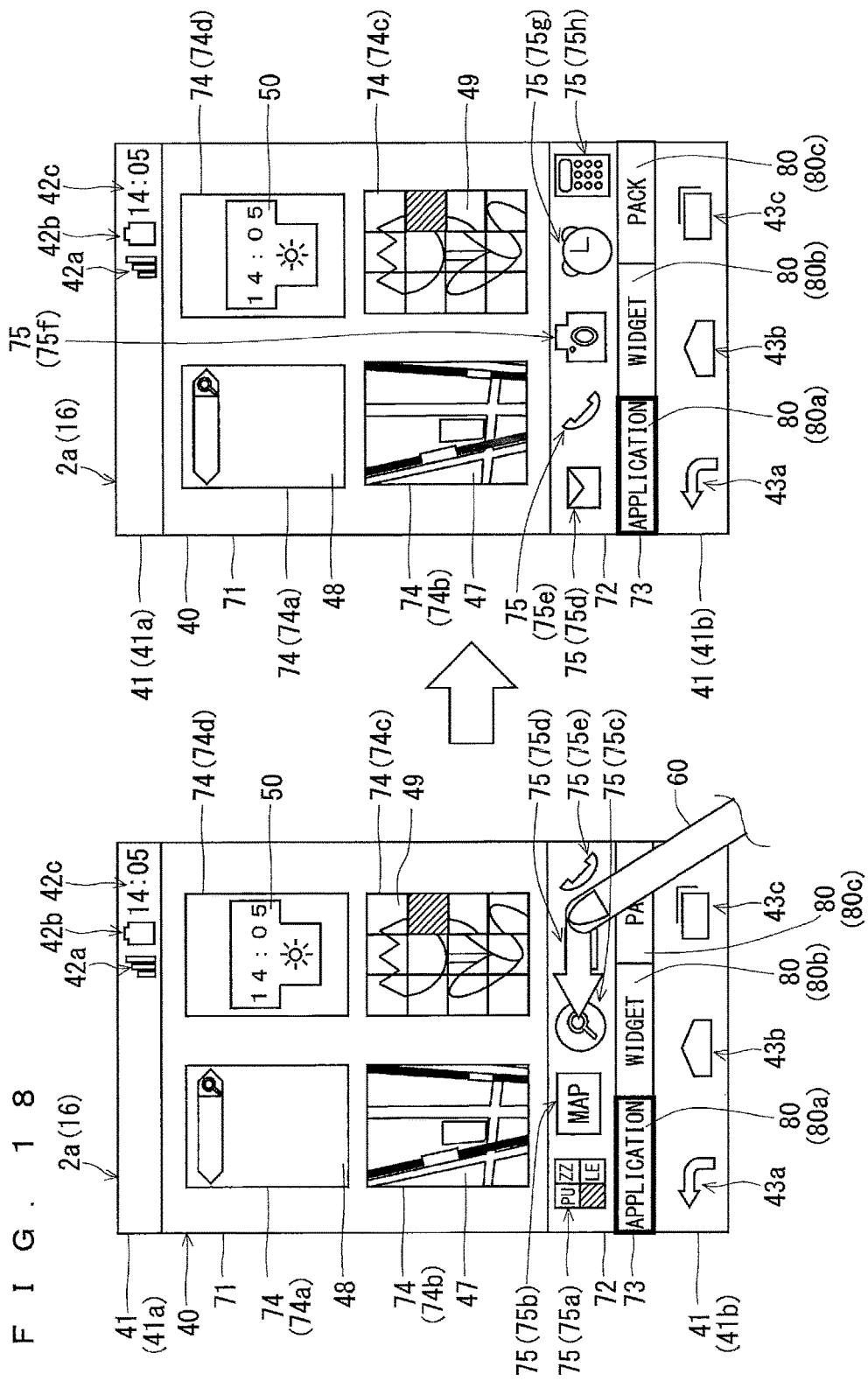

F I G . 1 9

|       | DETAILS OF PROCESSING |
|-------|------------------------|
| No. 1 | TRANSPOSE IMAGES DISPLAYED IN TWO INDIVIDUAL SPLIT AREAS |
| No. 2 | SET LOCK SCREEN |
| No. 3 | DETERMINE WHICH IMAGE IS TO BE DISPLAYED IN SPLIT AREA |

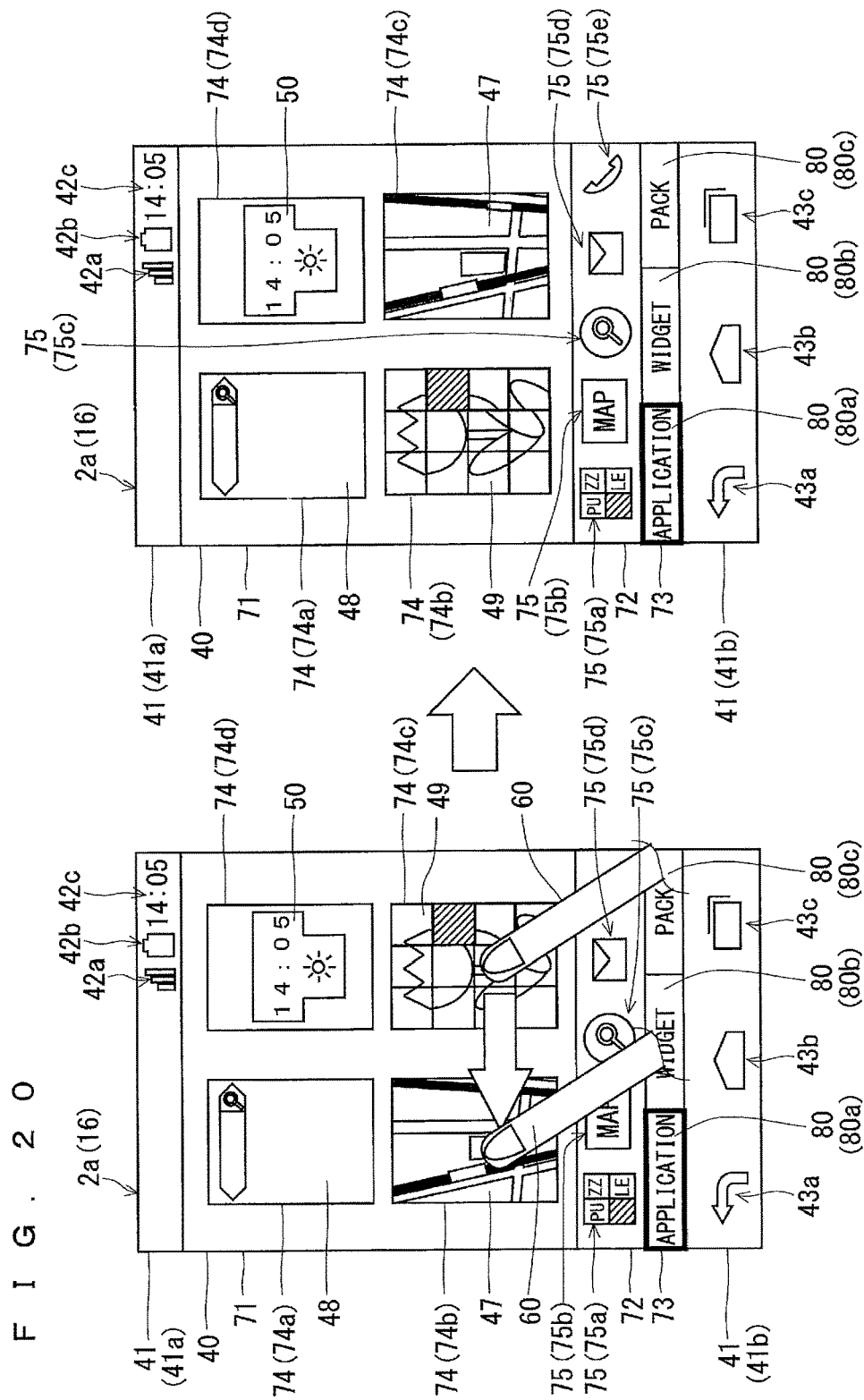

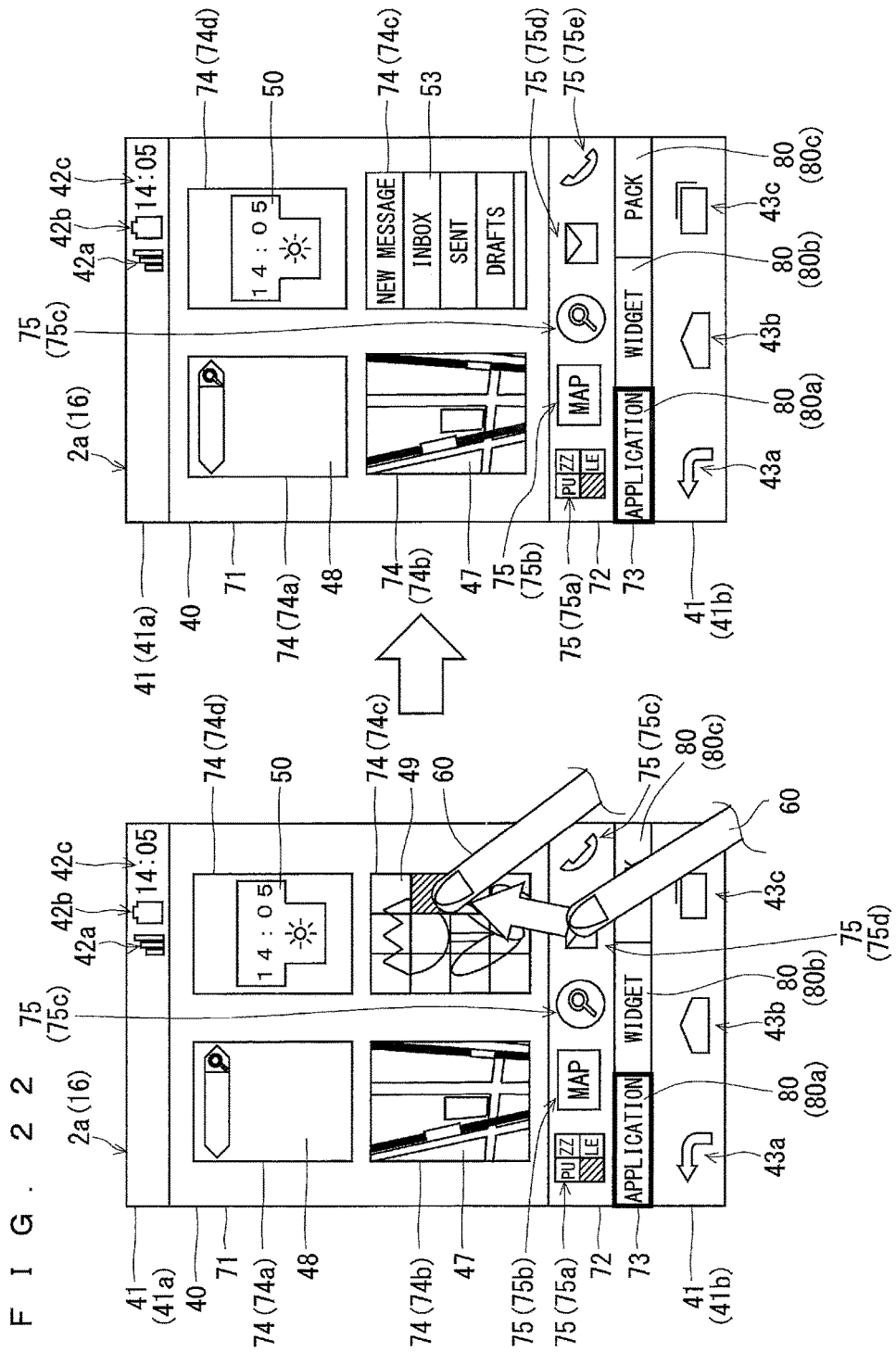

F I G. 2 3
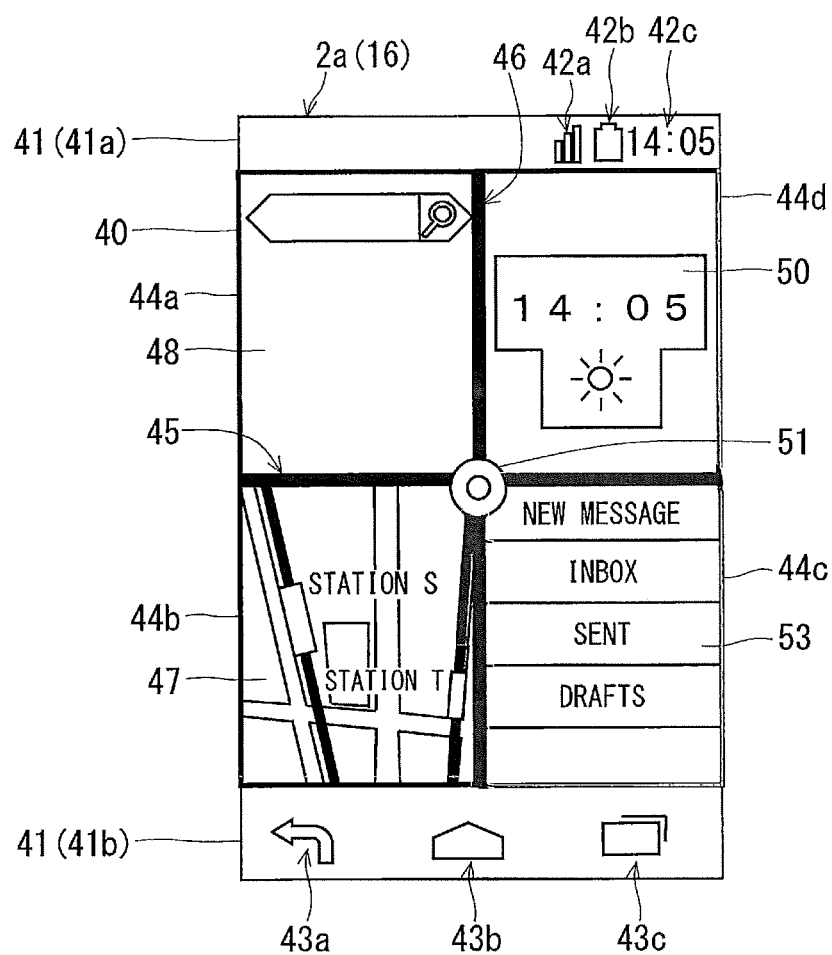

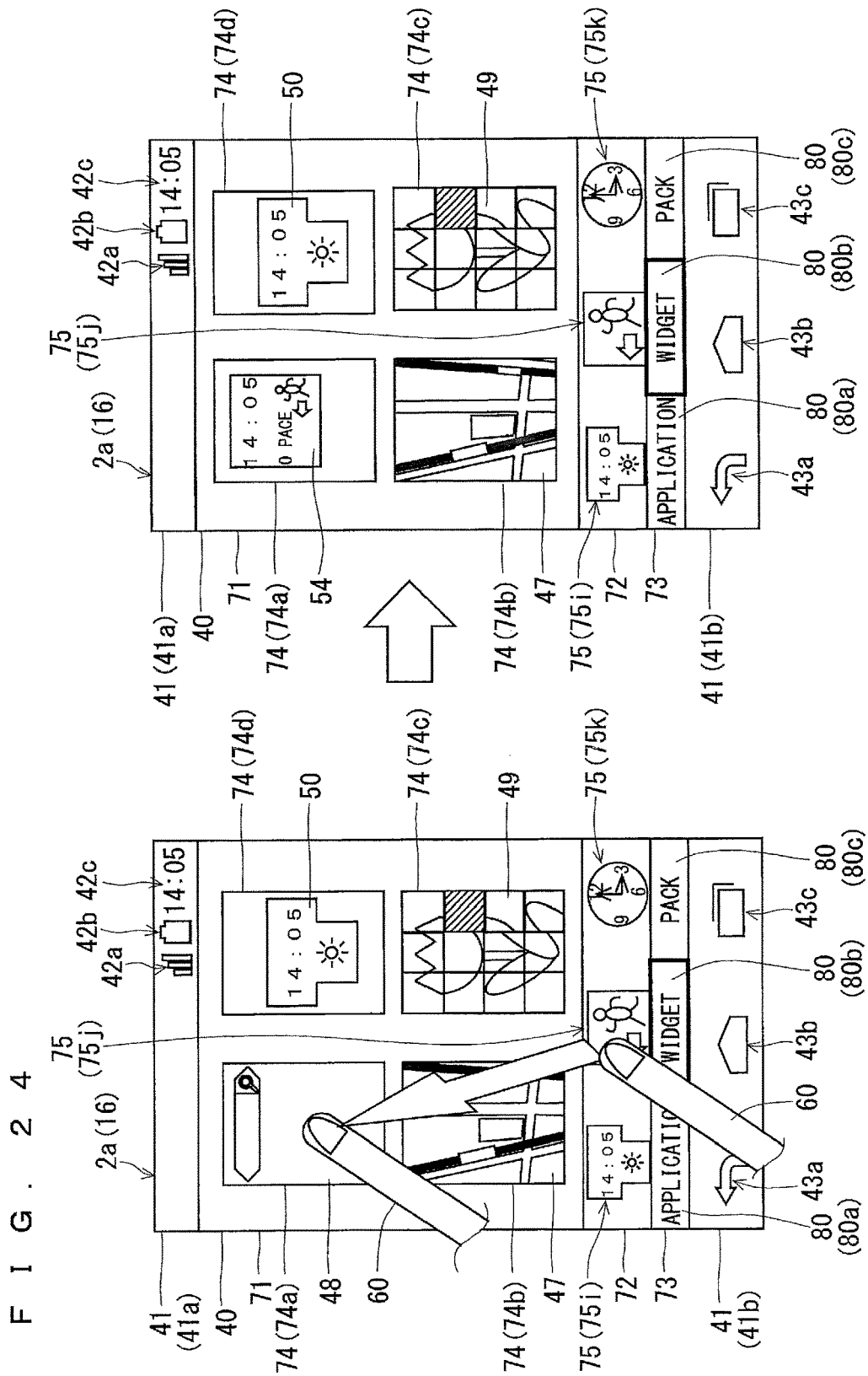

| | DETAILS OF PROCESSING |
|---|---|
| No. 1 | TRANSPOSE APPLICATION EXECUTION IMAGES |
| No. 2 | SET LOCK SCREEN |
| No. 3 | CAUSE APPLICATION EXECUTION IMAGE NOT TO BE DISPLAYED |

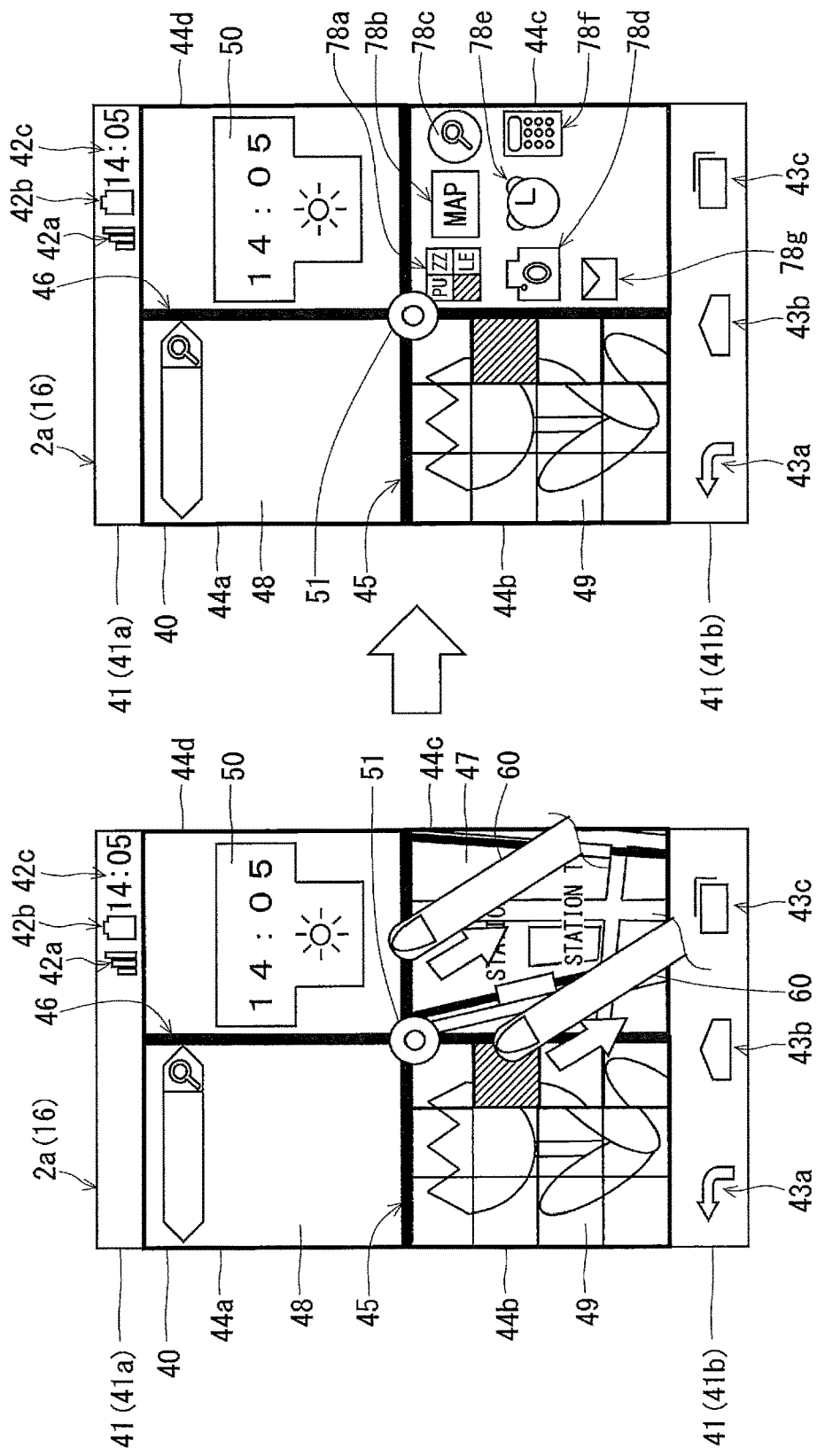

FIG. 34

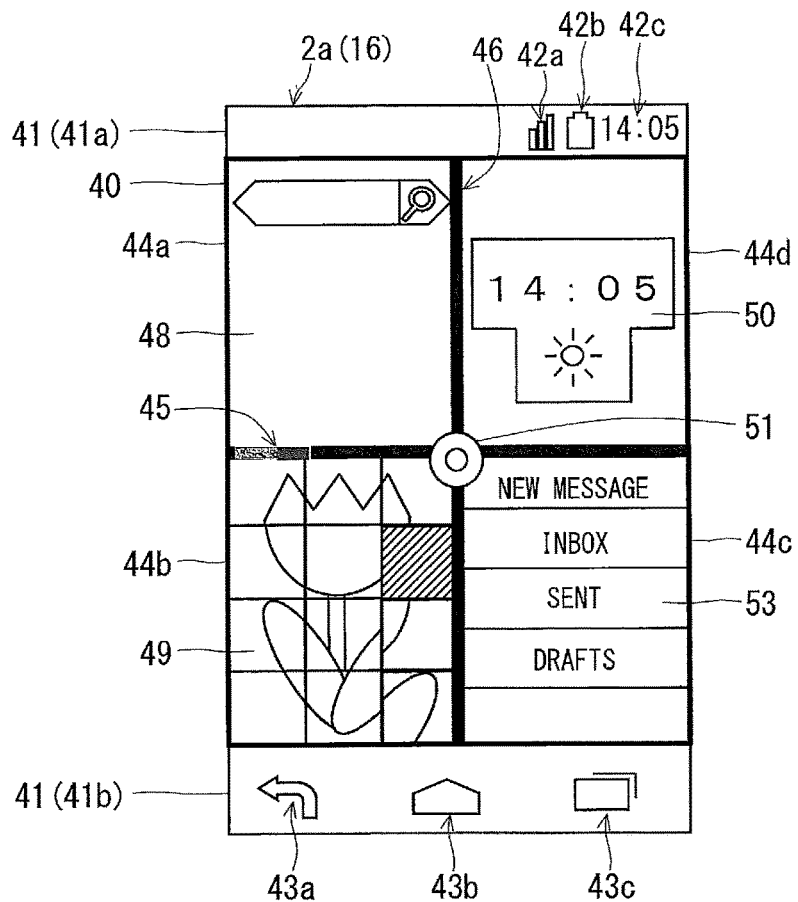

FIG. 35

| | NORMAL DISPLAY MODE (PRIOR TO SWITCHING TO SPLIT DISPLAY MODE) | SPLIT DISPLAY MODE |
|---|---|---|
| 1 | · IMAGE OTHER THAN APPLICATION EXECUTION IMAGES (EX: HOME IMAGE) | · APPLICATION EXECUTION IMAGE ASSOCIATED WITH RECENTLY EXECUTED APPLICATION |
| 2 | · APPLICATION EXECUTION IMAGE | · APPLICATION EXECUTION IMAGE DISPLAYED PRIOR TO SWITCHING TO SPLIT DISPLAY MODE + APPLICATION EXECUTION IMAGE ASSOCIATED WITH RECENTLY EXECUTED APPLICATION |

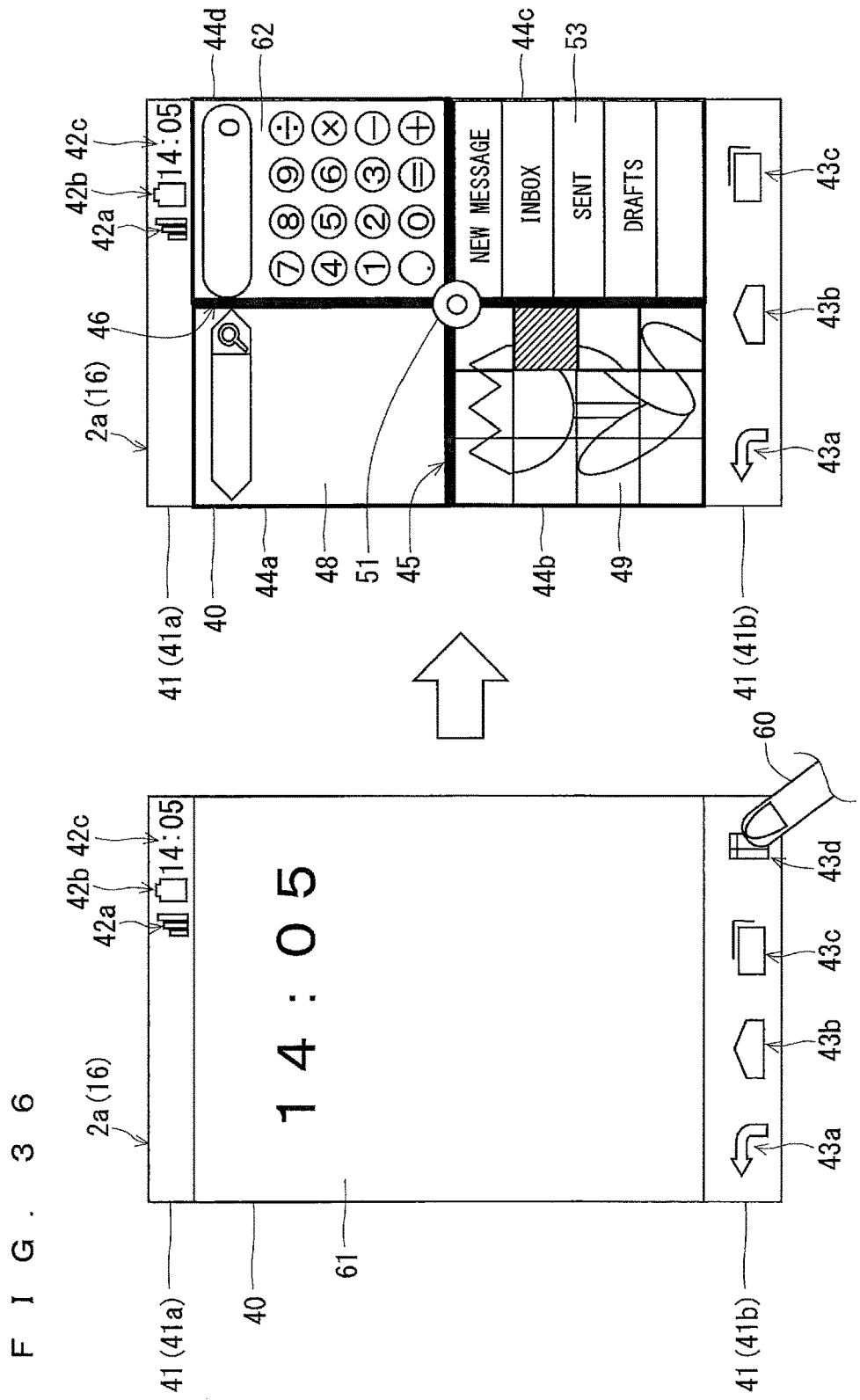

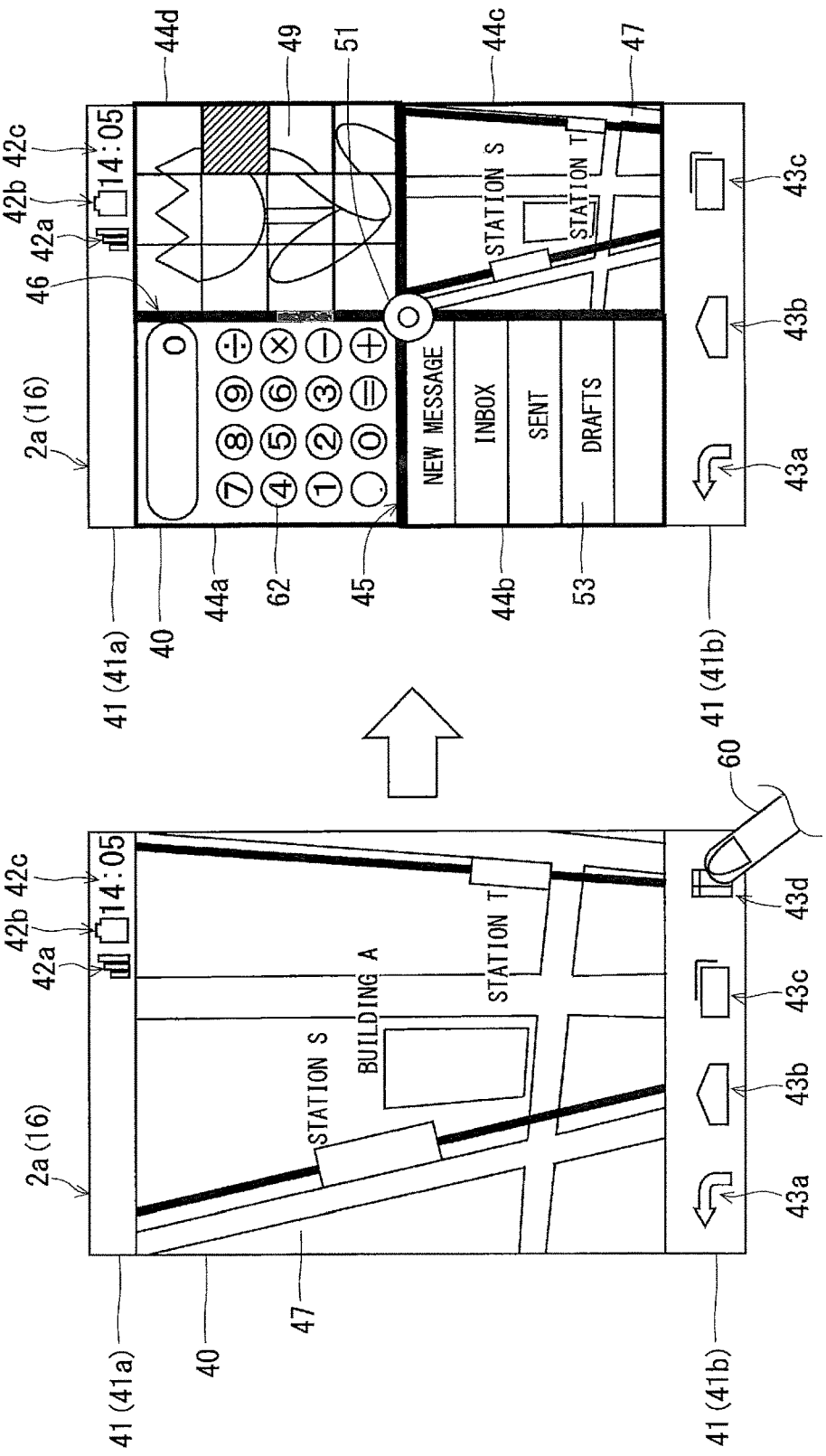

F I G . 4 4
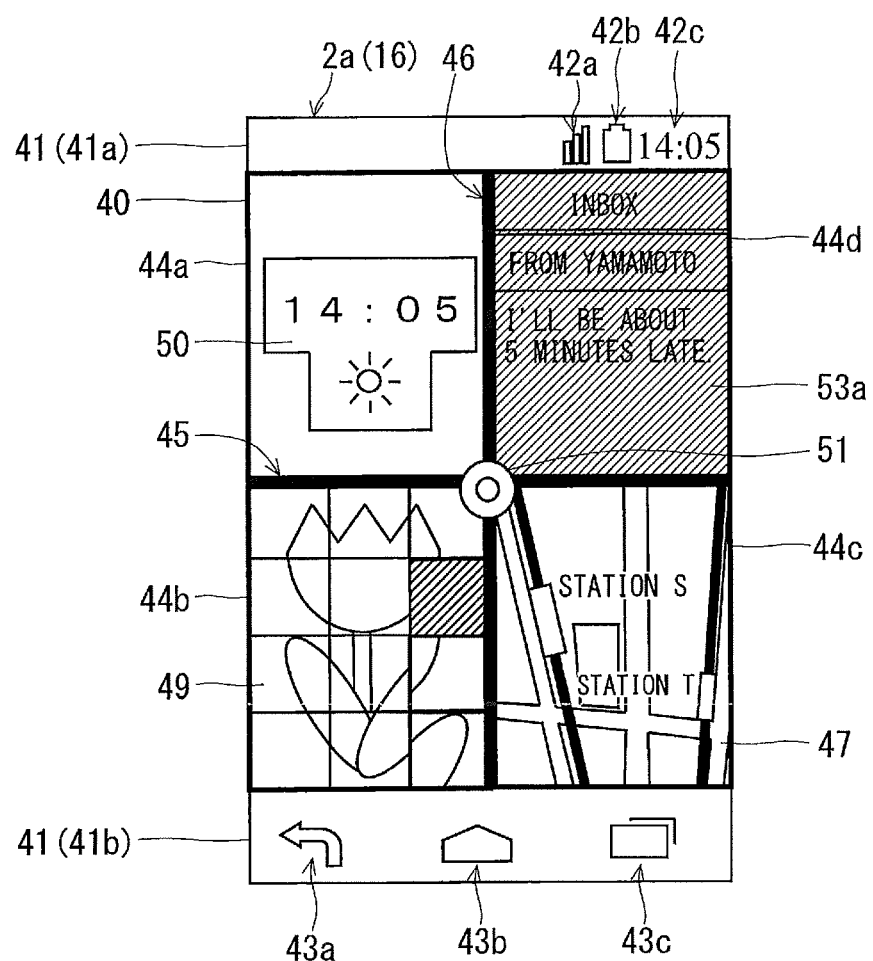

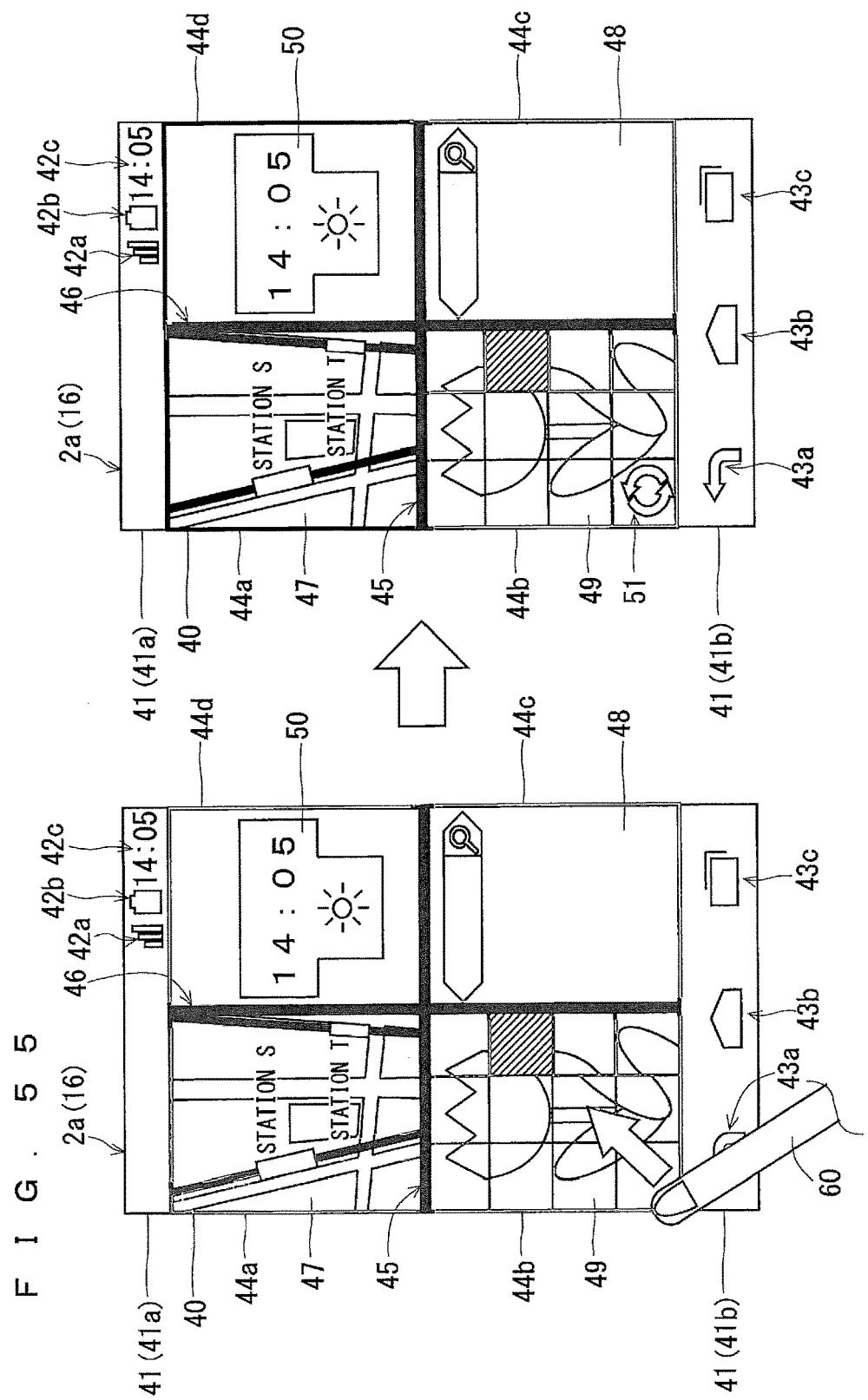

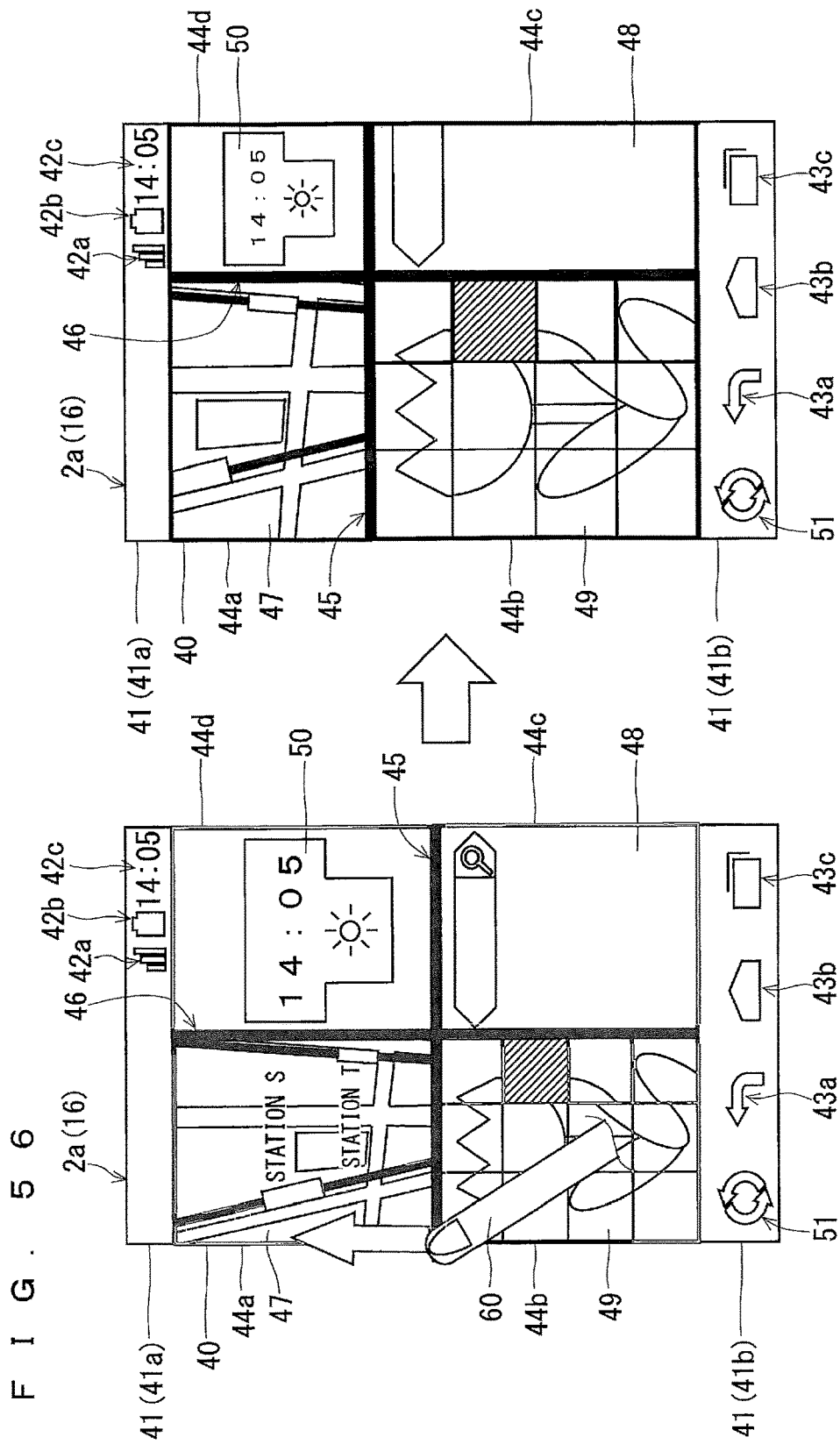

F I G. 5 7
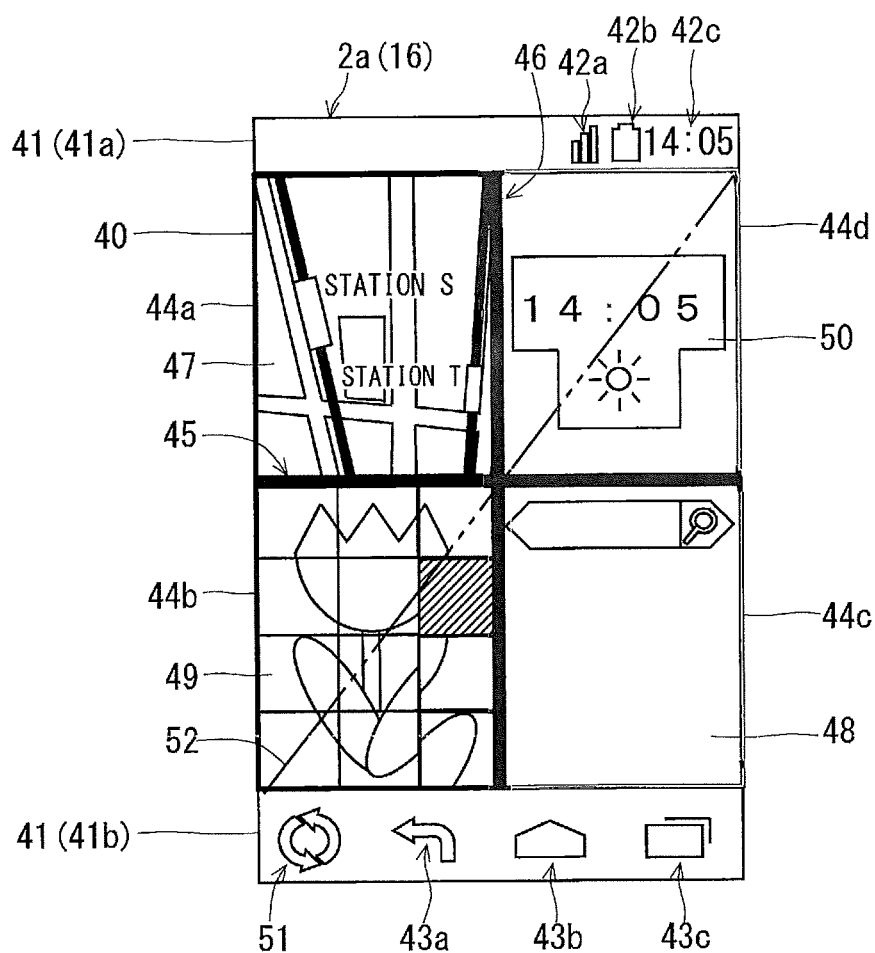

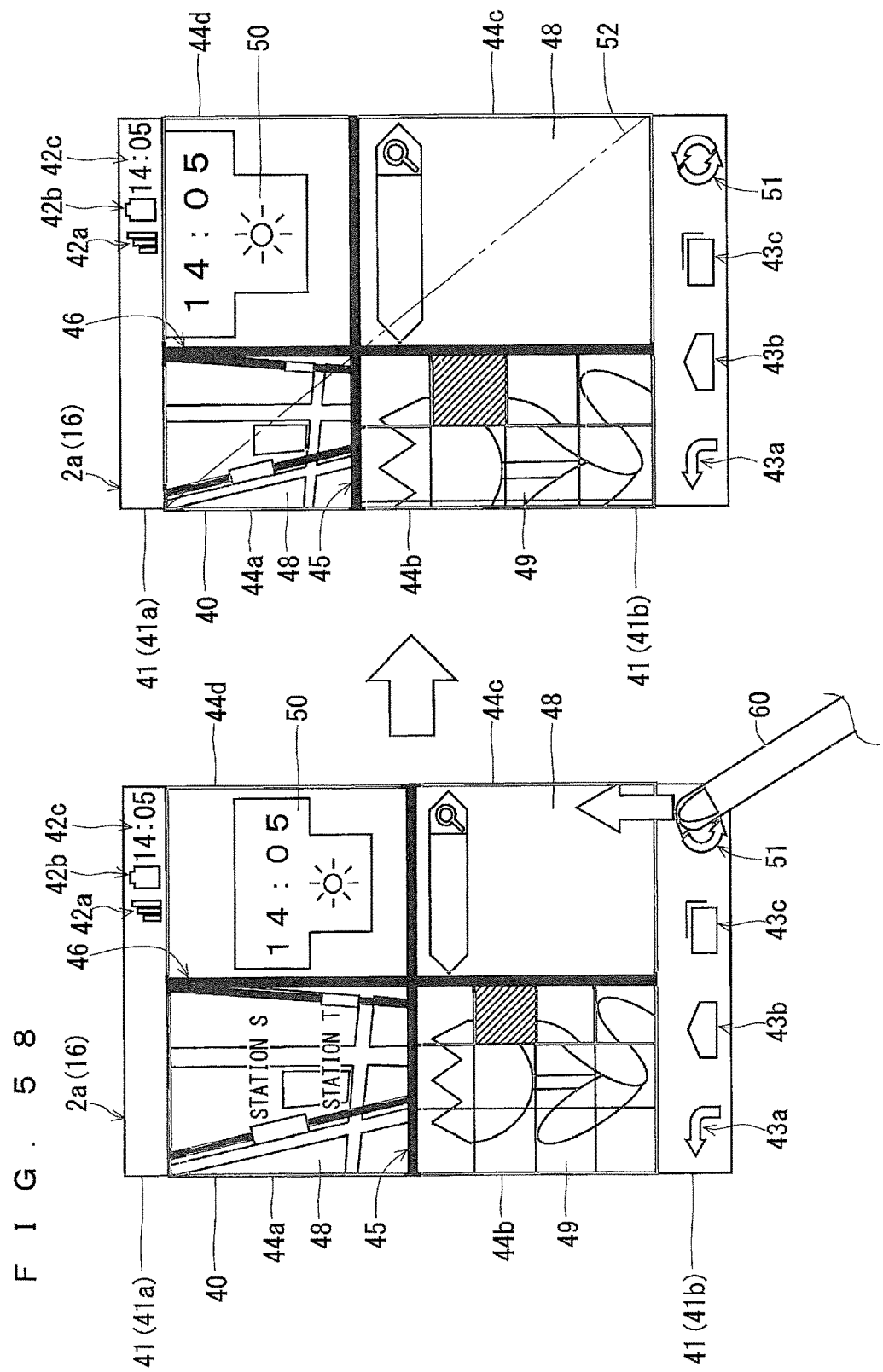

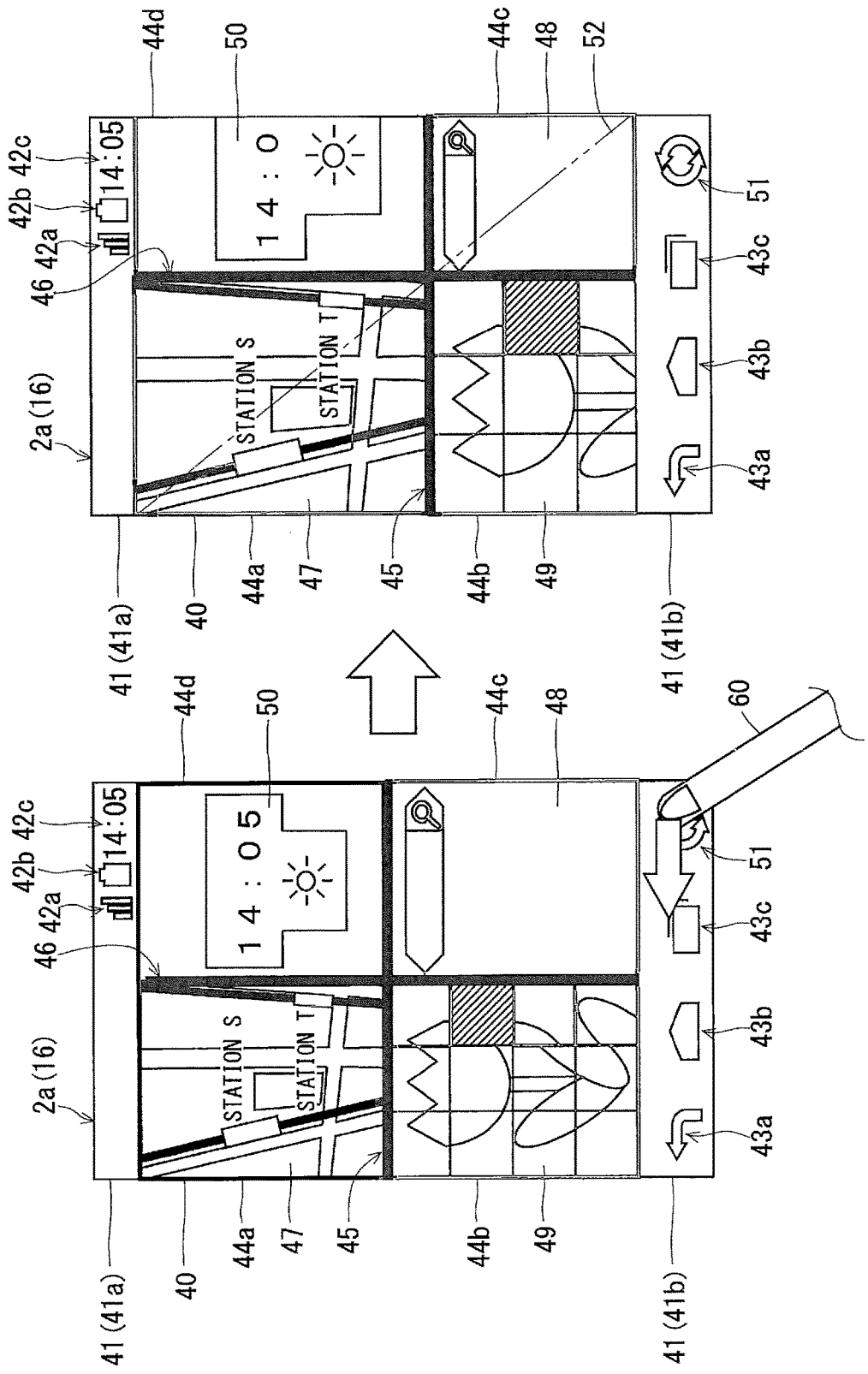

F I G . 6 1
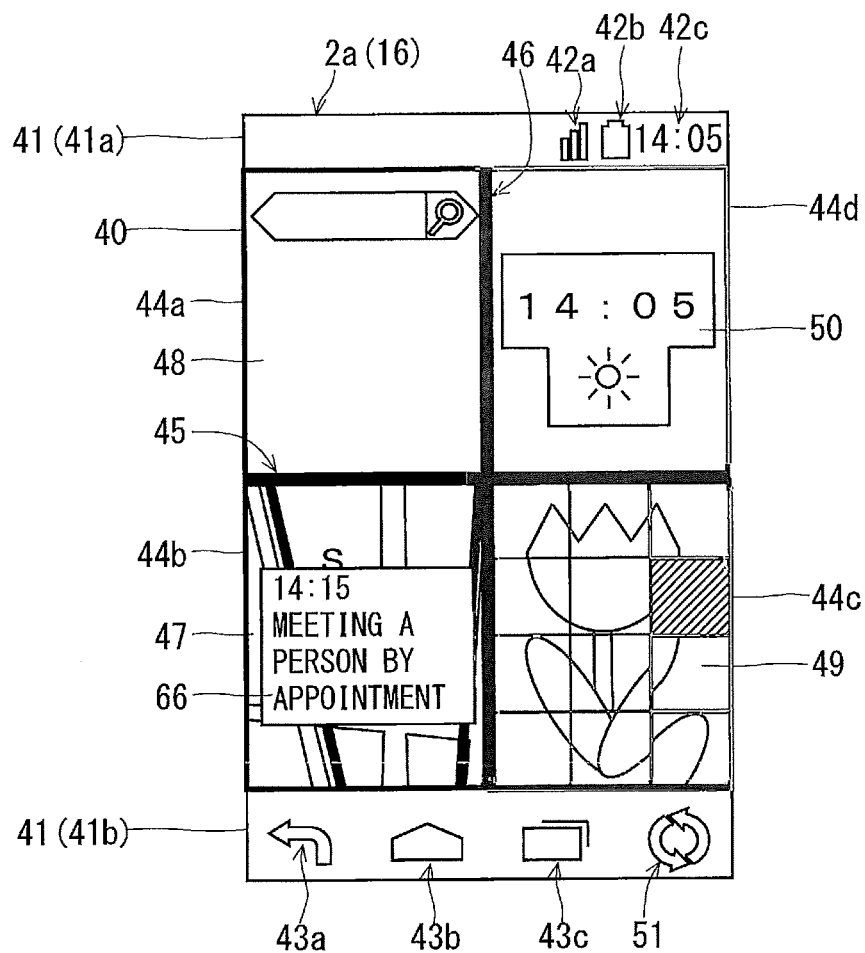

F I G . 6 2
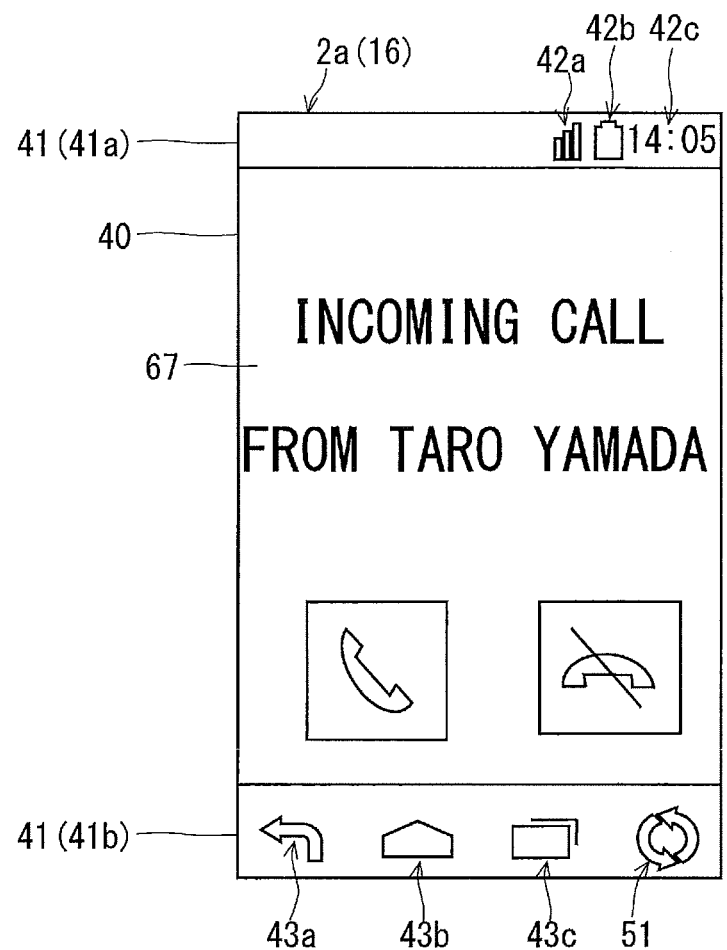

ELECTRONIC APPARATUS WITH SPLIT DISPLAY AREAS AND SPLIT DISPLAY METHOD

CROSS-REFERENCE TO RELATED APPLICATION

The present application is a continuation based on PCT Application No. PCT/JP2014/078555, filed on Oct. 28, 2014, which claims the benefit of Japanese Application No. 2013-224504, filed on Oct. 29, 2013. PCT Application No. PCT/JP2014/078555 is entitled "ELECTRONIC DEVICE, CONTROL PROGRAM, AND METHOD FOR OPERATING ELECTRONIC DEVICE," and Japanese Application No. 2013-224504 is entitled "ELECTRONIC APPARATUS, CONTROL PROGRAM, AND METHOD FOR OPERATING ELECTRONIC APPARATUS." The contents of which are incorporated by reference herein in their entirety.

FIELD

Embodiments of the present disclosure relate to electronic apparatuses.

BACKGROUND

Various techniques concerning electronic apparatuses have been proposed.

SUMMARY

An electronic apparatus and a display method of an electronic apparatus are disclosed. In one embodiment, an electronic apparatus comprises a display that displays an image in a display area, an operation detector that detects an operation on the display area, and a controller that controls the display. The controller has a split display mode in which the controller splits a first display area included in the display area into a plurality of split areas and controls display contents of each of the plurality of split areas independently of one another. In the split display mode, the controller causes the display to display an operation target image with which a setting for each of the plurality of split areas is made.

In one embodiment, a display method of an electronic apparatus including a display area comprising: splitting at least a part of the display area into a plurality of split areas; controlling display contents of each of the plurality of split areas independently of one another; displaying, in the display area, an operation target image with which a setting for each of the plurality of split areas is made; and detecting an operation on the display area.

BRIEF DESCRIPTION OF THE DRAWINGS

FIG. 4 illustrates a functional configuration of the electronic apparatus according to one embodiment.

FIG. 5 illustrates an overview of processing performed by the electronic apparatus according to one embodiment.

FIG. 13 illustrates exemplary display contents of the electronic apparatus according to one embodiment.

FIG. 14 illustrates exemplary display contents of the electronic apparatus according to one embodiment.

FIG. 15 illustrates exemplary display contents of the electronic apparatus according to one embodiment.

FIG. 16 illustrates exemplary display contents of the electronic apparatus according to one embodiment.

FIG. 17 illustrates exemplary display contents of the electronic apparatus according to one embodiment.

FIG. 18 illustrates exemplary display contents of the electronic apparatus according to one embodiment.

FIG. 19 illustrates a setting mode.

FIG. 20 illustrates exemplary display contents of the electronic apparatus according to one embodiment.

FIG. 22 illustrates exemplary display contents of the electronic apparatus according to one embodiment.

FIG. 23 illustrates exemplary display contents of the electronic apparatus according to one embodiment.

FIG. 24 illustrates exemplary display contents of the electronic apparatus according to one embodiment.

FIG. 33 illustrates exemplary display contents of the electronic apparatus according to one embodiment.

FIG. 34 illustrates exemplary display contents of the electronic apparatus according to one embodiment.

FIG. 35 illustrates switching from a normal display mode to a split display mode.

FIG. 36 illustrates exemplary display contents of the electronic apparatus according to one embodiment.

FIG. 37 illustrates exemplary display contents of the electronic apparatus according to one embodiment.

FIG. 44 illustrates exemplary display contents of the electronic apparatus according to one embodiment.

FIG. 55 illustrates exemplary display contents of the electronic apparatus according to one embodiment.

FIG. 56 illustrates exemplary display contents of the electronic apparatus according to one embodiment.

FIG. 57 illustrates exemplary display contents of the electronic apparatus according to one embodiment.

FIG. 58 illustrates exemplary display contents of the electronic apparatus according to one embodiment.

FIG. 59 illustrates exemplary display contents of the electronic apparatus according to one embodiment.

FIG. 61 illustrates exemplary display contents of the electronic apparatus according to one embodiment.

FIG. 62 illustrates exemplary display contents of the electronic apparatus according to one embodiment.

DETAILED DESCRIPTION

<<First Embodiment>>

21 <External Appearance of Electronic Apparatus>>

Figure 1:
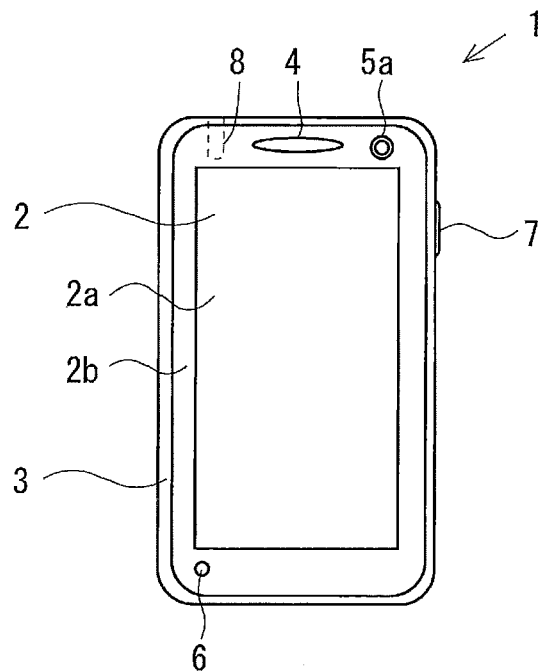
FIG. 1 illustrates a front view showing an external appearance of an electronic apparatus according to one embodiment.
Figure 2:
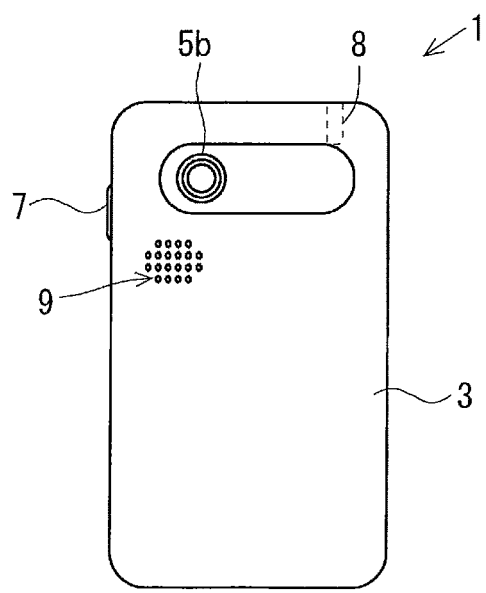
FIG. 2 illustrates a rear view showing the external appearance of the electronic apparatus according to one embodiment.

FIGS. 1 and 2 respectively illustrate a front view and a rear view showing an external appearance of an electronic apparatus 1. The electronic apparatus 1 is a mobile phone, such as a smartphone. The electronic apparatus 1 can communicate with another communication apparatus via a base station, a server, and the like. As illustrated in FIGS. 1 and 2, the electronic apparatus 1 may have an approximately rectangular plate shape in a plan view, and may include a cover panel 2 and a case part 3.

As illustrated in FIG. 1, the cover panel 2 includes a display area 2a and a peripheral area 2b. The cover panel 2 is made of, for example, a transparent glass or a transparent acrylic resin. Provided on the rear surface side of the cover panel 2 are a display device 17 and a touch panel 18.

A variety of information displayed by the display device 17, such as characters, signs, graphics, and video images, can be viewed by the user through the display area 2a of the cover panel 2. The peripheral area 2b of the cover panel 2 surrounding the display area 2a is opaque and/or not transparent because of, for example, a film or the like attached thereto. Thus, the display contents of the display device 17 in the peripheral area 2b are not viewed by the user. In one embodiment, the display area 2a of the cover panel 2 and the display device 17 are collectively referred to as a "display 16." Information displayed on the display 16 is viewed from the outside of the electronic apparatus. The touch panel 18 can receive operations performed on the display area 2a with an operator, such as a finger.

Provided in the upper edge portion of the cover panel 2 are a receiver hole 4 and a front image capture unit 5a. Provided in the lower edge portion of the cover panel 2 is a microphone hole 6. Provide in a side surface of the electronic apparatus 1 are a side key 7 and an earphone terminal 8. The side key 7 is an operation key to activate the electronic apparatus 1. This means that the side key 7 is an operation key to turn on or off the power of the electronic apparatus 1. As illustrated in FIG. 2, provided in the rear surface of the electronic apparatus 1 are a rear image capture unit 5b and speaker holes 9.

<<Electrical Configuration of Electronic Apparatus>>

Figure 3:
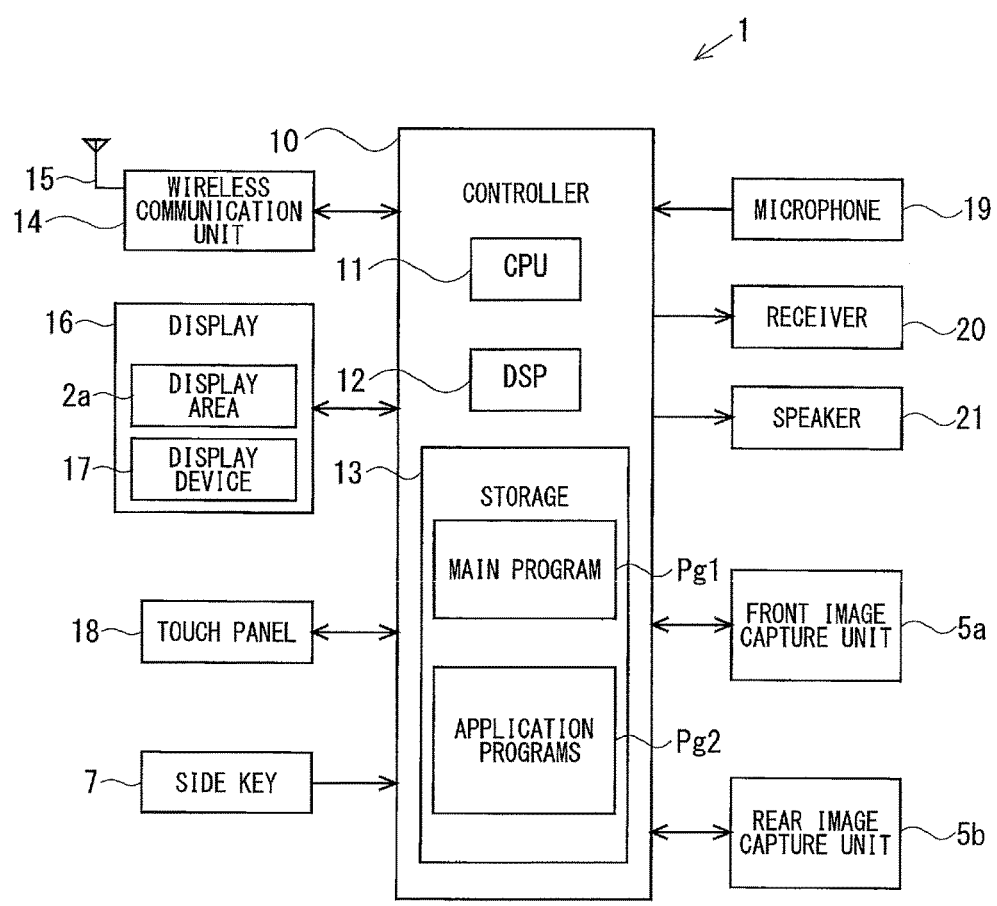
FIG. 3 illustrates a block diagram showing an electrical configuration of the electronic apparatus according to one embodiment.

FIG. 3 illustrates a block diagram showing an electrical configuration of the electronic apparatus 1. As illustrated in FIG. 3, the electronic apparatus 1 includes a controller 10, a wireless communication unit 14, the display 16, the touch panel 18, the side key 7, a microphone 19, a receiver 20, a speaker 21, the front image capture unit 5a, and the rear image capture unit 5b.

The controller 10 includes a central processing unit (CPU) 11, a digital signal processor (DSP) 12, and a storage 13. The controller 10 can manage the overall action of the electronic apparatus 1 by controlling other constituent components of the electronic apparatus 1.

The storage 13 is a recording medium which is non-transitory and readable by the electronic apparatus 1 (the CPU 11 and the DSP 12), such as a read only memory (ROM) and a random access memory (RAM). The storage 13 may include non-transitory computer readable recording media other than ROMs and RAMs. For example, the storage 13 may include a hard disk drive, a solid state drive (SSD), a Universal Serial Bus (USB), and a memory.

The storage 13 can store a main program Pg1, a plurality of application programs (hereinafter simply referred to as "applications Pg2"), and the like. The main program Pg1 is a control program for controlling the action of the electronic apparatus 1, specifically, the individual constituent components such as the wireless communication unit 14 and the display 16 of the electronic apparatus 1. The main program Pg1 and the applications Pg2 can be read by the CPU 11 and the DSP 12, which are processors included in the electronic apparatus 1. Various functions of the electronic apparatus 1 can be enabled by the CPU 11 and the DSP 12 executing the main program Pg1.

Although the electronic apparatus 1 includes a single CPU 11 and a single DSP 12 in one embodiment, the electronic apparatus 1 may include a plurality of CPUs 11 and a plurality of DSPs 12. This means that the electronic apparatus 1 may include at least one CPU 11 and at least one DSP 12. The various functions of electronic apparatus 1 may be enabled by the at least one CPU 11 and the at least one DSP 12 cooperating with each other.

Unlike in FIG. 3, the storage 13 is not included in the controller 10 in some embodiments. That is, the storage 13 may be provided separately from the controller 10.

The storage 13 can store, as the applications Pg2, a telephony application for performing communication with another mobile phone, an email application for sending and receiving emails, and the like. The applications Pg2 are read and executed during the execution of the main program Pg1, so that electronic apparatus 1 can perform functions associated with voice calls, email transmissions, and the like. To avoid complications in the drawing, a single applications Pg2 is illustrated in FIG. 3.

The wireless communication unit 14 includes an antenna 15. In the wireless communication unit 14, the antenna 15 can transmit and receive, via a base station, communication signals to and from a mobile phone different from the electronic apparatus 1 or a communication device such as a web server connected to the Internet.

The display 16 includes the display area 2a and the display device 17. The display device 17 is, for example, a liquid crystal display or an organic electroluminescent (EL) display. As described above, in the display 16, the variety of information displayed by the display device 17 can be viewed from the outside of the electronic apparatus 1 through the display area 2a.

The touch panel 18 is, for example, a projected capacitive touch panel. The touch panel 18 is attached to the rear surface of the cover panel 2 and includes two sheet-shaped electrode sensors opposed to each other. When the user touches the display area 2a of the display 16 with an operator, such as a finger, the capacitance of the portion of the touch panel 18 facing the operator changes. The touch panel 18 can output, to the controller 10, an electrical signal in accordance with the change in capacitance. Thus, the touch panel 18 functions as an operation detector 30 (see FIG. 4, which will be described below) that detects operations performed on the display area 2a of the display 16 with the operator. The user can provide various instructions to the electronic apparatus 1 by performing operations on the display 16 with an operator other than fingers, which is, for example, a pen for electrostatic touch panels such as a stylus pen.

In a case where the detection sensitivity of the touch panel 18 is set to be high, the capacitance of the portion of the touch panel 18 facing the operator changes, with the operator not being in contact with the display area 2a but being in close proximity to the display area 2a. Thus, the touch panel 18 can also detect the close proximity of the operator to the display 16 (the display area 2a). This means that the touch panel 18 can detect the contact of the operator with the display 16 and the close proximity of the operator to the display 16. In one embodiment, the state of the operator being in contact with the display 16 includes the state of the operator being in close proximity to the display 16. Thus, detection of the contact of the operator with the display 16 by the touch panel 18 includes detection of the close proximity of the operator to the display 16 by the touch panel 18.

The side key 7 can transmit electrical instruction signals to the controller 10 upon being pressed. The microphone 19 can receive, for example, voice of the user during a voice call and the like, convert the input voice into electrical signals, and output the electrical signals to the controller 10. The receiver 20 can convert the electrical sound singles input from the controller 10 during a voice call and the like into sound, and output the sound to provide the reception sound to the user. The speaker 21 can convert electrical sound signals input from the controller 10 into sound, and output the sound to provide ringtones and the like to the user separated from the electronic apparatus 1. The front image capture unit 5a and the rear image capture unit 5b can capture still images and moving images.

In a case where earphones are connected to the earphone terminal 8 (see FIG. 1) in the side surface of the case part 3, sound signals, such as reception sound and ringtones, are input to the earphone terminal 8. The sound signals input to the earphone terminal 8 are received by the earphones, and sound is output from the earphones accordingly.

<Types of Operations on Display Area>>

Examples of basic operations performed on the display 16 by the user are a tap operation, a long touch operation, a slide operation, and a flick operation.

The tap operation refers to an operation of bringing an operator into contact with the display 16 and moving the operator off the display 16 immediately afterward. Specifically, the tap operation is an operation in which the operator is brought into contact with the display area 2a of the display 16 and the operator is moved, at the position of the operator being in contact or the position of the operator being in close proximity, away from the display area 2a within a predetermined period. For example, the user can perform a tap operation on the display 16 to select an image displayed on the display 16 for executing one of the application Pg2, and can cause the electronic apparatus 1 to execute the application Pg2 accordingly.

The long touch operation refers to an operation of keeping an operator in contact with the display area 2a of the display 16 for a predetermined period or more. The long touch operation is equivalent to a so-called "long press" operation. For example, the user can perform a long touch operation on the display 16 to cause the display 16 to display a list of processing which the user can instruct the electronic apparatus 1 to perform.

The slide operation refers to an operation of shifting an operator while keeping the operator in contact with the display area 2a of the display 16. For example, the user can perform a slide operation on an image displayed on the display 16 to shift the display position in which the image is displayed to the destination reached by the operator through the slide operation. The slide operation is also referred to as a "drag operation." In one embodiment, the drag operation is also referred to as a shift operation.

The flick operation refers to an operation of flipping the display area 2a of the display 16 with an operator. Specifically, the flick operation is an operation in which the operator is shifted over a predetermined distance or more within a predetermined period, with the operator being in contact with the display area 2a, and then the operator is moved off the display area 2a. For example, the user can perform a flick operation on the display 16 to cause electronic apparatus 1 to scroll display contents of the display 16 along the shift of the operator associated with the flick operation.

<<Functional Blocks of Controller >>

In the controller 10, a plurality of functional blocks are formed by execution of the main program Pg1. FIG. 4 illustrates part of the plurality of functional blocks formed in the controller 10. As illustrated in FIG. 4, the controller 10 includes a display controller 31, which is a functional flock.

The display controller 31 can control display contents of the display 16 in accordance with operations performed on the display 16 by an operator and detected by the operation detector 30 (the touch panel 18). FIG. 5 illustrates an overview of processing performed by the display controller 31. As illustrated in FIG. 5, the display controller 31 has, as operation modes, a normal display mode 35 and a split display mode 36. The display controller 31 can control switching between the normal display mode 35 and the split display mode 36 in accordance with operations detected by the operation detector 30.

Figure 6:
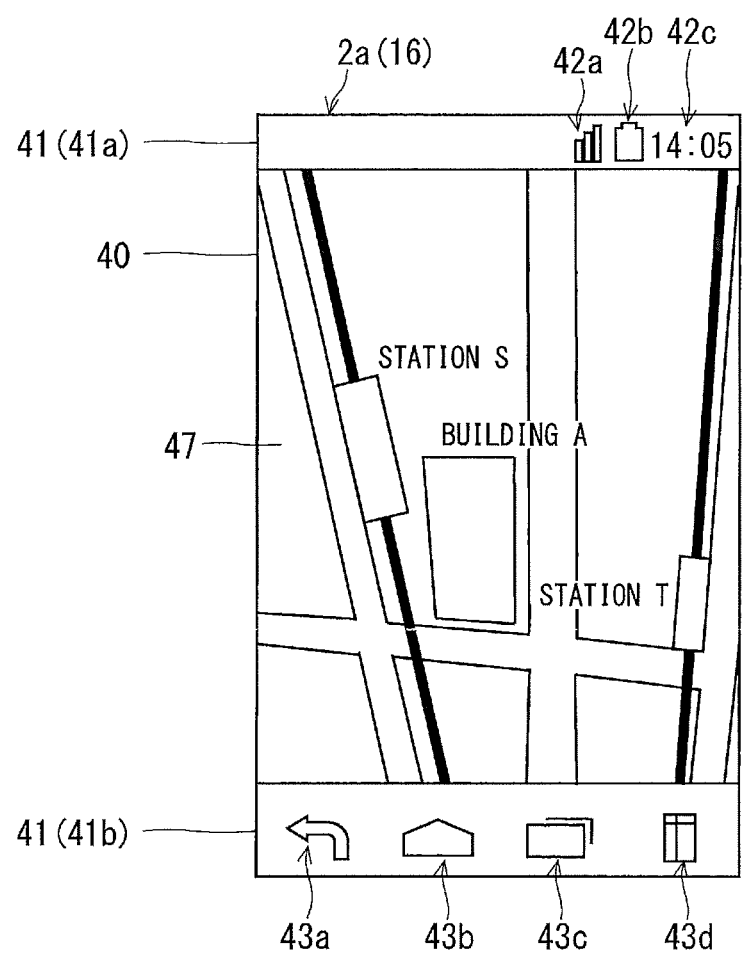
FIG. 6 illustrates exemplary display contents of the electronic apparatus according to one embodiment.

FIG. 6 illustrates exemplary display contents of the display 16 in the normal display mode 35. As illustrated in FIG. 6, the display area 2a includes a first display area 40, which is predominant, and a second display area 41 different from the first display area 40. Displayed in the first display area 40 in the normal display mode 35 is, for example, a single application execution image, which is an image obtained by execution of an application. In an example illustrated in FIG. 6, an application execution image 47 obtained by execution of a map display application for displaying a map is displayed in the first display area 40. In some cases, a home image (an initial image), which is displayed immediately after the activation of the electronic apparatus 1 and the like, is displayed in the first display area 40.

In an example illustrated in FIG. 6, the second display area 41 includes a second display area 41a and a second display area 41b. Displayed in the second display area 41a are, for example, an icon 42a indicating the remaining battery level, an icon 42b indicating the communication state, and a current time 42c. The second display area 41a is also referred to as a "PICT area."

Displayed in the second display area 41b are, for example, images 43a, 43b, 43c, and 43d. In one embodiment, the images 43a, 43b, 43c, and 43d can function as software keys. Specifically, in a case where the operation detector 30 detects a tap operation on the image 43a, the display controller 31 returns display contents of the display 16 to the preceding state. In a case where the operation detector 30 detects a tap operation on the image 43b, the display controller 31 causes the display 16 to display the home image. In a case where the operation detector 30 detects a tap operation on the image 43c, the display controller 31 causes the display 16 to display execution histories of the application. In a case where the operation detector 30 detects a tap operation on the image 43d, the display controller 31 switches to the split display mode 36 (see FIG. 5).

As described above, the images 43a, 43b, 43c, and 43d that function as software keys are displayed in the second display area 41b. The second display area 41b is also referred to as a "navigation bar."

Figures 7, 8:
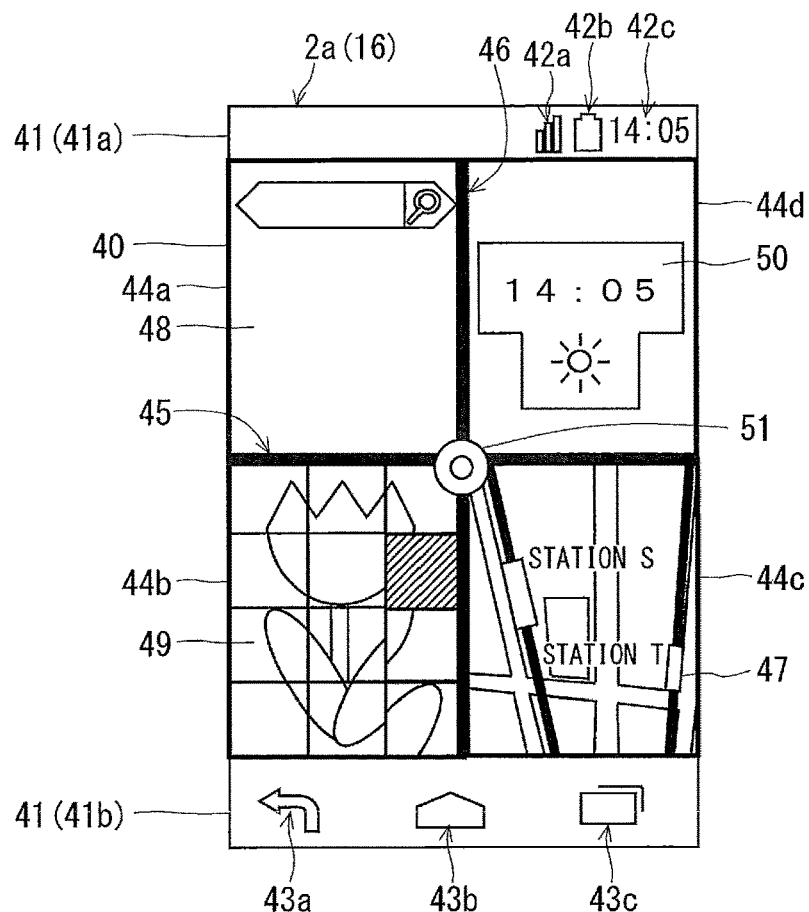
FIG. 7 illustrates exemplary display contents of the electronic apparatus according to one embodiment.
FIG. 8 illustrates processing performed by the electronic apparatus according to one embodiment.

FIG. 7 illustrates exemplary display contents of the display 16 in the split display mode 36. As illustrated in FIG. 7, the display area 2a includes the first display area 40 and the second display area 41 as is the case with the normal display mode 35. There is a difference in the display style of the first display area 40 between the split display mode 36 and the normal display mode 35.

In the split display mode 36, the display controller 31 can split the first display area 40 into a plurality of split areas and control display contents of each of the plurality of split areas independently of one another. In an example illustrated in FIG. 7, the first display area 40 is split into four split areas being split areas 44a, 44b, 44c, and 44d. The split areas 44a, 44b, 44c, and 44d are hereinafter simply referred to as "split areas" unless there is a particular need to distinguish among them. The split display mode 36 will be described below assuming that the first display area 40 is split into four split areas as illustrated in FIG. 7. The number of split areas in the first display area 40 in the split display mode 36 is not limited to four.

In an example illustrated in FIG. 7, the display controller 31 causes the display 16 to display a first partition line 45 extending in the horizontal direction of the first display area 40 and a second partition line 46 extending in the vertical direction of the first display area 40 such that the first display area 40 is split into four split areas being the split areas 44a, 44b, 44c, and 44d.

In one embodiment, the split area on the upper left relative to the intersection point of the first partition line 45 and the second partition line 46 is referred to as the "split area 44a" for convenience. The split area on the lower left relative to the intersection point of the first partition line 45 and the second partition line 46 is referred to as the "split area 44b." The split area on the lower right relative to the intersection point of the first partition line 45 and the second partition line 46 is referred to as the "split area 44c." The split area on the upper right relative to the intersection point of the first partition line 45 and the second partition line 46 is referred to as the "split area 44d."

Displayed in the split area 44a illustrated in FIG. 7 is an application execution image 48 obtained by execution of a browser for displaying web pages. Displayed in the split area 44b is a game application execution image 49 obtained by execution of a game application. Displayed in the split area 44c is the application execution image 47 mentioned above. Displayed in the split area 44d is an application execution image 50 obtained by execution of a widget for showing the time and weather conditions. Widgets are applications for providing low-level functions. The widgets include an application for limiting functions enabled by execution of an application and initiating, in an unsophisticated manner, part of the functions, such as displaying of part of information that is to be displayed by execution of an application.

In a case where the operation detector 30 detects an operation on one of the split areas in the split display mode 36, the electronic apparatus 1 performs processing assuming that the operation is performed on the application execution image displayed in the one of the split areas. For example, as illustrated in FIG. 7, in a case where the application execution image 47 obtained by execution of the map display application is displayed in the split area 44c, the electronic apparatus 1 shifts (scrolls), in response to a flick operation performed on the split area 44c with the operator, the display range of the map displayed in the split area 44c along the shift of the operator.

In the split display mode 36, the display controller 31 causes an operation target image 51 to be displayed at the intersection point of the first partition line 45 and the second partition line 46. The operation target image 51 is an image with which a setting for each of the plurality of split areas is made and is designed to be operated by the user. The display controller 31 can make a setting for each of the plurality of split areas in accordance with operations on the operation target image 51 detected by the operation detector 30.

<<Operation Target Image>>

The following describes processing performed by the display controller 31 in accordance with operations on the operation target image 51. FIG. 8 illustrates relations between operations on the operation target image 51 and processing performed by the display controller 31.

In one embodiment, the following description will be given assuming that three types of operations are performed on the operation target image 51 as illustrated in FIG. 8. In the following description, the three types of operations being a drag operation (No. 1 of FIG. 8), a tap operation (No. 2 of FIG. 8), and a long touch operation (No. 3 of FIG. 8) are given as examples.

The types of operations that are brought into correspondence with the processing performed by the display controller 31 are not limited to examples illustrated in FIG. 8. The processing in No. 2 of FIG. 8 may be performed in a case where the operation detector 30 detects a double tap operation being two iterations of tap operations. In another example, the processing in No. 3 of FIG. 8 may be performed in a case where the operation detector 30 detects a tap operation, and the processing in No. 2 of FIG. 8 may be performed in a case where the operation detector 30 detects a long touch operation. In one embodiment, the user can perform an operation on a single operation target image 51 to make a setting for each of the plurality of split areas. This enhances the usability of the electronic apparatus 1.

<Processing Performed in Response to Drag Operation on Operation Target Image>

As shown in No. 1 of FIG. 8, in a case where a drag operation is performed on the operation target image 51 to shift the operation target image 51, the display controller 31 resizes the split areas in the first display area 40. To be more specific, the display controller 31 shifts the first partition line 45 and the second partition line 46 in such a manner that the destination reached by the operator through the drag operation detected by the operation detector 30 agrees with the intersection point of the first partition line 45 and the second partition line 46. In other words, the display controller 31 shifts the first partition line 45 and the second partition line 46 in such a manner that the destination reached by the operation target image 51 through the drag operation detected by the operation detector 30 agrees with the intersection of the first partition line 45 and the second partition line 46. The plurality of split areas split by the first partition line 45 and the second partition line 46 are resized due to the shifts in the display positions of the first partition line 45 and the second partition line 46. The user can perform a drag operation on the operation target image 51 to shift the operation target image 51 in a desired direction.

Figure 9:
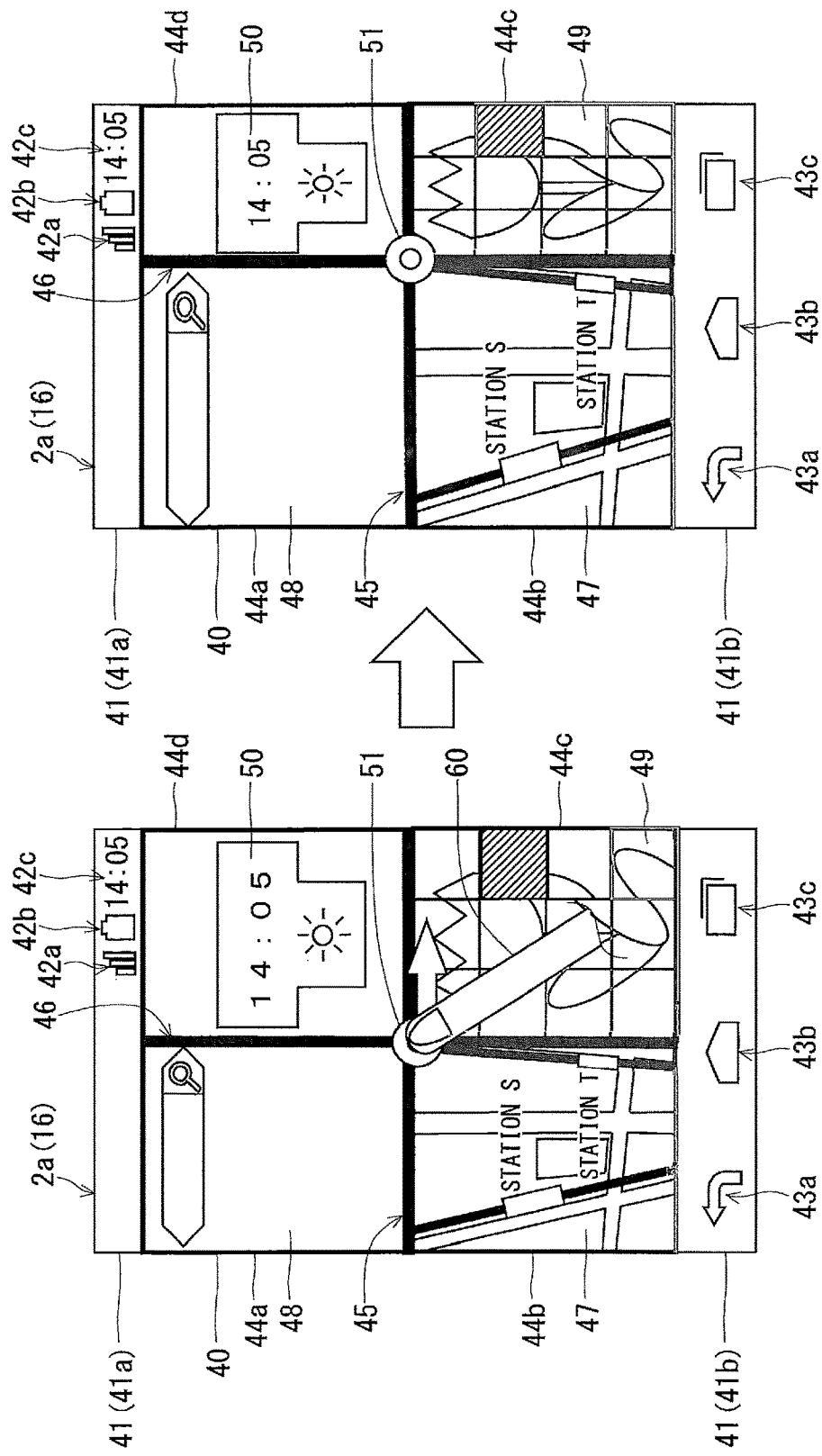
FIG. 9 illustrates exemplary display contents of the electronic apparatus according to one embodiment.
Figure 10:
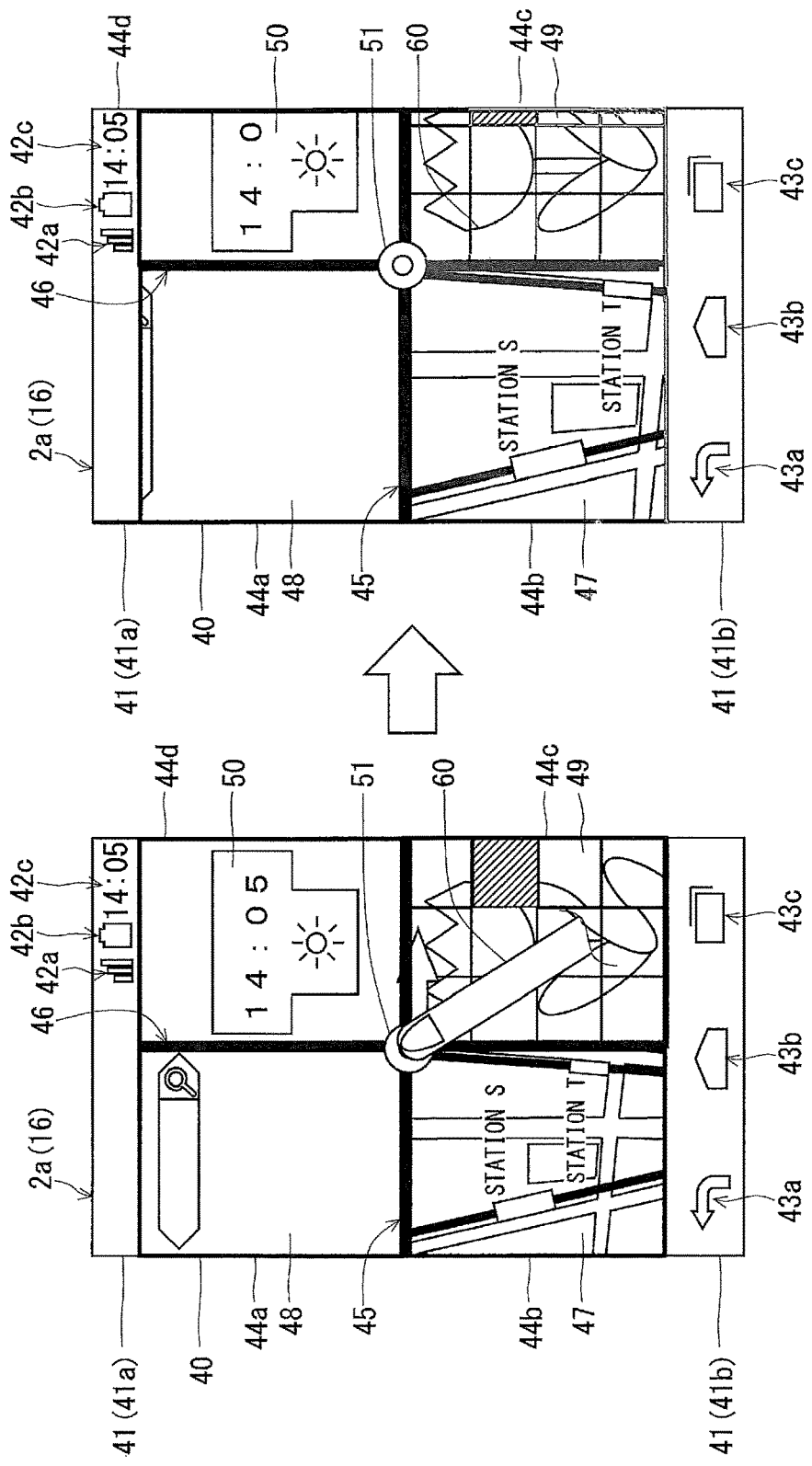
FIG. 10 illustrates exemplary display contents of the electronic apparatus according to one embodiment.

FIGS. 9 and 10 illustrate exemplary display contents of the display 16 associated with a drag operation on the operation target image 51 detected by the operation detector 30. With reference to each of FIGS. 9 and 10 as well as FIG. 11, which will be described below, exemplary display contents of the display 16 prior to the drag operation performed with an operator 60 are illustrated on the left side, and exemplary display contents of the display 16 subsequent to the drag operation performed with the operator 60 are illustrated on the right side.

In examples illustrated in FIGS. 9 and 10, a drag operation is performed on the operation target image 51 to shift the operation target image 51 rightward. In response to the drag operation performed with operator 60, the second partition line 46 is shifted rightward and displayed on the display 16. The sizes of the split areas 44a and 44b increase in the horizontal direction and the sizes of the split areas 44c and 44d decrease in the horizontal direction accordingly. As illustrated on the right side of each of FIGS. 9 and 10, the application execution images are displayed in the resized split areas.

FIG. 9 illustrates an example in which the application execution images that are scaled up or scaled down in accordance with the aspect ratios of the resized split areas are displayed in the split areas. As illustrated in FIG. 9, the display controller 31 causes the application execution images 48 and 47, which have been displayed in the split areas 44a and 44b prior to the resizing, to be displayed in the resized split areas 44a and 44b, with the application execution images 48 and 47 being scaled up in the horizontal direction. The display controller 31 causes the application execution images 49 and 50, which have been displayed in the split areas 44c and 44d prior to the resizing, to be displayed in the resized split areas 44c and 44d, with the application execution images 49 and 50 being scaled down in the horizontal direction.

FIG. 10 illustrates an example in which the application execution images that are scaled up or scaled down in accordance with the sizes of the resized split areas are displayed in the split areas, with the aspect ratios of the application execution images being fixed. In an example illustrated in FIG. 10, the display controller 31 scales up the application execution images 48 and 47 in accordance with scale-ups of the split areas 44a and 44b, with the aspect ratios of the application execution images 48 and 47 being fixed, and then the display controller 31 causes the scaled-up application execution images 48 and 47 to be displayed in the split areas 44a and 44b.

In an example illustrated in FIG. 10, the display controller 31 causes the application execution images 49 and 50 to be displayed in the split areas 44c and 44d, with the application execution images 49 and 50 not being scaled up nor being scaled down.

Figure 11:
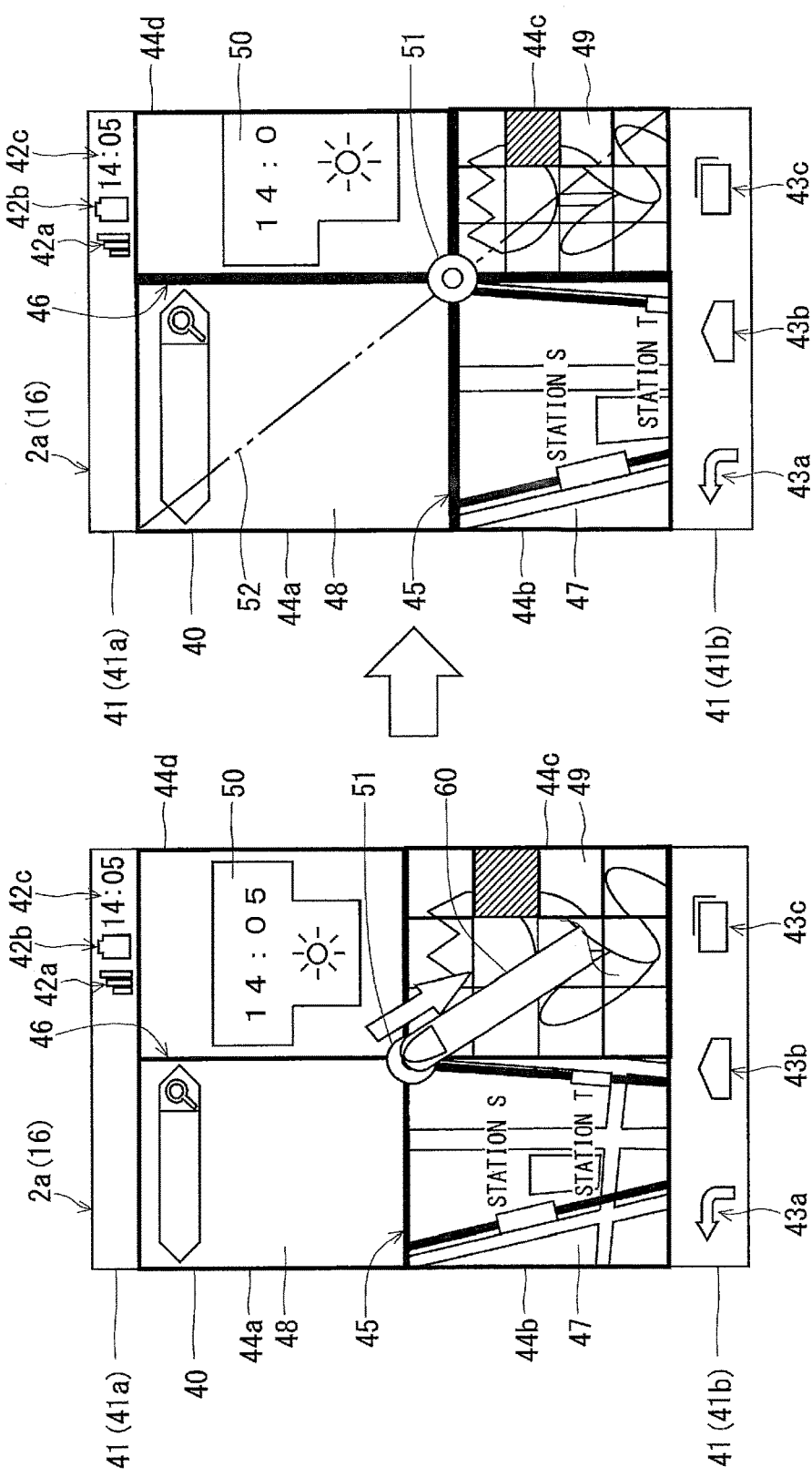
FIG. 11 illustrates exemplary display contents of the electronic apparatus according to one embodiment.

In an example mentioned above, the user can shift the operation target image 51 in a desired direction. In some embodiments, the operation target image 51 is designed to shift only on a diagonal line 52 in the first display area 40. FIG. 11 illustrates shifts of the operation target image 51 on the diagonal line 52. The diagonal line 52 extends from the upper left to the lower right of the first display area 40.

In a case where the operation target image 51 is designed to shift only on the diagonal line 52, the outlines of the split areas 44a and 44c are geometrically similar to the outline of the first display area 40, and thus the split areas 44a and 44c are resized in such a manner that their respective aspect ratios remain unchanged. This can prevent part of the application execution images displayed in the split areas 44a and 44c from lying offscreen due to the changes in the aspect ratios of the split areas 44a and 44c.

In some cases, the application execution image displayed by execution of the game application has a fixed aspect ratio, which agrees with the aspect ratio of the first display area 40. In displaying such an application execution image in the split area 44c, if the aspect ratio of the split area 44c changes due to the resizing of the split area 44c, the application execution image fails to be displayed in the resized split area 44c in its entirety in some cases. Such an incident can be prevented if the split areas 44a and 44c are resized in such a manner that their respective aspect ratios remain unchanged as illustrated in FIG. 11.

As described above, the first partition line 45 and the second partition line 46 are shifted in such a manner that the intersection point of the first partition line 45 and the second partition line 46 agrees with the destination reached by the operation target image 51. Thus, the user can intuitively resize the split areas.

The application execution images may be scaled up or scaled down due to resizing of the split areas in a way different from an example mentioned above. The plurality of split areas may include at least one split area in which the application execution images are not scaled up nor scaled down. The plurality of split areas in which the application execution images are scaled up or scaled down may include at least one split area in which the application execution images are displayed in such a manner that their respective aspect ratios remain unchanged and at least one split area in which the application execution images are displayed while being scaled up or scaled down in accordance with the aspect ratios of the split areas.

Figure 12:
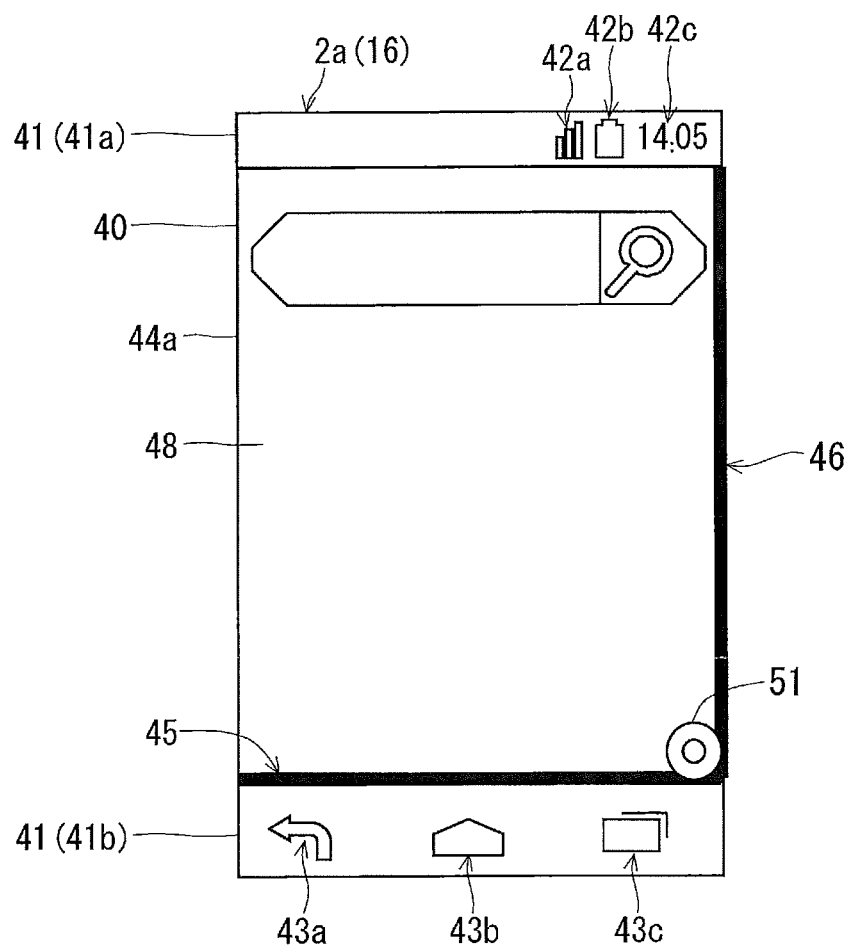
FIG. 12 illustrates exemplary display contents of the electronic apparatus according to one embodiment.

The following describes two types of display styles of the operation target image 51 assuming that the operation detector 30 detects a drag operation that is performed on the operation target image 51 to shift the operation target image 51 to a corner of the first display area 40. FIGS. 12 to 14 illustrate exemplary display contents of the display 16 assuming that the operation detector 30 detects a drag operation that is performed on the operation target image 51 to shift the operation target image 51 to a corner of the first display area (specifically, the lower right corner of the first display area).

In an example illustrated in FIG. 12, in a case where the operation detector 30 detects a drag operation that is performed on the operation target image 51 to shift the operation target image 51 to the corner of the first display area 40, the display controller 31 causes the operation target image 51 to be displayed in the corner of the first display area 40. The first partition line 45 and the second partition line 46, which have been displayed prior to the shift of the operation target image 51 to the corner of the first display area 40, are displayed on the edges of the first display area 40. The display style illustrated in FIG. 12 can prevent the user from losing track of the operation target image 51 even if the operation target image 51 is shifted to the corner of the first display area 40.

In an example illustrated in FIG. 13, meanwhile, in a case where the operation detector 30 detects a drag operation that is performed on the operation target image 51 to shift the operation target image 51 to a corner of the first display area 40, the display controller 31 causes the display 16 not to display the operation target image 51. Similarly, the first partition line 45 and the second partition line 46 are not displayed at this time.

With the operation target image 51, the first partition line 45, and the second partition line 46 not being displayed due to the shift of operation target image 51 to a corner of the first display area 40, in a case where the operation detector 30 detects a predetermined operation on the corner of the first display area 40 as illustrated on the left side of FIG. 14, the display controller 31 causes the operation target image 51, the first partition line 45, and the second partition line 46 to be displayed. For example, in a case where the operation detector 30 detects a slide operation starting from the corner and heading toward the inner side of the first display area 40, the display controller 31 causes the operation target image 51 to be displayed on the endpoint of the slide operation, and also causes the first partition line 45 and the second partition line 46 to be displayed. In the display styles illustrated in FIGS. 13 and 14, the operation target mage 51 is not displayed in a case where the operation target image 51 does not need to be displayed.

With the operation target image 51 not being displayed due to its shift to a corner of the first display area 40, the display controller 31 may cause the operation target image 51 to be displayed in the corner of the first display area 40 in a case where the operation detector 30 detects a tap operation or a double tap operation on the corner, for example. In this case, the first partition line 45 and the second partition line 46 may be displayed as in FIG. 12.

<Processing Performed in Response to Tap Operation on Operation Target Image>

As shown in No. 2 of FIG. 8, in response to a tap operation performed on the operation target image 51, the display controller 31 causes the display 16 to transpose the application execution images displayed in the plurality of split areas.

FIGS. 15 and 16 illustrate exemplary display contents of the display 16 assuming that the operation detector 30 detects a tap operation on the operation target image 51. With reference to each of FIGS. 15 and 16, exemplary display contents of the display 16 prior to the tap operation performed with the operator 60 are illustrated on the left side, and exemplary display contents of the display 16 subsequent to the tap operation performed with the operator 60 are illustrated on the right side.

In an example illustrated in FIG. 15, in a case where the operation detector 30 detects a tap operation on the operation target image 51, the display controller 31 transposes, in a clockwise direction, the application execution images displayed in the plurality of split areas, with the intersection point of the first partition line 45 and the second partition line 46 being the reference point. To be more specific, in a case where the operation detector 30 detects a tap operation on the operation target image 51, the display controller 31 causes the application execution image 47 that has been displayed in the split area 44b to be displayed in the split area 44a, causes the application execution image 49 that has been displayed in the split area 44c to be displayed in the split area 44b, causes the application execution image 50 that has been displayed in the split area 44d to be displayed in the split area 44c, and causes the application execution image 48 that has been displayed in the split area 44a to be displayed in the split area 44d.

In an example illustrated in FIG. 16, in a case where the operation detector 30 detects a tap operation on the operation target image 51, the display controller 31 transposes, in a counterclockwise direction, the application execution images displayed in the plurality of spilt areas, with the intersection point of the first partition line 45 and the second partition line 46 being the reference point. To be more specific, in a case where the operation detector 30 detects a tap operation on the operation target image 51, the display controller 31 causes the application execution image 50 that has been displayed in the split area 44d to be displayed in the split area 44a, causes the application execution image 48 that has been displayed in the split area 44a to be displayed in the split area 44b, causes the application execution image 47 that has been displayed in the split area 44b to be displayed in the split area 44c, and causes the application execution image 49 that has been displayed in the split area 44c to be displayed in the split area 44d.

The transposition of the application execution images displayed in the plurality of split areas are not limited to examples illustrated in FIGS. 15 and 16.

As described above, the user can perform an operation on the operation target image 51 to cause the electronic apparatus 1 to transpose the application execution images displayed in the plurality of split areas. This enhances the usability of the electronic apparatus 1. For example, the user holding the electronic apparatus 1 in the right hand and performing operations on the display area 2a with the right hand can easily cause the desired application execution image to be displayed in the split area 44c, which is more convenient for the right hand operation, by performing an operation on the operation target image 51. The user holding the electronic apparatus 1 in the left hand and performing operations on the display area 2a with the left hand can easily cause the desired application execution image to be displayed in the split area 44b, which is more convenient for the left hand operation, by performing an operation on the operation target image 51.

<Processing Performed in Response to Long Touch Operation on Operation Target Image >

As shown in No. 3 of FIG. 8, in response to a long touch operation performed on the operation target image 51, the display controller 31 switches to a setting mode in which settings of application execution images displayed in the plurality of split areas are made.

FIG. 17 illustrates exemplary display contents of the display 16 assuming that the operation detector 30 detects a long touch operation on the operation target image 51. In a case where the operation detector 30 detects a long touch operation on the operation target image 51 as illustrated on the left side of FIG. 17, the display controller 31 causes images for setting application execution images displayed in the plurality of split areas to be displayed in the first display area 40. As described above, the switching to the setting mode can be performed in response to a simple operation on the operation target image 51. This enhances the usability of the electronic apparatus 1.

Although the following description will be given assuming that the display 16 displays, upon switching to the setting mode, the display contents illustrated in FIG. 17, display contents of the display 16 in the setting mode are not limited thereto. For example, the display 16 may display a list of settings available in the setting mode, which will be described below.

As illustrated on the right side of FIG. 17, the first display area 40 includes a first setting area 71, a second setting area 72, and a third setting area 73. Displayed in the first setting area 71 are a plurality of first corresponding images 74 corresponding to the plurality of split areas in the split display mode. To be more specific, a first corresponding image 74a corresponds to the split area 44a, a first corresponding image 74b corresponds to the split area 44b, a first corresponding image 74c corresponds to the split area 44c, and a first corresponding image 74d corresponds to the split area 44d. As illustrated in FIG. 17, the application execution images displayed in the split areas corresponding to the first corresponding images 74 may be displayed as the first corresponding images 74.

Displayed in the second setting area 72 are a plurality of second corresponding images 75 corresponding to a plurality of candidate images that can be displayed in the plurality of split areas in the split display mode. The candidate images that can be displayed in the split areas are application execution images in one embodiment. In one embodiment, the second corresponding images 75 corresponding to the application execution images being candidate images are images symbolically representing the applications corresponding to the application execution images.

Displayed in the third setting area 73 are a plurality of setting keys 80 for changing the types of the second corresponding images 75 displayed in the second setting area 72. In an example illustrated in FIG. 17, displayed in the third setting area 73 are setting keys 80a, 80b, and 80c.

In a case where the setting key 80a or the setting key 80b is selected, the plurality of second corresponding images 75 are displayed in the second setting area 72, with the plurality of second corresponding images 75 being arranged in reverse chronological order of execution, starting with the second corresponding image 75 corresponding to the application execution image associated with the most recently executed application out of the plurality of applications corresponding to the plurality of second corresponding images 75. The second corresponding images 75 are displayed in reverse chronological order of execution, so that the user has a better chance of quickly finding the desired second corresponding image 75.

In a case where the setting key 80b is selected, the plurality of second corresponding images 75 representing a plurality of kinds of widgets are displayed in the second setting area 72. In a case where the setting key 80a is selected, the plurality of second corresponding images 75 representing a plurality of applications other than the widgets, such as a telephony application, an email application, and a browser, are displayed in the second setting area 72. In a case where the setting key 80c is selected, the plurality of second corresponding images 75 corresponding to a plurality of applications correlated with each other are displayed in the second setting area 72 as will be described below in detail.

In an example illustrated on the right side of FIG. 17, the setting key 80a is selected. Displayed as the second corresponding image 75 are a second corresponding image 75a (an image representing a game application) corresponding to the game application execution image 49 obtained by execution of the game application, a second corresponding image 75b (an image representing a map display application) corresponding to the application execution image 47 obtained by execution of the map display application, a second corresponding image 75c (an image representing a browser) corresponding to the application execution image 48 obtained by execution of the browser, a second corresponding image 75d (an image representing an email application) corresponding to an application execution image 53 obtained by execution of the email application for transmitting and receiving emails, and a second corresponding image 75e (an image representing a telephony application) corresponding to an application execution image obtained by execution of the telephony application for communicating with another mobile phone.

FIG. 18 illustrates exemplary display contents of the display 16 in changing the second corresponding images 75 displayed in the second setting area 72. As illustrated in FIG. 18, in a case where the operation detector 30 detects a leftward flick operation on the second setting area 72, the display controller 31 scrolls display contents of the second setting area 72 to the left. Consequently, in an example illustrated in FIG. 18, the second corresponding images 75a, 75b, and 75c are not displayed, and displayed in the second setting area 72 are images subsequent to the second corresponding image 75e including a second corresponding image 75f (an image representing a camera application) corresponding to an application execution image obtained by execution of the camera application for capturing images with the front image capture unit 5a or the rear image capture unit 5b, a second corresponding image 75g (an image representing an alarm application) corresponding to an application execution image obtained by execution of the alarm application for providing a notification to the user at a preset time, and a second corresponding image 75h (an image representing a calculator application) corresponding to an application execution image obtained by execution of the calculator application for executing a calculator function. In a case where the operation detector 30 detects a rightward flick operation on the second setting area 72, the display controller 31 scrolls display contents of the second setting area 72 to the right.

In the setting mode, the user can perform operations on the first display area 40 to make settings of application execution images displayed in the plurality of split areas in the split display mode 36. FIG. 19 illustrates settings that can be made in the setting mode. As shown in FIG. 19, three types of settings can be made in the setting mode. The following describes the three types of settings that can be made in the setting mode.

[Transposition of Application Execution Images]

As shown in No. 1 of FIG. 19, the application execution image displayed in one split area and the application execution image displayed in another split area can be transposed. To be more specific, in a case where the operation detector 30 detects a predetermined operation on two first corresponding images 74, the display controller 31 causes the display 16 to transpose the application execution images displayed in two individual split areas that are included in the plurality of split areas and correspond to the two first corresponding images 74 detected by the operation detector 30. FIG. 20 illustrates exemplary display contents of the display 16 in transposing the application execution images in the setting mode.

In an example illustrated in FIG. 20, a drag operation is performed on the first corresponding image 74c with the operator 60 to shift the first corresponding image 74c to the position of the first corresponding image 74b, meaning that a predetermined operation is performed on the first corresponding image 74c and the first corresponding image 74b. The predetermined operation on the two first corresponding images 74 is not limited to the above-mentioned operation. The predetermined operation on the first corresponding images 74b and 74c may include a tap operation on the first corresponding image 74c and a subsequent tap operation on the first corresponding image 74b.

In a case where the operation detector 30 detects a predetermined operation on the two images being the first corresponding images 74b and 74c, the display controller 31 causes the application execution image 49, which has been displayed as the first corresponding image 74c, to be displayed as the first corresponding image 74b, and causes the application execution image 47, which has been displayed as the first corresponding image 74b, to be displayed as the first corresponding image 74c as illustrated on the right side of FIG. 20. Then, the setting mode is terminated and the split display mode 36 is set, so that the application execution image 49 that has been displayed in the split area 44c is displayed in the split area 44b and the application execution image 47 that has been displayed in the split area 44b is displayed in the split area 44c as illustrated in FIG. 17.

As described above, the application execution images displayed in the two individual split areas corresponding to the two first corresponding images 74 can be transposed in response to the predetermined operation on the two first corresponding images 74. Thus, the application execution images displayed in two individual split areas can be easily transposed. This enhances the usability of the electronic apparatus 1.

For example, a tap operation on the image 43a displayed in the second display area 41b causes a transition from the setting mode to the split display mode 36.

[Setting of Split Area (Lock Screen) that does not Undergo Transposition of Application Execution Images]

As shown in No. 2 of FIG. 19, a setting mode 37 allows for the setting of a split area (a lock screen) that does not undergo transposition of application execution images. To be more specific, in a case where the operation detector 30 detects a predetermined operation on one of the first corresponding images 74, the display controller 31 sets, as a lock screen that does not undergo transposition of application execution images, the split area that is included in the plurality of split areas and correspond to the first corresponding image 74 detected by the operation detector 30.

Figure 21:
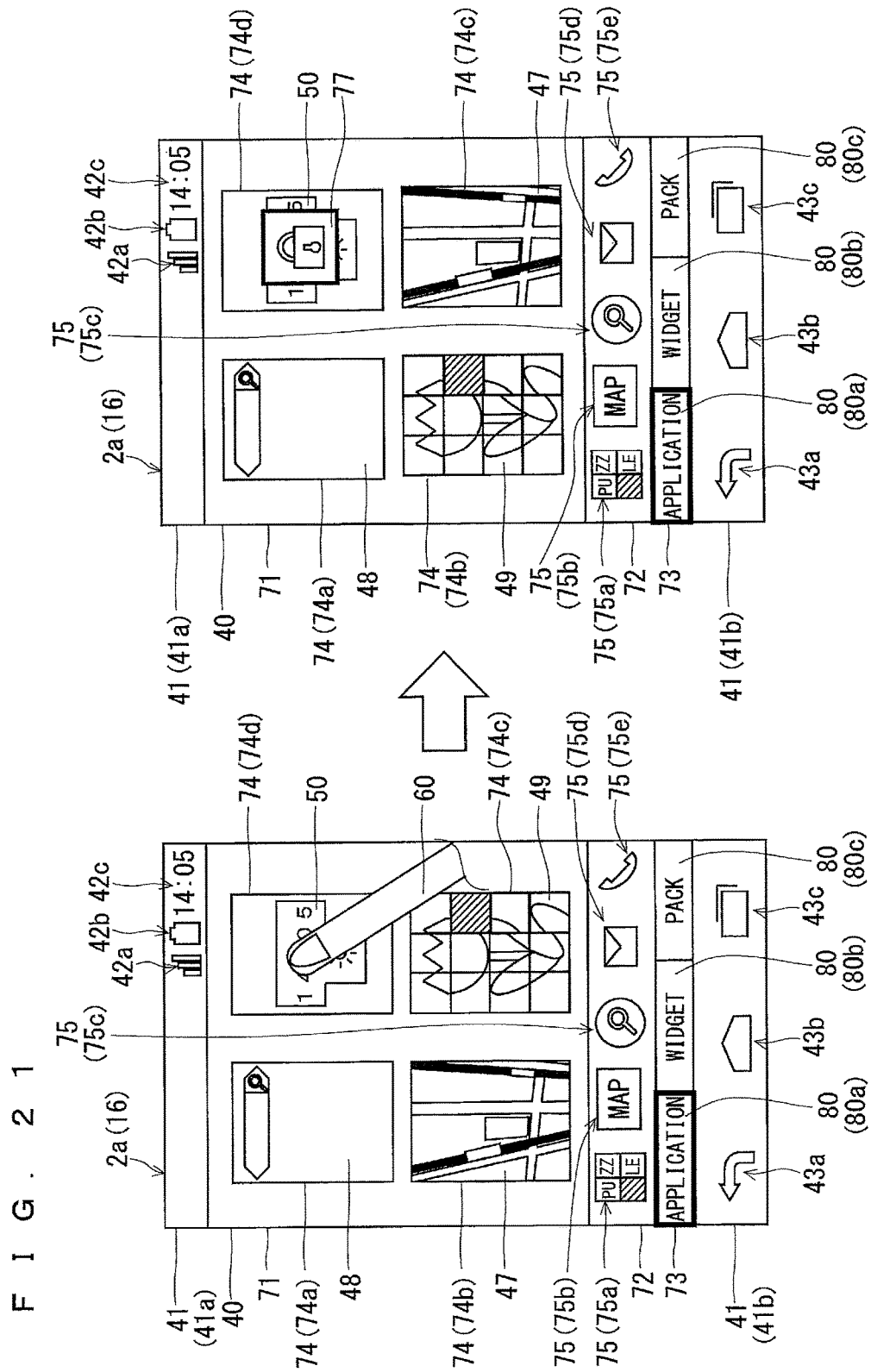
FIG. 21 illustrates exemplary display contents of the electronic apparatus according to one embodiment.

FIG. 21 illustrates exemplary display contents of the display 16 in setting a lock screen. As illustrated in FIG. 21, in a case where operation detector 30 detects a long touch operation on the first corresponding image 74d, the display controller 31 causes a lock screen setting image 77 to be displayed over the first corresponding image 74d. The display controller 31 sets, as a lock screen that does not undergo transposition of application execution images, the split area 44d corresponding to the first corresponding image 74d. The predetermined operation for setting a lock screen is not limited to the above-mentioned long touch operation. For example, a lock screen may be set in a case where a double tap operation being two iterations of tap operations is detected.

This allows for the setting of a split area that does not undergo transposition of application execution images, and thus the user can keep the desired application execution image displayed at a position (in a split area) where the image is plainly visible. Similarly, the user can keep the desired application execution image displayed at a position in which the user can easily perform operations on the image (for example, the split area 44c on the lower right as for the user holding the electronic apparatus 1 in the right hand).

[Changing Application Execution Image Displayed in Split Area]

As shown in No. 3 of FIG. 19, in the setting mode, an application execution image displayed in a split area can be changed. To be more specific, in a case where the operation detector 30 detects a predetermined operation on one of the first corresponding images 74 and on one of the second corresponding images 75, the display controller 31 causes the display 16 to display, in one of the split areas corresponding to the first corresponding image 74, a candidate image (an application execution image) corresponding to the second corresponding image 75.

In one embodiment, the following description will be given assuming that the predetermined operation on the first corresponding image 74 and the second corresponding image 75 is a drag operation performed with the operator 60 to shift the second corresponding image 75 to the position of the first corresponding image 74. The predetermined operation is not limited to the drag operation.

FIGS. 22 and 23 illustrate exemplary display contents of the display 16 in changing the application execution image displayed in the split area while the setting key 80a is selected in the third setting area 73.

As illustrated in FIG. 22, in a case where the operation detector 30 detects a drag operation performed with the operator 60 to shift the second corresponding image 75d, which corresponds to the application execution image 53 obtained by execution of the email application, to the position of the first corresponding image 74c, the email application is executed in the electronic apparatus 1. As illustrated on the right side of FIG. 22, the application execution image 53 obtained by execution of the email application is displayed as the first corresponding image 74c. Then, the switching from the setting mode to the split display mode 36 is done, so that the application execution image 53 is displayed in the split area 44c as illustrated in FIG. 23.

Figure 25:
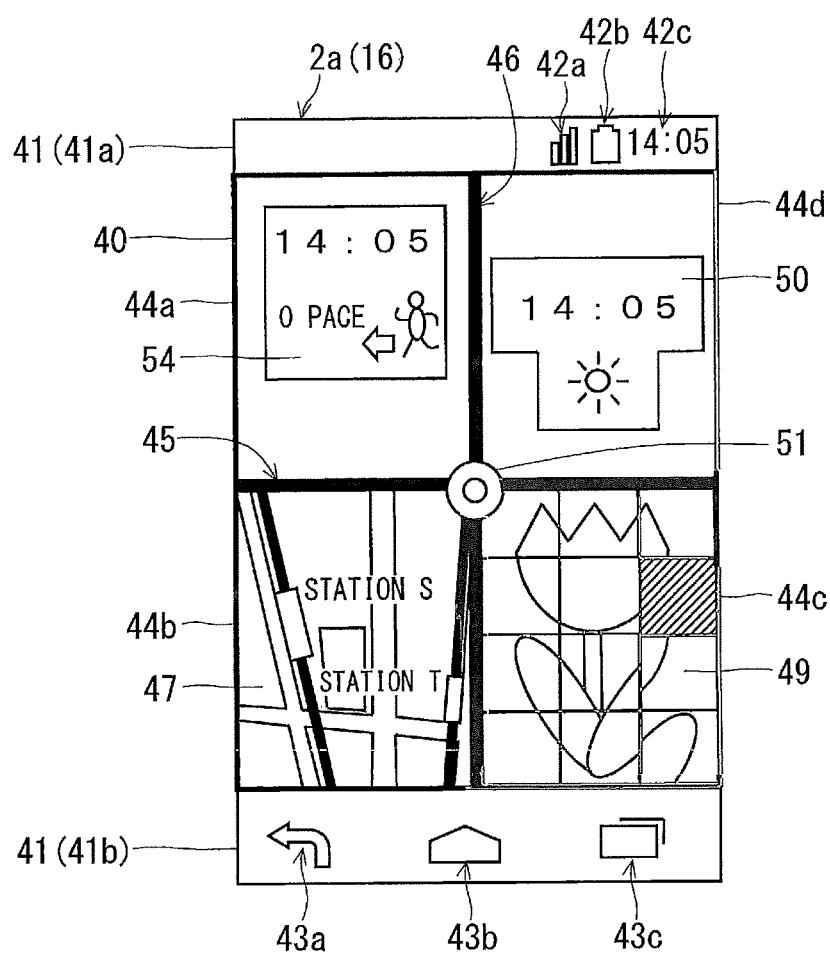
FIG. 25 illustrates exemplary display contents of the electronic apparatus according to one embodiment.

FIGS. 24 and 25 illustrate exemplary display contents of the display 16 in changing the application execution image displayed in the split area while the setting key 80b is selected in the third setting area 73.

As illustrated in FIG. 24, with the setting key 80b being selected, displayed in the second setting area 72 are a second corresponding image 75i corresponding to the application execution image 50, a second corresponding image 75j corresponding to an application execution image 54 obtained by execution of a pedometer application that is a widget for counting the user's paces, and a second corresponding image 75k corresponding to an application execution image obtained by execution of a widget for displaying a time of day using the image of an analog clock.

As illustrated on the left side of FIG. 24, in a case where the operation detector 30 detects a drag operation performed with the operator 60 to shift the second corresponding image 75j, which corresponds to the application execution image 54 obtained by execution of the pedometer application, to the position of the first corresponding image 74a, the pedometer application is executed in the electronic apparatus 1. As illustrated on the right side of FIG. 24, the display controller 31 causes the application execution image 54, which is obtained by execution of the pedometer application, to be displayed as the first corresponding image 74a. Then, the switching from the setting mode to the split display mode 36 is done, so that the application execution image 54 is displayed in the split area 44a as illustrated in FIG. 25.

As described above, in the setting mode, a decision of which application execution image out of a plurality of kinds of candidate images is to be displayed in a split area can be made in response to a simple operation. This enhances the usability of the electronic apparatus 1.

FIGS. 26 to 29 illustrate exemplary display contents of the display 16 in changing the application execution image displayed in the split area while the setting key 80c is selected in the third setting area 73.

Figure 26:
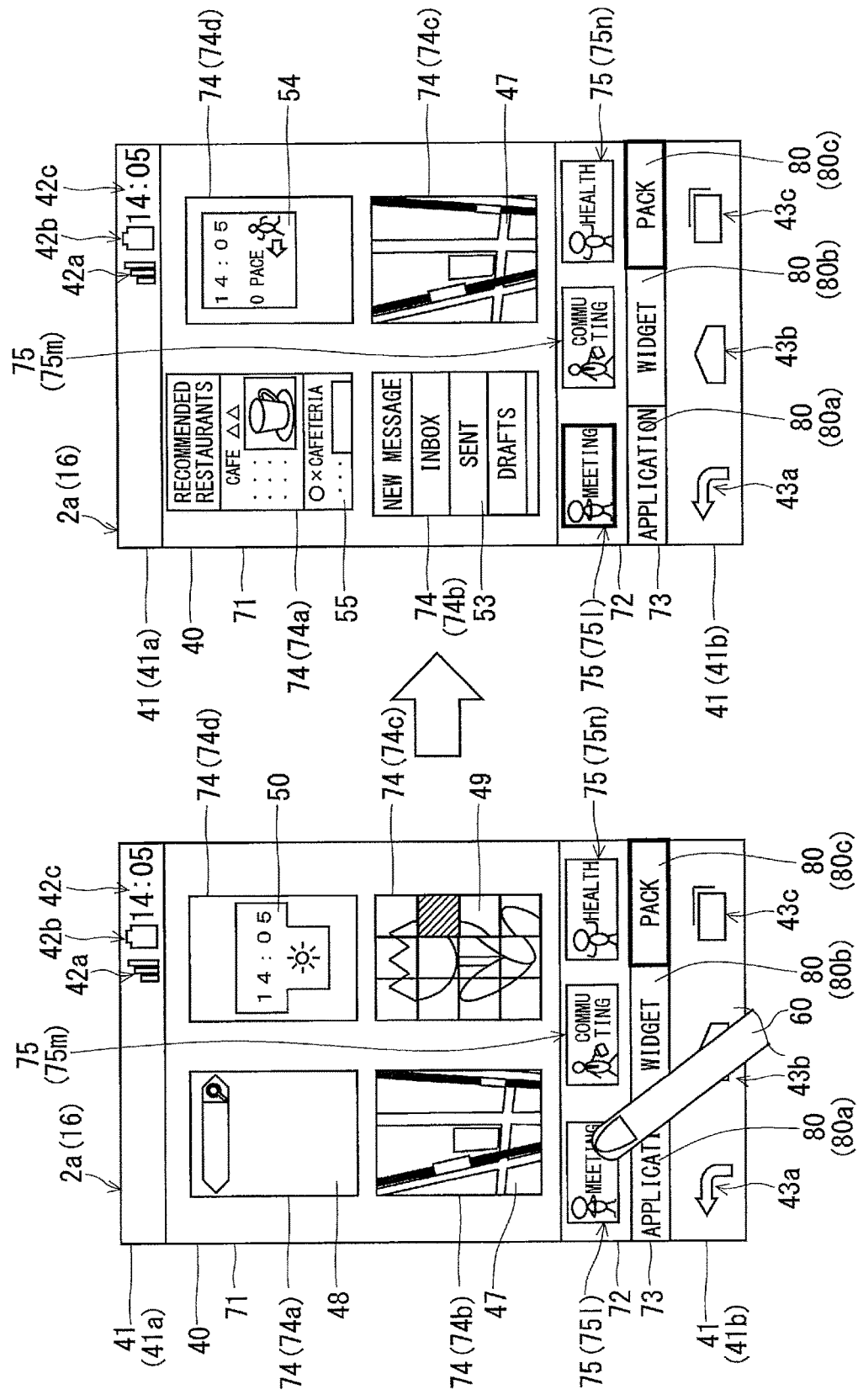
FIG. 26 illustrates exemplary display contents of the electronic apparatus according to one embodiment.
Figure 28:
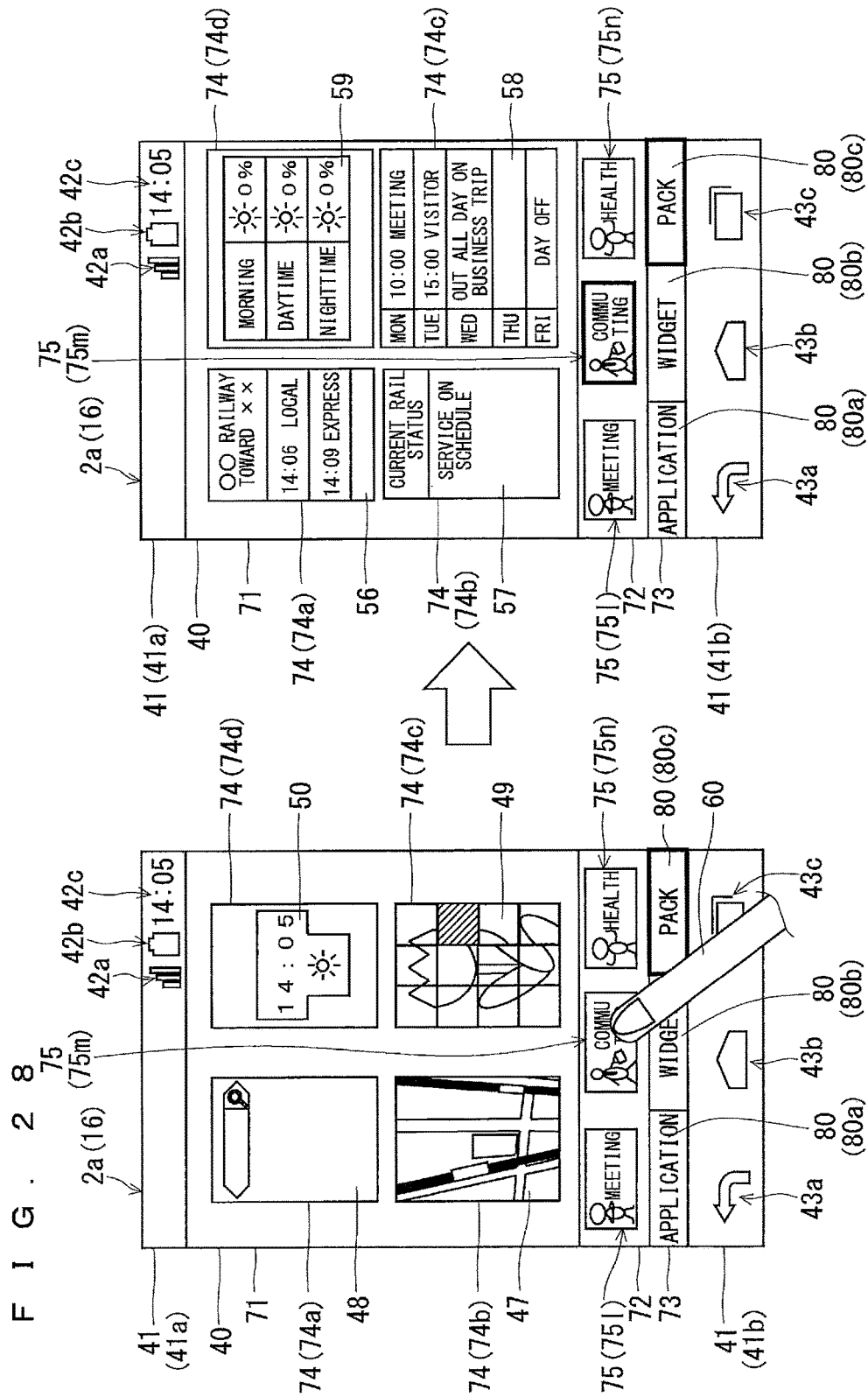
FIG. 28 illustrates exemplary display contents of the electronic apparatus according to one embodiment.

As illustrated in FIGS. 26 and 28, with the setting key 80c being selected, displayed in the second setting area 72 are, for example, second corresponding images 75l, 75m, and 75n. The second corresponding image 75l corresponds to a plurality of application execution images obtained by execution of a plurality of applications which the user probably causes the electronic apparatus 1 to execute in meeting a person by appointment. The second corresponding image 75m corresponds to a plurality of application execution images obtained by execution of a plurality of applications which the user probably causes the electronic apparatus 1 to execute while commuting to work. The second corresponding image 75n corresponds to a plurality of application execution images obtained by execution of a plurality of applications which the user probably causes the electronic apparatus 1 to execute for the sake of healthcare.

Figure 27:
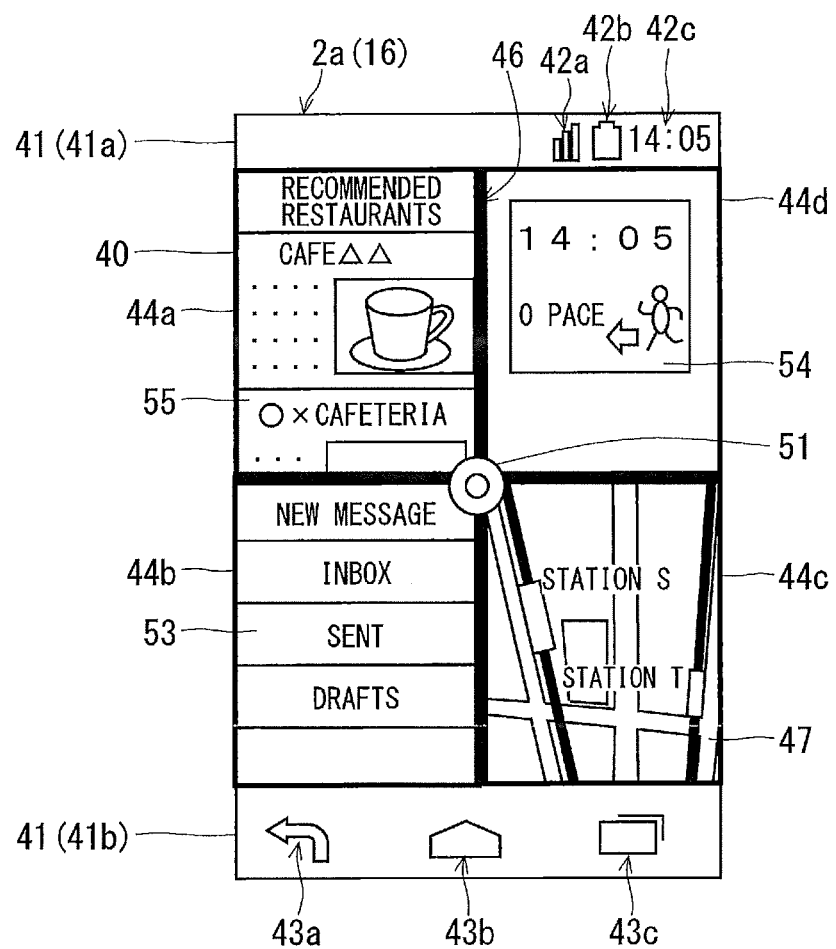
FIG. 27 illustrates exemplary display contents of the electronic apparatus according to one embodiment.

As illustrated in FIG. 26, in a case where the operation detector 30 detects an operation performed to select the second corresponding image 75l, the display controller 31 causes the plurality of application execution images that have been brought into correspondence with the second corresponding image 75l to be displayed in the first setting area 71 as the first corresponding images 74a, 74b, 74c, and 74d. In one embodiment, an information providing application for providing information on restaurants and the like, the email application, the map display application, and the pedometer application have been brought into correspondence with one another in advance as the plurality of applications which the user probably causes the electronic apparatus 1 to execute in meeting a person by appointment. In a case where the second corresponding image 75l is selected, the information providing application for providing information on restaurants and the like, the email application, the map display application, and the pedometer application are executed in the electronic apparatus 1. In the first setting area 71, the display controller 31 causes an application execution image 55, which is obtained by execution of the information providing application for providing information on restaurants and the like, to be displayed as the first corresponding image 74a, causes the application execution image 53, which is obtained by execution of the email application, to be displayed as the first corresponding image 74b, causes the application execution image 47, which is obtained by execution of the map display application, to be displayed as the first corresponding image 74c, and causes the application execution image 54, which is obtained by execution of the pedometer application, to be displayed as the first corresponding image 74d. Then, the switching from the setting mode to the split display mode 36 is done, so that the application execution image 55 is displayed in the split area 44a, the application execution image 53 is displayed in the split area 44b, the application execution image 47 is displayed in the split area 44c, and the application execution image 54 is displayed in the split area 44d as illustrated in FIG. 27.

Figures 29, 30:
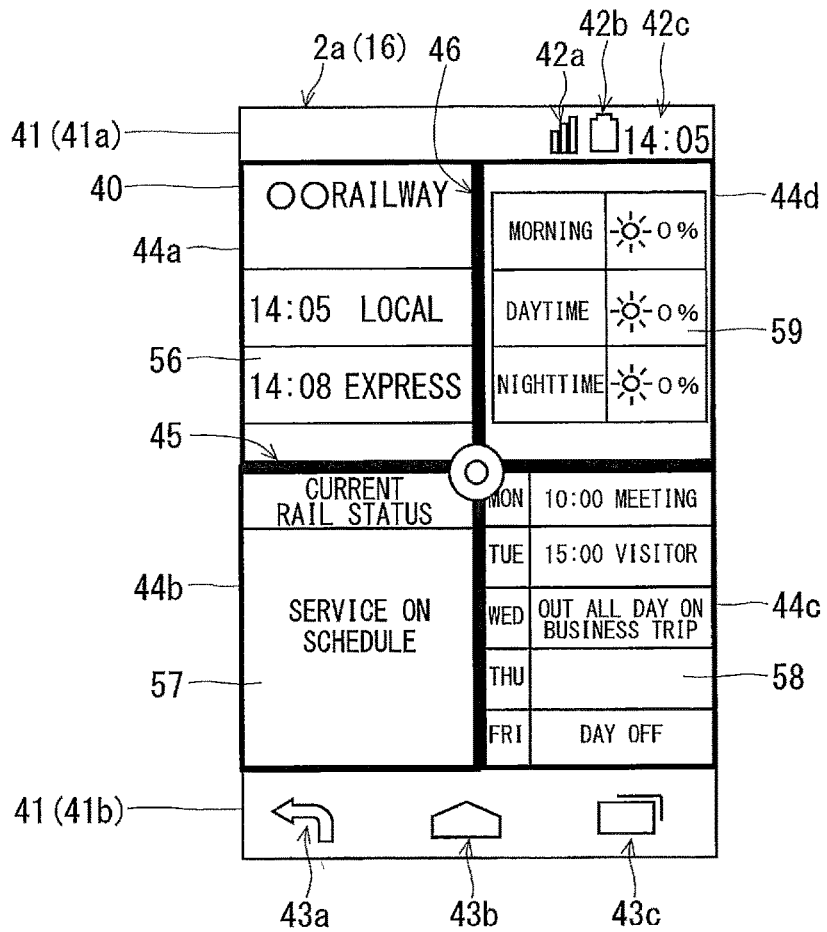
FIG. 29 illustrates exemplary display contents of the electronic apparatus according to one embodiment.
FIG. 30 illustrates processing performed by a display controller.

As illustrated in FIG. 28, in a case where the operation detector 30 detects an operation performed to select the second corresponding image 75m, the display controller 31 causes the plurality of application execution images that have been brought into correspondence with the second corresponding image 75m to be displayed in the first setting area 71 as the first corresponding images 74a, 74b, 74c, and 74d. In one embodiment, an information providing application for providing information on train timetables, an information providing application for providing information on train delays, a schedule application for storing entered schedules, and an information providing application for providing information on weather have been brought into correspondence with one another in advance as the plurality of applications which the user probably causes the electronic apparatus 1 to execute while commuting to work. In a case where the second corresponding image 75m is selected, the information providing application for providing information on train timetables, the information providing application for providing train delays, the schedule application, and the information providing application for providing information on weather are executed in the electronic apparatus 1. In the first setting area 71, the display controller 31 causes an application execution image 56, which is obtained by execution of information providing application for providing information on train timetables, to be displayed as the first corresponding image 74a, causes an application execution image 57, which is obtained by execution of the information providing application for providing information on train delays, to be displayed as the first corresponding image 74b, causes an application execution image 58 which is obtained by execution of the schedule application, to be displayed as the first corresponding image 74c, and causes an application execution image 59, which is obtained by execution of the information providing application for providing information on weather, to be displayed as the first corresponding image 74d. Then, the switching from the setting mode to the split display mode 36 is done, so that the application execution image 56 is displayed in the split area 44a, the application execution image 57 is displayed in the split area 44b, the application execution image 58 is displayed in the split area 44c, and the application execution image 59 is displayed in the split area 44d as illustrated in FIG. 29.

As described above, with the setting key 80c being selected, the plurality of application execution images obtained by execution of the plurality of applications correlated with one another can be displayed in the plurality of split areas in response to a simple operation. This enhances the usability of the electronic apparatus 1.

The plurality of application execution images obtained by execution of the plurality of applications correlated with one another in an appropriate manner are displayed in the plurality of split areas, so that the user can recognize the different desired application execution images at the same time.

The electronic apparatus 1 may be configured in such a manner that the user can perform operation on the display area 2a to make settings of a plurality of applications correlated with one another.

<<Operations on Sides of Split Areas>>

The following describes the action of the display controller 31 assuming that an operation is performed with the operator 60 on a side of a split area in the split display mode 36. FIG. 30 illustrates processing performed by the display controller 31 in a case where an operation is performed on a side of a split area in the split display mode 36. Three types of processing in FIG. 30 will be described below.

<Transposition of Application Execution Images>

As shown in No. 1 of FIG. 30, in the split display mode 36, application execution images can be transposed in response to a predetermined operation performed on a side of a split area. As to No. 1 of FIG. 30, a side of a split area being the operation target in transposing application execution images is included in the first partition line 45 or the second partition line 46 such that the transposition can be performed in response to an intuitive and simple operation. Specifically, in a case where the operation detector 30 detects a predetermined operation on the first partition line 45 or the second partition line 46, the display controller 31 causes the display 16 to transpose application execution images displayed in two individual split areas that are included in the plurality of split areas and sandwich the operation target point on the first partition line 45 or the second partition line 46.

Figure 31:
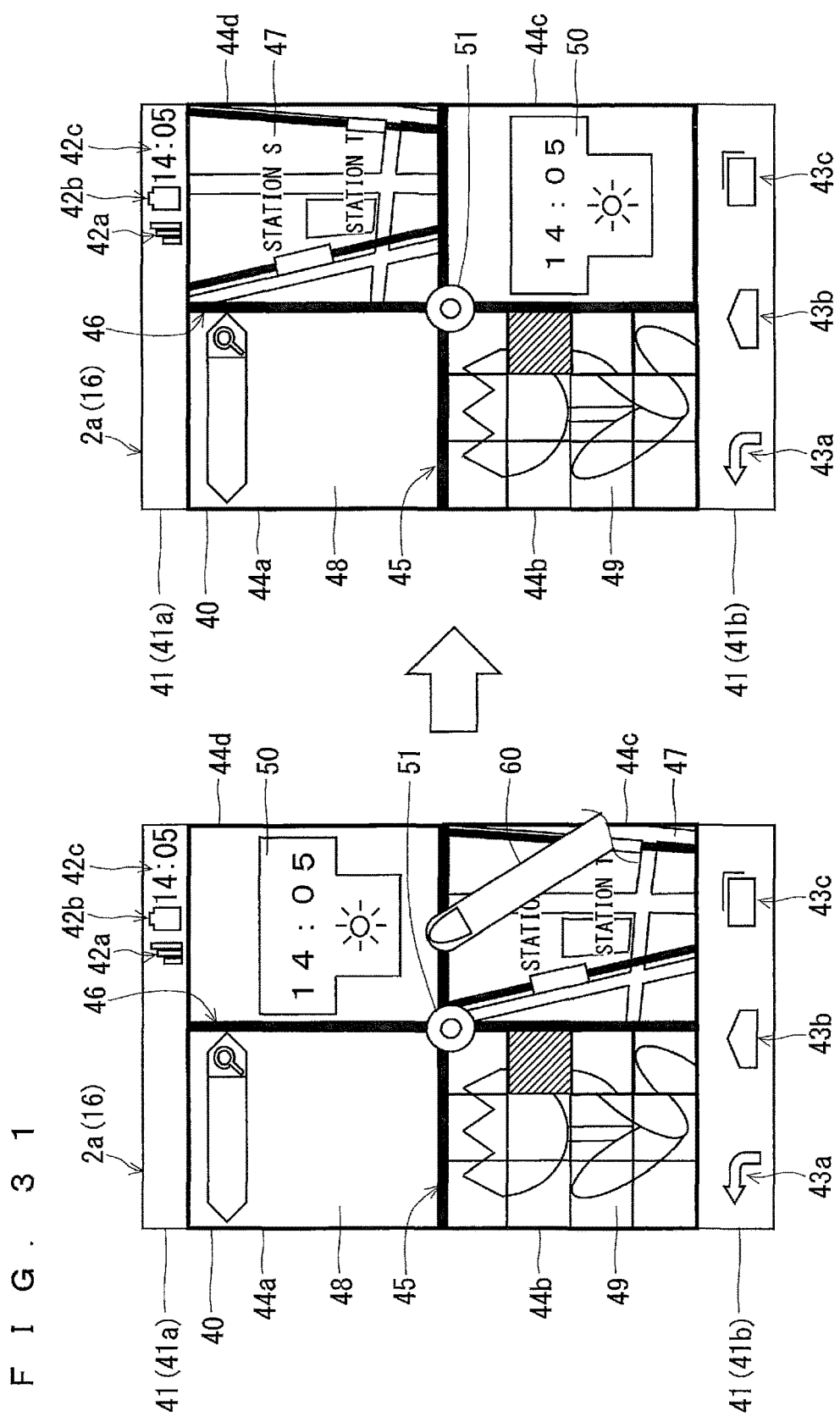
FIG. 31 illustrates exemplary display contents of the electronic apparatus according to one embodiment.

FIG. 31 illustrates exemplary display contents of the display 16. The following description will be given assuming that the predetermined operation on the first partition line 45 or the second partition line 46 is a tap operation on the first partition line 45 or the second partition line 46. Note that the predetermined operation on the first partition line 45 or the second partition line 46 is not limited to the tap operation. For example, the predetermined operation may be a long touch operation on the first partition line 45 or the second partition line 46.

In a case where the operation detector 30 detects a tap operation on a portion of the first partition line 45 corresponding to one side of the split area 44c and one side of the split area 44d as illustrated on the left side of FIG. 31, the display controller 31 causes the display 16 to transpose the application execution images displayed in two areas being the split areas 44c and 44d that sandwich the target point of the tap operation as illustrated on the right side of FIG. 31. That is, the display controller 31 causes the application execution image 50 that has been displayed in the split area 44d to be displayed in the split area 44c, and causes the application execution image 47 that has been displayed in the split area 44c to be displayed in the split area 44d.

As described above, application execution images can be transposed in response to a simple operation on a side of a split area. This enhances the usability of the electronic apparatus 1.

[Setting of Split Area (Lock Screen) that does not Undergo Transposition of Application Execution Images]

As shown in No. 2 of FIG. 30, in the split display mode 36, a split area (a lock screen) that does not undergo transposition of application execution images can be set in response to a predetermined operation on sides of a split area. To be more specific, in a case where the operation detector 30 detects a predetermined operation on two sides of one of the plurality of split areas, the display controller 31 sets the relevant split area as a split area that does not undergo transposition of application execution images.

Figure 32:
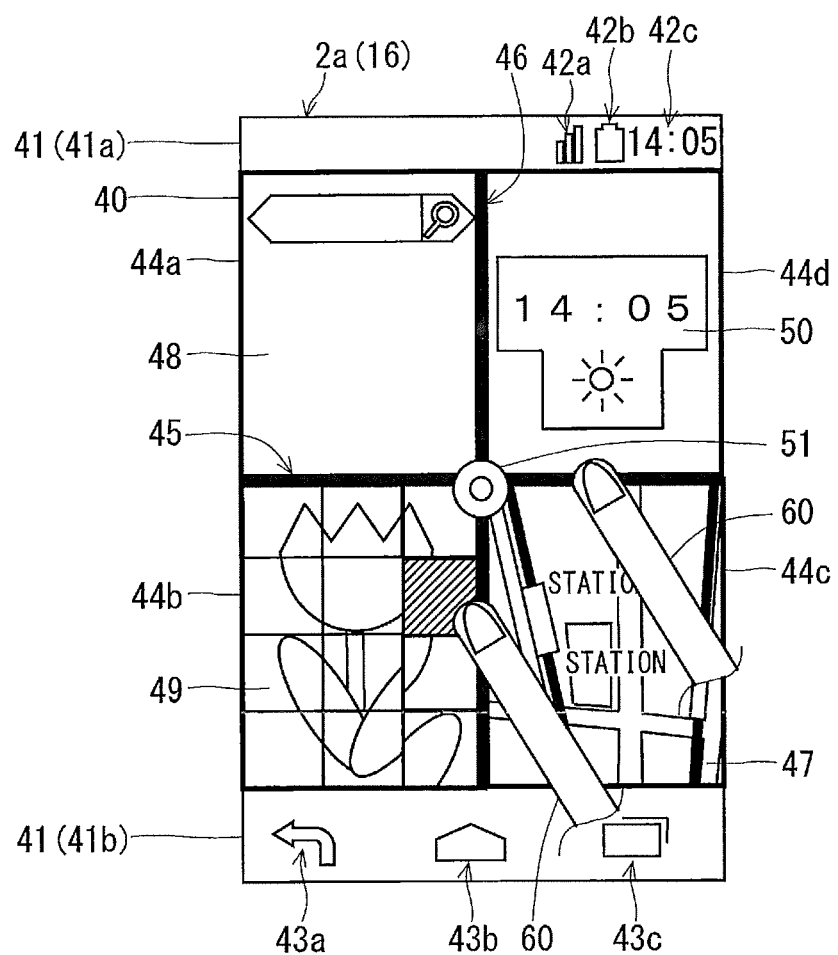
FIG. 32 illustrates exemplary display contents of the electronic apparatus according to one embodiment.

FIG. 32 illustrates exemplary display contents of the display 16. The following description will be given assuming that the predetermined operation on two sides of a split area is a tap operation on the two sides of the split area. Note that the predetermined operation is not limited to the tap operation.

As illustrated in FIG. 32, in a case where the operation detector 30 detects a tap operation on a horizontal side of the split area 44c and a vertical side of the split area 44c, the display controller 31 sets the split area 44c as a lock screen that does not undergo transposition of application execution images. In a case where the user performs a tap operation simultaneously on a horizontal side of the split area 44c and a vertical side of the split area 44c with a forefinger and a middle finger, the display controller 31 sets the split area 44c as the lock screen. This allows for the easy setting of a split area that does not undergo transposition of application execution images, and thus enhances the usability of the electronic apparatus 1.

[Non-Displaying of Application Execution Image]

As shown in No. 3 of FIG. 30, in the split display mode 36, a predetermined operation on a side of a spilt area can cause an application execution image not to be displayed. To be more specific, in a case where the operation detector 30 detects a predetermined operation on two sides of one of the plurality of split areas in which an application execution image is displayed, the display controller 31 causes the display 16 not to display the application execution image displayed in the relevant split area.

FIG. 33 illustrates exemplary display contents of the display 16. The following description will be given assuming that the predetermined operation on two sides of a split area is a flick operation starting from the two sides of the split area. Note that the predetermined operation on two sides of the split area is not limited to the flick operation.

As illustrated on the left side of FIG. 33, in a case where the operation detector 30 detects a flick operation in the lower right direction starting from a horizontal side of the split area 44c (part of the first partition line 45) and a vertical side of the split area 44c (part of the second partition line 46), the display controller 31 causes the display 16 not to display the application execution image 47 displayed in the split area 44c. Thus, an operation on a side of a split area can easily cause an application execution image not to be displayed. This enhances the usability of the electronic apparatus 1.

As illustrated on the right side of FIG. 33, a plurality of application corresponding images corresponding to a plurality of applications may be displayed in the split area 44c, in which the showing of the application execution image 47 has been disabled. In an example illustrated in FIG. 33, displayed in the split area 44c, in which the showing of the application execution image 47 is disabled, are an application corresponding image 78a corresponding to the game application, an application corresponding image 78b corresponding to the map display application, an application corresponding image 78c corresponding to the browser, an application corresponding image 78d corresponding to the camera application, an application corresponding image 78e corresponding to the alarm application, an application correspondence image 78f corresponding to the calculator application, and an application correspondence image 78g corresponding to the email application. The application corresponding images corresponding to the applications symbolically represent the respective applications. In one embodiment, the application corresponding images displayed in the split area in which the showing of the application execution image is disabled are the same as the second corresponding images 75 displayed in the second setting area 72 in the setting mode.

In a case where the operation detector 30 detects an operation for selecting the application corresponding image 78g corresponding to the email application in the state illustrated on the right side of FIG. 33, the email application is executed in the electronic apparatus 1. Then, as illustrated in FIG. 34, the display controller 31 causes the application execution image 53, which is obtained by execution of the email application, to be displayed in the split area 44c.

As described above, the plurality of application corresponding images are displayed in the split area in which the showing of the application execution image is disabled, so that the user can easily set the application execution image which is to be displayed in the relevant split area.

<<Application Execution Image Displayed Immediately Following Switching to Split Display Mode >>

The following describes an application execution image displayed in the first display area 40 immediately following the switching to the split display mode 36. As described above, in a case where the operation detector 30 detects a tap operation on the image 43d (see FIG. 6), the display controller 31 switches to the split display mode 36. The application execution images displayed in the plurality of split areas of the first display area 40 immediately following the switching to the split display mode 36 vary depending on the display contents in the first display area 40 immediately before the switching to the split display mode 36 (or equivalently, the display contents in the first display area 40 in the normal display mode 35).

FIG. 35 illustrates relations between the display contents in the first display area 40 in the normal display mode 35 prior to the switching to the split display mode 36 and the display contents in the first display area 40 immediately following the switching to the split display mode 36. As illustrated in FIG. 35, there are two types of display styles of the first display area 40 immediately following the switching to the split display mode 36. FIGS. 36 and 37 illustrate exemplary display contents of the display 16 in switching from the normal display mode 35 to the split display mode 36. With reference to FIGS. 35 to 37, the following describes the two types of display styles of the first display area 40 immediately following the switching to the split display mode 36.

The first display style (No. 1 of FIG. 35) refers to the case in which an image other than application execution images is displayed in the normal display mode 35. The image other than the application execution images may be, as illustrated on the left side of FIG. 36, a home image 61 displayed immediately following the activation of the electronic apparatus 1 or displayed in response to a tap operation on the image 43b. In a case where the operation detector 30 detects an operation for selecting the image 43d, with no application execution image being displayed in the first display area 40, a plurality of applications selected in reverse chronological order of execution are executed in the electronic apparatus 1, and thus the display controller 31 causes the display 16 to display, in the plurality of split areas, a plurality of application execution images corresponding to the plurality of applications.

In an example illustrated in FIG. 36, the email application, the game application, the calculator application, and the browser are in reverse chronological order of execution, starting with the email application that has been most recently executed. In this case, as illustrated on the right side of FIG. 36, the display controller 31 causes the application execution image 53 obtained by execution of the email application, which has been most recently executed, to be displayed in the split area 44c on the lower right, which is the most convenient area among the plurality of split areas for the user holding and operating the electronic apparatus 1 in and with the right hand. The display controller 31 causes the application execution image 49 obtained by execution of the game application to be displayed in the split area 44b, and causes an application execution image 62 obtained by execution of the calculator application to be displayed in the split area 44d. The display controller 31 causes the application execution image 48 obtained by execution of the browser, which has been least recently executed among the application execution images displayed in the first display area 40, to be displayed in the split area 44a, which is the most inconvenient area among the plurality of split areas for the user to perform operations.

As described above, in switching to the split display mode 36, with no application execution image being displayed, the plurality of application execution images corresponding to the plurality of applications selected in reverse chronological order of execution are displayed in the plurality of split areas. Thus, the user can recognize the application execution images associated with the recently executed applications.

The second display style (No. 2 of FIG. 35) refers to the case in which an application execution image is displayed in the normal display mode 35. To be more specific, in a case where the operation detector 30 detects an operation for selecting the image 43d, with the first application execution image being displayed in the first display area 40, the display controller 31 causes the display 16 to display, in the plurality of split areas, the first application execution image and the second application execution image corresponding to the second application execution image that has been most recently executed. As for the second display style, in addition to the second application that has been most recently executed, a plurality of application execution images selected in reverse chronological order of execution may be displayed in the first display area 40.

In an example illustrated in FIG. 37, the email application, the calculator application, and the calculator application are in reverse chronological order of execution, starting with the email application that has been most recently executed as in an example illustrated in FIG. 36.

As illustrated on the left side of FIG. 37, the map display application is executed in the normal display mode 35, and thus the application execution image 47 (the first application execution image) obtained by execution of the map display application is displayed in the first display area 40. In a case where the operation detector 30 detects, in the above-mentioned state, an operation for selecting the image 43d, the display controller 31 causes the application execution image 47 (the first application execution image), which has been displayed in the first display area 40 immediately before the switching to the split display mode, to be displayed, as illustrated on the right side of FIG. 37, in the split area 44c on the lower right, which is the most convenient area among the plurality of split areas for the user holding and operating the electronic apparatus 1 in and with the right hand. The display controller 31 causes the application execution image 53 (the second application execution image) obtained by execution of the email application, which has been most recently executed, to be displayed in the split area 44b, and causes the application execution image 49 (the second application execution image) obtained by execution of the game application to be displayed in the split area 44d. The display controller 31 causes the application execution image 62 (the second application execution image) obtained by execution of the calculator application, which has been least recently executed among the application execution images displayed in the first display area 40, to be displayed in the split area 44a, which is the most inconvenient area among the plurality of split areas for the user to perform operations.

As described above, in switching to the split display mode 36, with the first application execution image being displayed, the first application execution image and the second application execution image corresponding to the second application program that has been most recently executed are displayed in the plurality of split areas. Thus, the user can simultaneously recognize the application execution image associated with the application under execution and the application execution image associated with the recently executed application.

<<Display Styles of Split Areas in Split Display Mode >>

The following describes various examples of display styles of the split areas in the split display mode.

<Displaying, in a Plurality of Split Areas, Application Execution Images Provided by the Same Application >

In one embodiment described above, the plurality of application execution images provided by the plurality of applications that are different from one another are displayed in the plurality of split areas. Alternatively, a plurality of application execution images provided by the same application may be displayed in the plurality of split areas.

Figure 38:
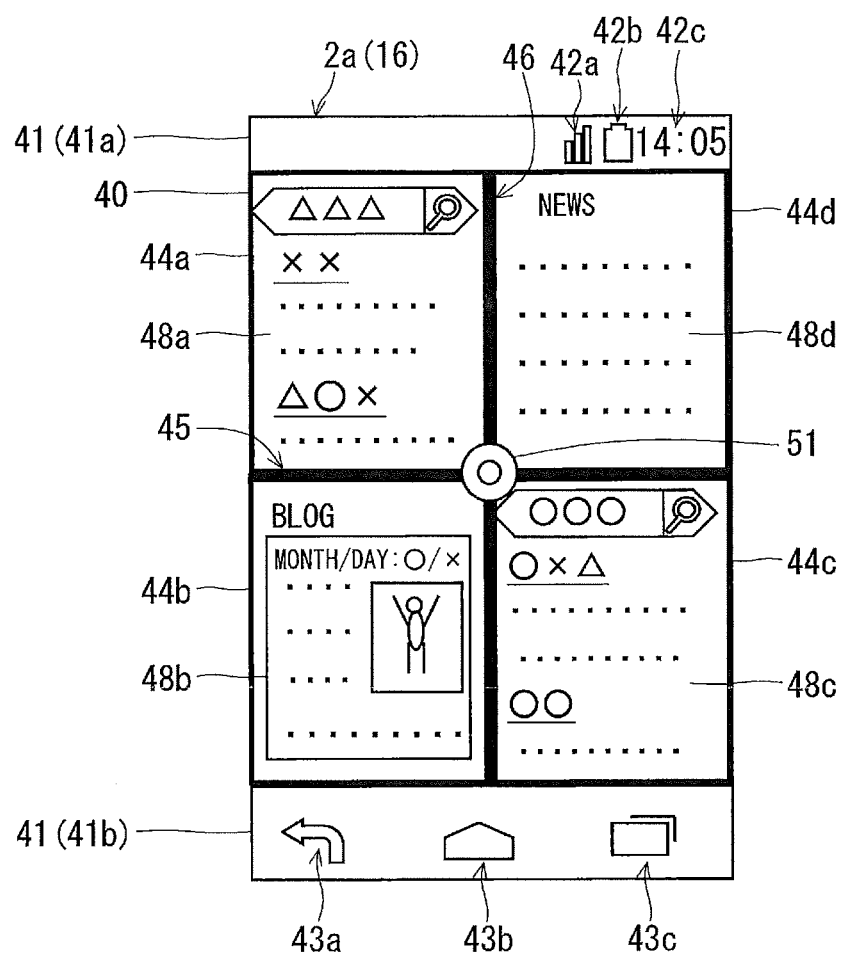
FIG. 38 illustrates exemplary display contents of the electronic apparatus according to one embodiment.

FIG. 38 illustrates exemplary display contents of the display 16 assuming that the application execution images obtained by multiple executions of the browser are simultaneously displayed in the plurality of split areas. As illustrated in FIG. 38, displayed in the split area 44a is an application execution image 48a obtained by execution of the browser. Displayed in the split area 44b is an application execution image 48b obtained by execution of the browser. Displayed in the split area 44c is an application execution image 48c obtained by execution of the browser. Displayed in the split area 44d is an application execution image 48d obtained by execution of the browser. The user can perform operations on the application execution images 48a to 48d, which are displayed in the plurality of spilt areas and correspond to the browser, independently of one another.

Figure 39:
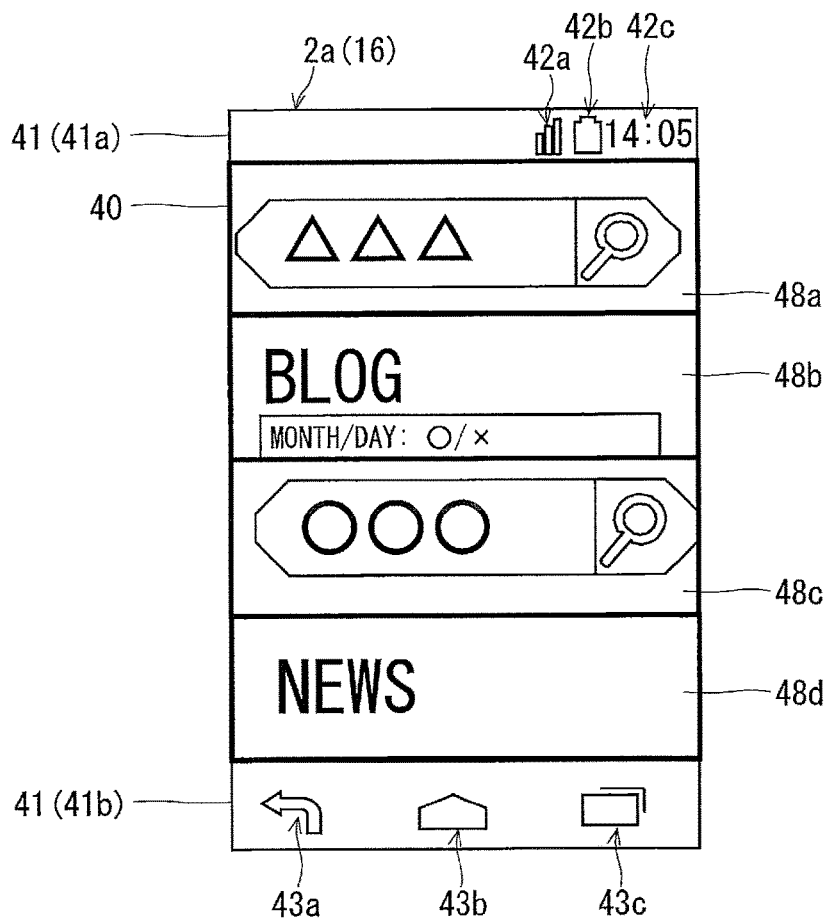
FIG. 39 illustrates exemplary display contents of the electronic apparatus according to one embodiment.

Meanwhile, FIG. 39 illustrates exemplary display contents of the display 16 assuming that the electronic apparatus 1 does not have the split display mode 36 and that the application execution images 48a, 48b, 48c, and 48d obtained by execution of the browser are displayed. As illustrated in FIG. 39, the application execution images 48a, 48b, 48c, and 48d are partially displayed in the first display area 40. For the electronic apparatus 1 that does not have the split display mode 36, in a case where the operation detector 30 detects a selection operation on the application execution image 48a, the display controller 31 causes only the application execution image 48a, which is the target of the selection operation, to be displayed in the first display area 40.

For the electronic apparatus 1 that does not have the split display mode 36, an operation such as a scroll operation on one of the plurality of application execution images needs to be performed in such a manner that the relevant application execution image is selected by the user, that only the relevant application execution image is displayed in the first display area 40, and that an operation such as a scroll operation is subsequently performed on the relevant application execution image.

For the electronic apparatus 1 having the split display mode 36, meanwhile, in a case where the operation detector 30 detects an operation on a split area in the split display mode 36, processing is performed assuming that the operation is performed on the application execution image displayed in the split area in which the relevant operation is detected. Unlike the electronic apparatus that does not have the split display mode 36, the electronic apparatus 1 in one embodiment eliminates the need for performing an operation for selecting an application execution image being the operation target. This enhances the usability of the electronic apparatus 1.

The plurality of application execution images provided by the same application are displayed in the plurality of split areas, so that the user can simultaneously recognize the application execution images associated with one another. This also enhances the usability of the electronic apparatus 1.

<Displaying, in a Plurality of Split Areas, Moving Images Transmitted from Other Electronic Apparatuses>

Figure 40:
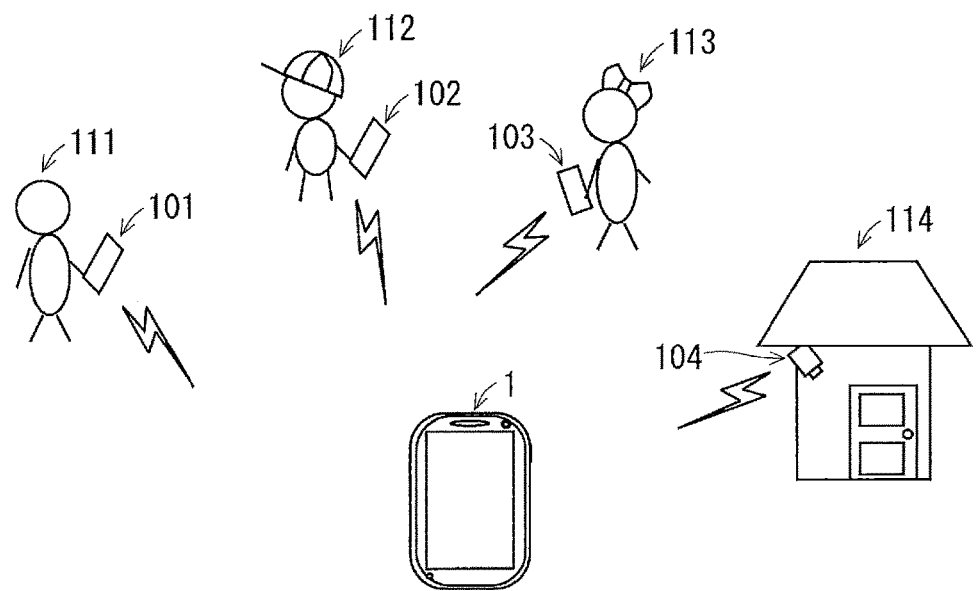
FIG. 40 illustrates a use environment for the electronic apparatus according to one embodiment.

The following describes displaying of moving images transmitted from other electronic apparatuses in the plurality of split areas. FIG. 40 illustrates an example of displaying, in the plurality of split areas, moving images transmitted from other electronic apparatuses. In an example illustrated in FIG. 40, the electronic apparatus 1 conducts communications with a plurality of mobile phones 101, 102, and 103 carried by an eldest son 111, a second son 112, and an eldest daughter 113 of the user. Each of the mobile phones 101, 102, and 103 transmits moving images captured by its own image capture unit to the electronic apparatus 1. The electronic apparatus 1 conducts communications with a security camera 104 installed in a house 114 of the user. The security camera 104 transmits moving images captured by its own image capture unit to the electronic apparatus 1.

The storage 13 of the electronic apparatus 1 stores a first moving image playback application for playing back moving images transmitted from the mobile phone 101, a second moving image playback application for playing back moving images transmitted from the mobile phone 102, and a third moving image playback application for playing back moving images transmitted form the mobile phone 103, and a fourth moving image playback application for playing back moving images transmitted from the security camera 104.

Figure 41:
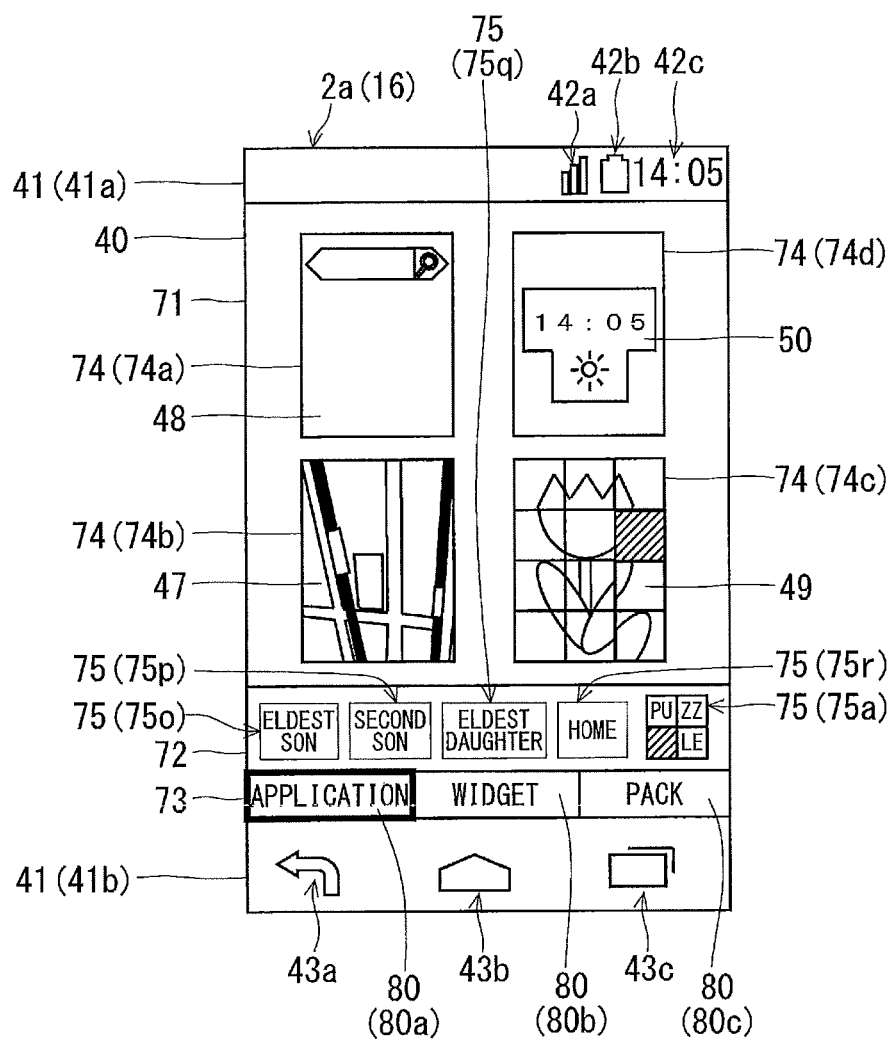
FIG. 41 illustrates exemplary display contents of the electronic apparatus according to one embodiment.

FIG. 41 illustrates exemplary display contents of the display 16 in the setting mode. As illustrated in FIG. 41, displayed in the second setting area 72 are a second corresponding image 75o corresponding to an application execution image obtained by execution of the first moving image playback application, a second corresponding image 75p corresponding to an application execution image obtained by execution of the second moving image playback application, a second corresponding image 75q corresponding to an application execution image obtained by execution of the third moving image playback application, a second corresponding image 75*r* corresponding to an application execution image obtained by execution of the fourth moving image playback application for playing back moving images transmitted from the security camera 104, and the second corresponding image 75*a*. In the setting mode illustrated in FIG. 7, an operation for causing the application execution image corresponding to the second corresponding image 75*r* to be displayed in the split area 44*a*, an operation for causing the application execution image corresponding to the second corresponding image 75*o* to be displayed in the split area 44*b*, an operation for causing the application execution image corresponding to the second corresponding image 75*p* to be displayed in the split area 44*c*, and an operation for causing the application execution image corresponding to the second corresponding image 75*q* to be displayed in the split area 44*d* are performed, and then the switching to the split display mode 36 is done, so that moving images transmitted from the mobile phones 101, 102, and 103 and the security camera 104 are displayed in the plurality of split areas as illustrated in FIG. 42.

Figure 42:
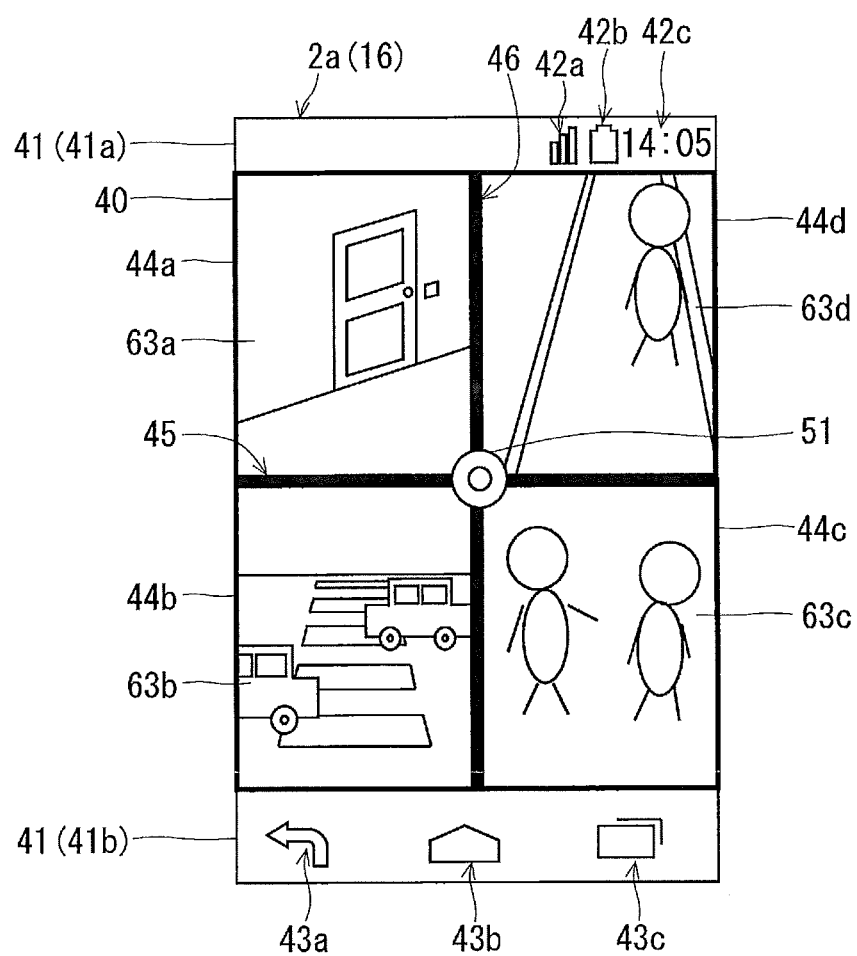
FIG. 42 illustrates exemplary display contents of the electronic apparatus according to one embodiment.

FIG. 42 illustrates exemplary display contents of the display 16 in playing back (displaying) a plurality of moving images transmitted from the mobile phones 101 to 103 and the security camera 104 in the split display mode 36. As illustrated in FIG. 42, a moving image transmitted from the security camera 104 is displayed in the split area 44*a* as an application execution image 63*a*. In the split area 44*b*, a moving image transmitted from the mobile phone 101 is displayed as an application execution image 63*b*. In the split area 44*c*, a moving image transmitted from the mobile phone 102 is displayed as an application execution image 63*c*. In the split area 44*d*, a moving image transmitted from the mobile phone 103 is displayed as an application execution image 63*d*.

<Obscuring Application Execution Image Displayed in Split Area>

Figure 43:
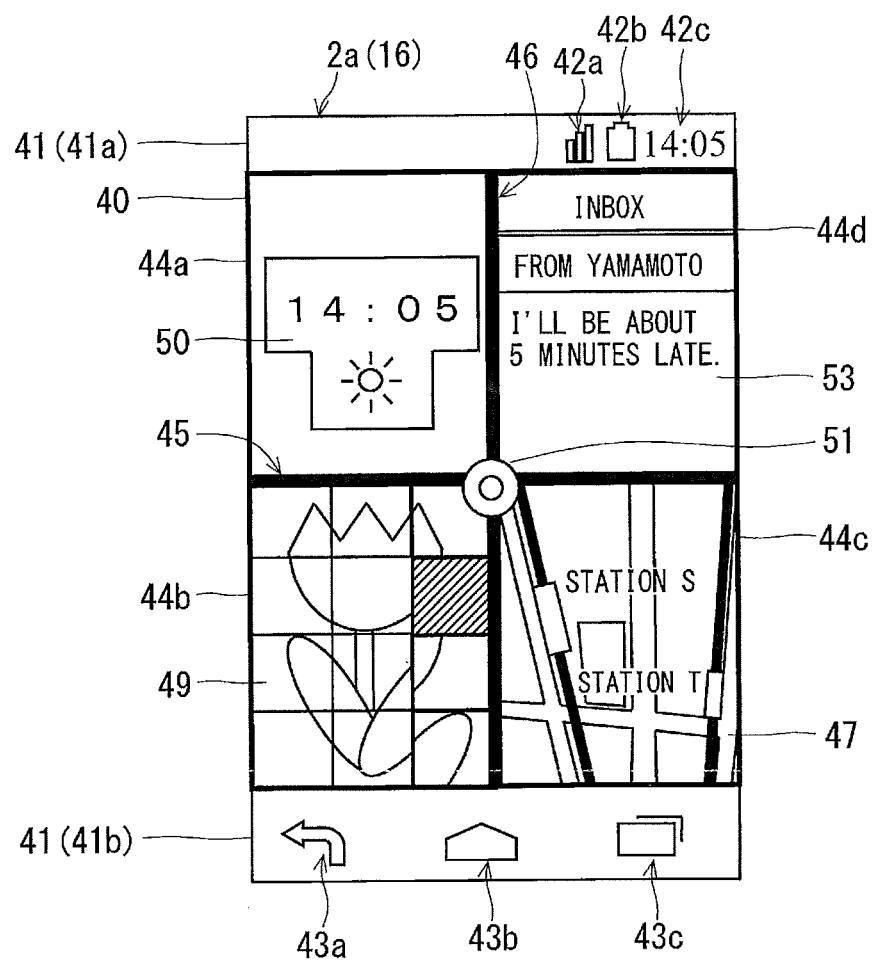
FIG. 43 illustrates exemplary display contents of the electronic apparatus according to one embodiment.

The following describes a display style that obscures information displayed in a split area. FIG. 43 illustrates exemplary display contents of the display 16.

In an example illustrated in FIG. 43, the application execution image 50 obtained by execution of the information providing application is displayed in the split area 44*a*, the application execution image 49 obtained by execution of the game application is displayed in the split area 44*b*, the application execution image 47 obtained by execution of the map display application is displayed in the split area 44*c*, and the application execution image 53 obtained by execution of the email application is displayed in the split area 44*d*.

In some cases, incoming emails or outgoing emails including private messages are displayed in the split area 44*d*, in which the application execution image 53 obtained by execution of the email application is displayed. Thus, it is preferable that the display contents of the split area 44*d* be obscured for the sake of privacy.

In one embodiment, the application execution image 53 displayed in the split area 44*d* is obscured, using the display style illustrated in FIG. 44. FIG. 44 illustrates exemplary display contents of the display 16.

In an example illustrated in FIG. 44, the display controller 31 causes a combined image 53*a*, which is obtained by combining the application execution image 53 with an image having a predetermined pattern or the like, to be displayed in the split area 44*d* in response to a predetermined operation on the display area 2*a*. The predetermined operation may be a long touch operation on the split area 44*d*.

Consequently, the application execution image 53 displayed in the split area 44*d* is obscured. Thus, the information included in the application execution image 53 is less likely to be peeped by and accordingly be revealed to a person who is not the user of the electronic apparatus 1. This enhances the confidentiality of the display contents of the split area 44*d*.

The information displayed in the split area 44*d* may be obscured by narrowing the viewing angle in the split area 44*d*. If the display device 17 is a liquid crystal display, the viewing angle of display provided by the liquid crystal display can be narrowed by changing the alignment state of liquid crystals of the liquid crystal display through the application of a voltage on the liquid crystals. That is, the alignment state of the liquid crystals for providing display in the split area 44*d* of the liquid crystal display (the display device 17) is changed, and the viewing angle in the split area 44*d* is narrowed accordingly, so that the application execution image displayed in the split area 44*d* is obscured.

In a case where the front image capture unit 5*a* capturing images in front of the electronic apparatus 1 captures an image of a person, all of the application execution images displayed in the individual split areas may be obscured.

In a case where the front image capture unit 5*a* capturing images in front of the electronic apparatus 1 captures an image of a person, an application execution image displayed in the relevant split area, in which an application execution image (such as the application execution image obtained by execution of the email application) to be kept confidential is displayed, may be obscured.

Figure 45:
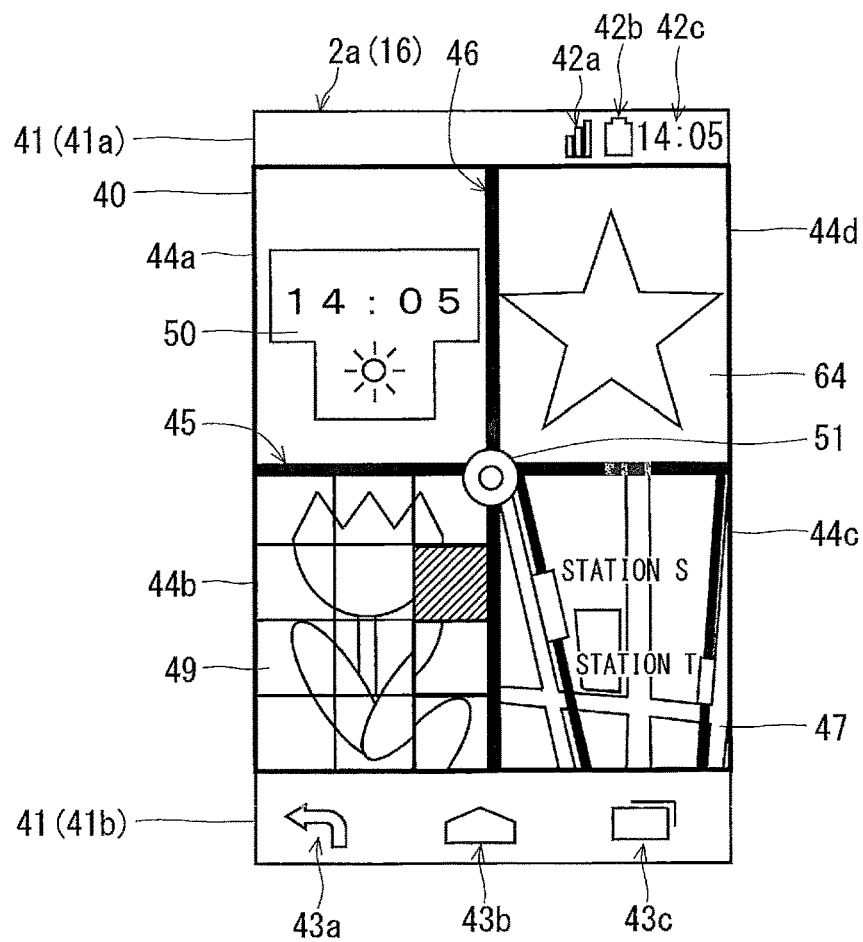
FIG. 45 illustrates exemplary display contents of the electronic apparatus according to one embodiment.

As illustrated in FIG. 45, in response to a predetermined operation on the display area 2*a*, the display controller 31 may cause a masking image 64, which is different from the application execution image 53, to be displayed in the split area 44*d* in place of the application execution image 53. In a case where the operation detector 30 detects an operation on the split area 44*d*, the display controller 31 restores the display contents of the split area 44*d* to its previous state such that the application execution image 53, which is obtained by execution of the email application, is displayed.

As described above, replacing the display contents of the split area with different display contents can enhance the confidentiality of the display contents of the split area 44*d*.

In a case where no operation is performed, for a predetermined period of time or more, on the application execution image displayed in the split area, the display controller 31 may cause the masking image to be displayed in the split area in place of the relevant application execution image.

In a case where the front image capture unit 5*a* capturing images in front of the electronic apparatus 1 captures an image of a person, the entire display contents of the plurality of split areas may be replaced by different display contents.

In a case where the front image capture unit 5*a* capturing images in front of the electronic apparatus 1 captures an image of a person, the display contents of the relevant split area, in which the application execution image to be kept confidential is displayed, may be replaced by different display contents.

<<Second Embodiment>>

In the first embodiment mentioned above, the operation target image 51 is displayed on the intersection point of the first partition line 45 and the second partition line 46 in the first display area 40. In a second embodiment, meanwhile, the operation target image 51 is not displayed on the intersection point of the first partition line 45 and the second partition line 46 in the first display area 40. The following describes the electronic apparatus 1 according to the second embodiment. Note that the processing performed in the electronic apparatus 1 according to the second embodiment in response to operations on the operation target image 51 is the same as the processing in the first embodiment.

<Operation Target Image in Second Embodiment>

Figure 46:
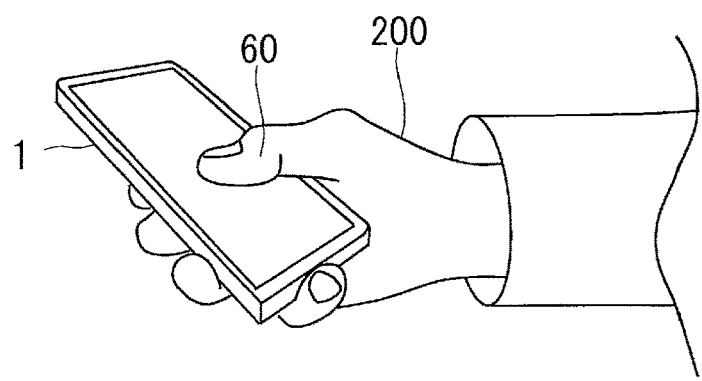
FIG. 46 illustrates a state in which the electronic apparatus is held in and operated with a right hand.

In the second embodiment, the operation target image 51 is displayed in a position convenient for performing operations, with the electronic apparatus 1 being held in and operated with one hand. FIG. 46 illustrates a state in which the electronic apparatus 1 is held in and operated with a right hand 200.

As illustrated in FIG. 46, in a case where the electronic apparatus 1 is held in and operated with the right hand, the thumb is more likely to act as the operator 60, with which operations are performed on the display 16. Thus, the operation target image 51 is designed to be displayed in the position in which operations can be easily performed with the thumb (the operator 60).

As illustrated in FIG. 46, operations are performed, with the thumb (the operator 60), on the display area 2a of the display 16 from the right side of the electronic apparatus 1, and thus the right edge portion of the display area 2a is more likely to be operated with the thumb than the left edge portion is. With the electronic apparatus 1 being held as in FIG. 46, because of the limited range of motion of the thumb, the lower edge portion of the display area 2a is more likely to be operated with the thumb (the operator 60) than the upper edge portion is.

Thus, in one embodiment, the display controller 31 causes the display 16 to display the operation target image 51 in the lower edge portion or the right edge portion of the display area 2a assuming that the electronic apparatus 1 is held in and operated with the right hand.

Figure 47:
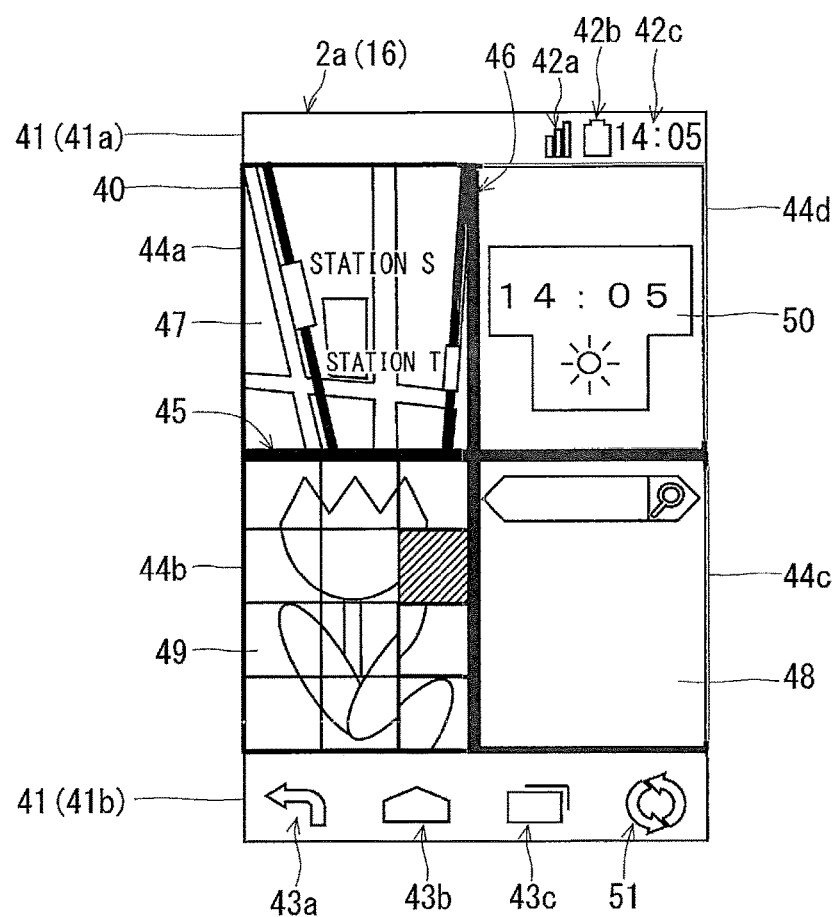
FIG. 47 illustrates exemplary display contents of the electronic apparatus according to one embodiment.
Figure 48:
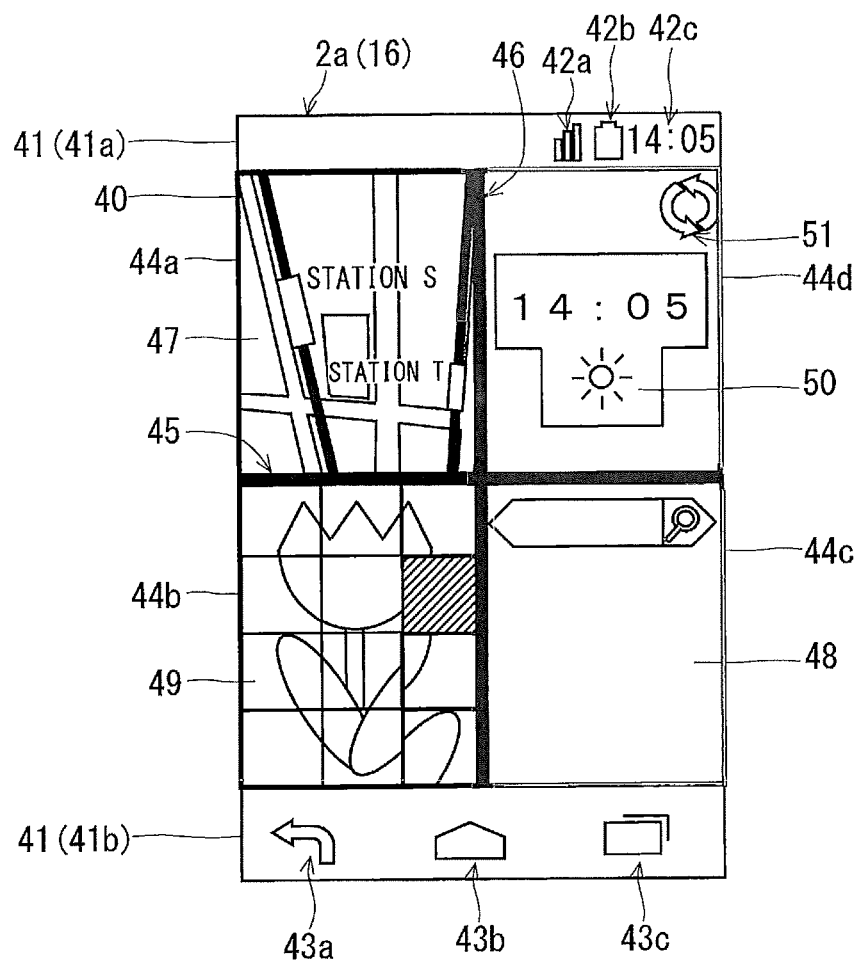
FIG. 48 illustrates exemplary display contents of the electronic apparatus according to one embodiment.

FIGS. 47 and 48 illustrate exemplary display contents of the display 16. In an example illustrated in FIG. 47, the operation target image 51 is displayed in the lower edge portion as well as in the right edge portion of the display area 2a, in other words, is displayed in the lower right corner portion of the display area 2a. In an example illustrated in FIG. 48, the operation target image 51 is displayed in the right edge portion of the display area 2a (specifically, the upper right corner portion of the first display area 2a). As described above, the operation target image 51 is displayed in the lower edge portion or the right edge portion of the display area 2a, and thus the user holding the electronic apparatus 1 can easily perform operations on the operation target image 51 with the right hand. This enhances the usability of the electronic apparatus 1.

The operation target image 51 is displayed in the second display area 41 as in one example illustrated in FIG. 47, so that the displaying of the operation target image 51 is prevented from interfering with the display contents of the first display area 40.

Figure 49:
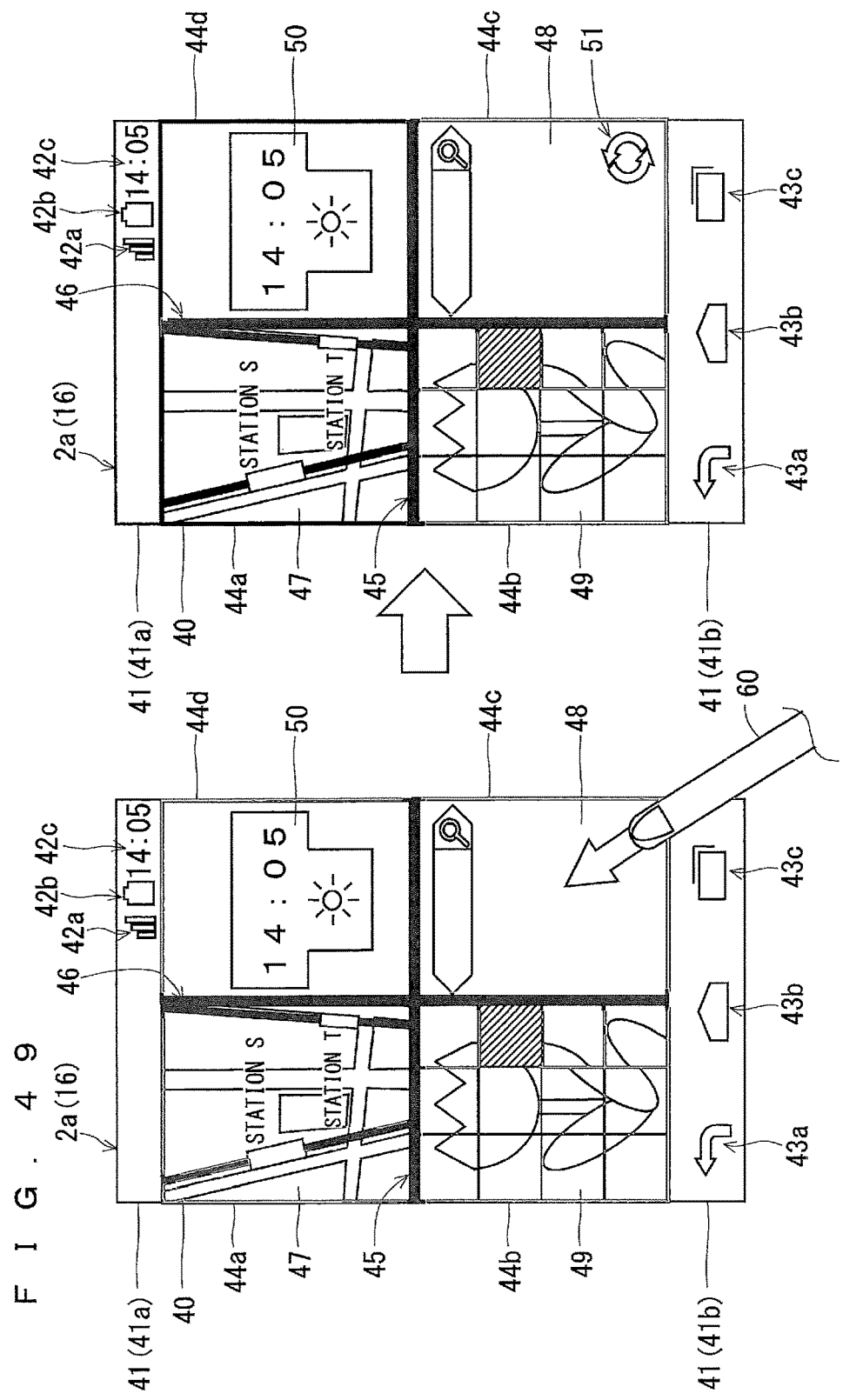
FIG. 49 illustrates exemplary display contents of the electronic apparatus according to one embodiment.

In the split display mode, the operation target image 51 may be continuously displayed or the switching between displaying and non-displaying of the operation target image 51 may be performed in response to a predetermined operation on the display area 2a. FIG. 49 illustrates an example in which the operation target image 51 is displayed in response to the predetermined operation on the display area 2a. In an example illustrated in FIG. 49, the operation target image 51 is displayed in the lower right corner portion of the first display area 40 in response to the predetermined operation on the display area 2a.

The display controller 31 causes the operation target image 51 to be displayed in the lower right corner portion of the first display area 40 in a case where the operation detector 30 detects a slide operation starting from the lower right corner of the first display area 40 and heading toward the inner side of the first display area 40.

The display controller 31 causes the operation target image 51 not to be displayed in a case where the operation detector 30 detects a slide operation starting from the operation target image 51 displayed in the first display area 40 and heading toward the lower right corner of the first display area 40.

As described above, the switching between displaying and non-displaying of the operation target image 51 is performed in response to the predetermined operation on the display area 2a, and thus the user can cause the operation target image 51 to be displayed only when necessary. The operation performed on the display area 2a in switching between displaying and non-displaying of the operation target image 51 is not limited to the above-mentioned operation.

<Resizing of Split Areas in Second Embodiment>

In the first embodiment mentioned above, a drag operation is performed on the operation target image 51 displayed on the intersection point of the first partition line 45 and the second partition line 46 to intuitively change the display positions of the first partition line 45 and the second partition line 46 and to resize the split areas split by the first partition line 45 and the second partition line 46 accordingly. The following describes how to resize the split areas in the second embodiment, in which the operation target image 51 is not displayed on the intersection point of the first partition line 45 and the second partition line 46. The variety of processing described in the first embodiment except for the resizing of the split areas in the split display mode 36 is also applicable to the second embodiment.

In the second embodiment, in a case where the operation detector 30 detects a partition line shifting operation (a drag operation for shifting the partition line) performed on one end of the first partition line 45 or the second partition line 46, the display controller 31 causes the display 16 to shift the display position of the first partition line 45 or the second partition line 46 on which the partition line shifting operation is detected.

Figure 50:
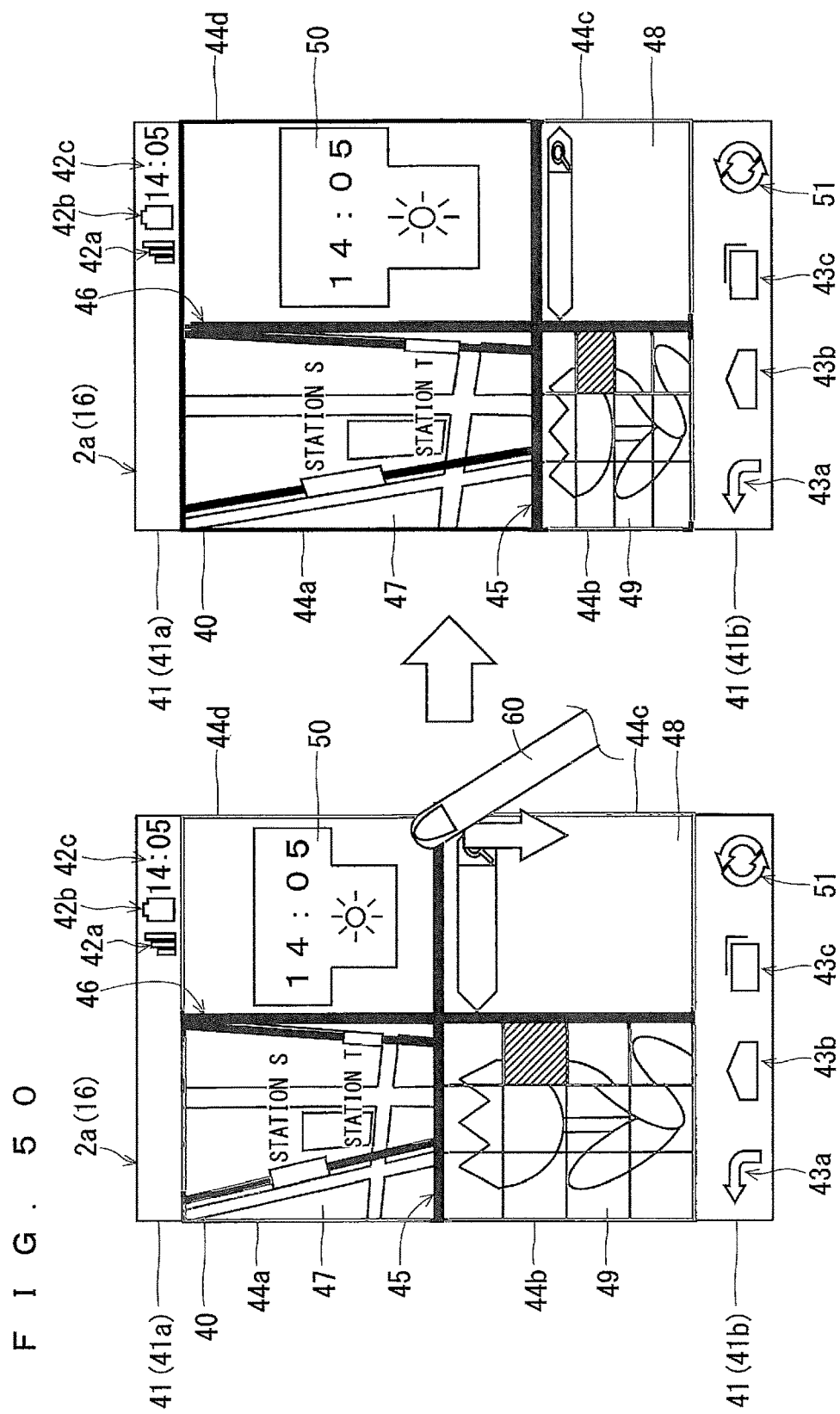
FIG. 50 illustrates exemplary display contents of the electronic apparatus according to one embodiment.

FIG. 50 illustrates exemplary display contents of the display 16. In a case where the operation detector 30 detects a longitudinal drag operation on the right end of the first partition line 45 as illustrated on the left side of FIG. 50, the display controller 31 causes the first partition line 45 to be displayed on the end point of the drag operation as illustrated on the right side of FIG. 50. The second partition line 46 is not shifted at this time. The plurality of split areas are resized due to the change in the display position of the first partition line 45, and the application execution images are displayed in the resized split areas. FIG. 50 illustrates an example in which the application execution images that are scaled up or scaled down in accordance with the aspect ratios of the resized split areas are displayed in the split areas (the concept regarding scale-up and scale-down is as described in an example illustrated in FIG. 9).

In a case where the operation detector 30 detects a transverse drag operation on the lower end of the second partition line 46, the display controller 31 causes the second partition line 46 to be displayed on the end point of the drag operation. The first partition line 45 is not shifted at this time.

As described above, the split areas are resized in accordance with the partition line shifting operations performed on the right end of the first partition line 45 and the lower end of the second partition line 46, and thus the user can easily cause the electronic apparatus 1 to resize the split areas with the right hand.

Figure 51:
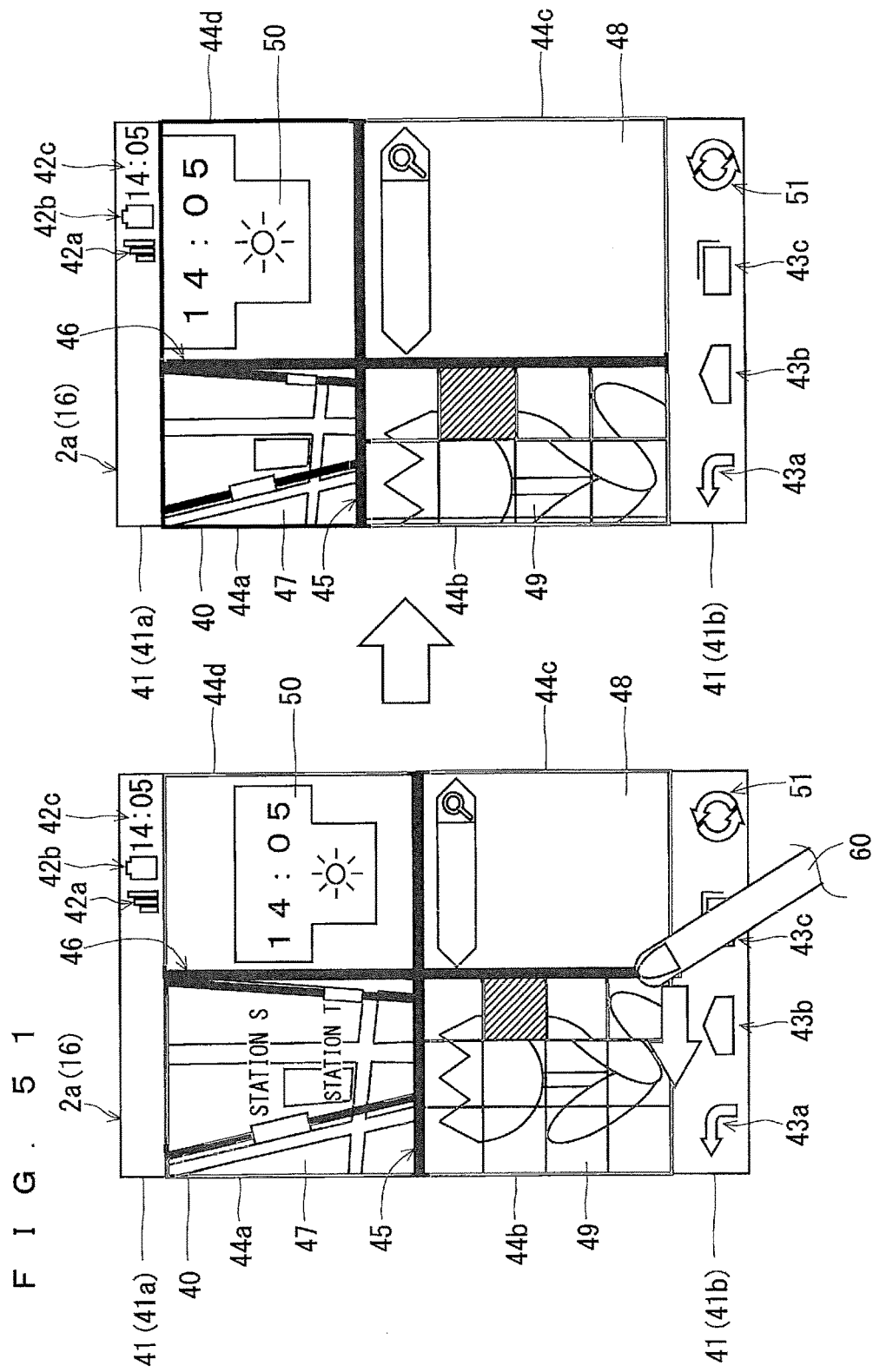
FIG. 51 illustrates exemplary display contents of the electronic apparatus according to one embodiment.
Figure 52:
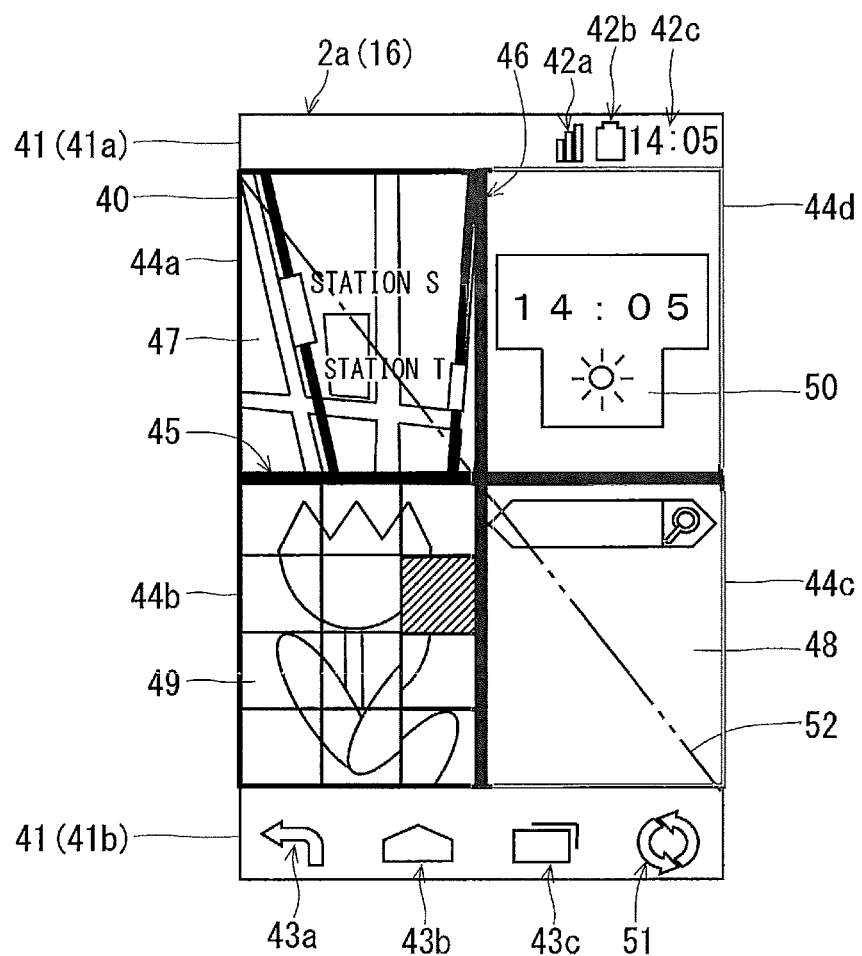
FIG. 52 illustrates exemplary display contents of the electronic apparatus according to one embodiment.

As illustrated in FIG. 51, in a case where a partition line shifting operation is performed on one end of the first partition line 45 or the second partition line 46, the individual split areas may be resized in such a manner that the aspect ratios of the specific split areas remain unchanged. FIGS. 51 and 52 illustrate exemplary display contents of the display 16.

As illustrated on the left side of FIG. 51, in a case where the operation detector 30 detects a transverse drag operation on the lower end of the second partition line 46, the display controller 31 causes the display 16 to shift the display positions of the first partition line 45 and the second partition line 46 in such a manner that the aspect ratio of the split area 44c adjacent to the lower end of the second partition line 46 and the aspect ratio of the split area 44a diagonally opposite to the split area 44c remain unchanged. That is, in an example illustrated in FIG. 51, the display positions of the first partition line 45 and the second partition line 46 are shifted in such a manner that the intersection point of the first partition line 45 and the second partition line 46 is located on the diagonal line 52 in FIG. 52 extending from the upper left corner to the lower right corner of the first display area 2a. At this time, the second partition line 46 is displayed on the end point of the drag operation. As illustrated on the right side of FIG. 51, in resizing the individual split areas, the aspect ratio of the split area 44c, which is convenient for performing operations while the electronic apparatus 1 is held in and is operated with the right hand, is fixed. Thus, the aspect ratios of the specific split areas (the split areas 44a and 44c in examples illustrated in FIGS. 51 and 52) remain unchanged in resizing the individual split areas. This prevents the changes in the aspect ratios of the split areas from causing unsatisfactory displaying of images in the split areas.

The processing of resizing the split areas in response to a partition line shifting operation (a drag operation) on one end of the first partition line 45 or the second partition line 46 is also applicable to the processing in the first embodiment, in which the operation target image 51 is displayed on the intersection point of the first partition line 45 and the second partition line 46. That is, in the electronic apparatus 1 according to the first embodiment as well, the individual split areas may be resized in response to a partition line shifting operation (a drag operation) on one end of the first partition line 45 or the second partition line 46.

<In a Case Where Electronic Apparatus is Held in and Operated with Left Hand>

In the above-mentioned embodiment, the description has been given on the action of the electronic apparatus 1 assuming that the electronic apparatus 1 is held in and operated with the right hand. The following describes the display position of the operation target image 51 and the resizing of the split areas assuming that the electronic apparatus 1 is held in and operated with the left hand.

Contrary to the case where the electronic apparatus 1 is held in and operated with the right hand, operations are performed with the thumb (the operator 60) on the display area 2a of the display 16 from the left side of the electronic apparatus 1 that is held in and operated with the left hand Thus, the display controller 31 may cause the display 16 to display the operation target image 51 on the lower edge portion or the left edge portion of the display area 2a assuming that the electronic apparatus 1 is held in and operated with the left hand.

Figure 53:
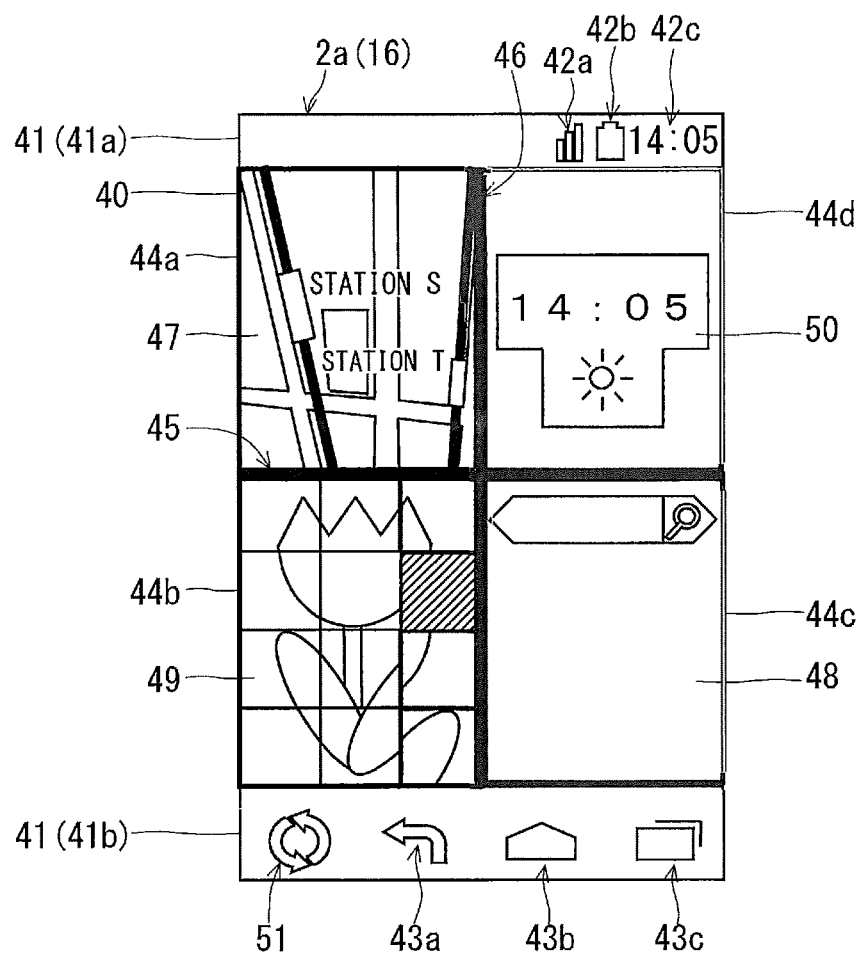
FIG. 53 illustrates exemplary display contents of the electronic apparatus according to one embodiment.
Figure 54:
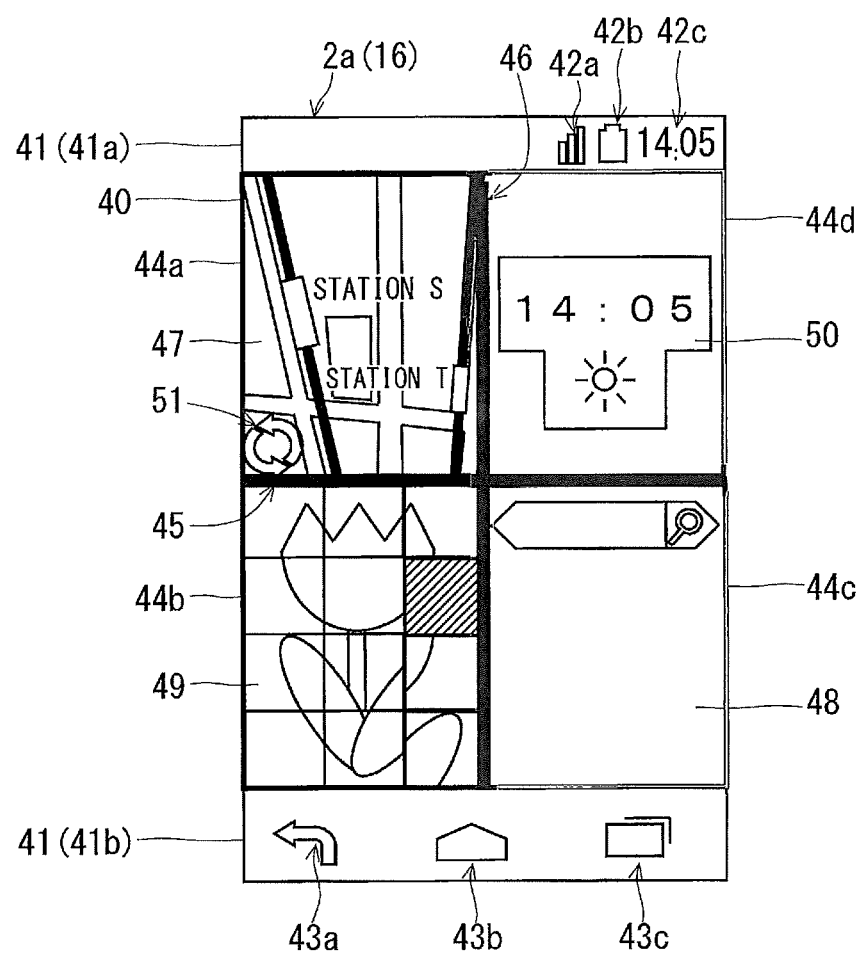
FIG. 54 illustrates exemplary display contents of the electronic apparatus according to one embodiment.

FIGS. 53 to 55 illustrate exemplary display contents of the display 16. In an example illustrated in FIG. 53, the operation target image 51 is displayed in the lower edge portion as well as in the left edge portion of the display area 2a, in other words, is displayed in the lower left corner portion. In an example illustrated in FIG. 54, the operation target image 51 is displayed in the left edge portion of the display area 2a.

Assume that the switching between displaying and non-displaying of the operation target image 51 is performed in response to a predetermined operation by the user. In a case where the operation detector 30 detects a slide operation starting from the lower left corner of the first display area 40 and heading toward the inner side of the first display area 40 as illustrated on the left side of FIG. 55, the operation target image 51 is displayed in the lower left corner portion of the first display area 40 as illustrated on the right side of FIG. 55. In a case where the operation detector 30 detects a slide operation starting from operation target image 51 displayed in the first display area 40 and heading toward the lower left corner of the first display area 40, the display controller 31 causes the operation target image 51 not to be displayed.

As described above, the operation target image 51 is displayed in the lower edge portion or the left edge portion of the display area 2a, and thus the user holding the electronic apparatus 1 in the left hand can easily perform operations on the operation target image 51.

The electronic apparatus 1 may perform the switching between displaying of the operation target image 51 in the right edge portion of the display area 2a and displaying of the operation target image 51 in the left edge portion of the display area 2a in accordance with instructions from the user. The user can instruct the electronic apparatus 1 to display the operation target image 51 in the right edge portion of the display area 2a or to display the operation target image 51 in the left edge portion of the display area 2a by performing an operation on the display area 2a.

The electronic apparatus 1 may determine in which and with which hand, right or left, the electronic apparatus 1 is held and operated, and may decide the display position of the operation target image 51, the right edge portion or the left edge portion, in accordance with the determination result. In this case, the electronic apparatus 1 includes, for example, an acceleration sensor. In the electronic apparatus 1, the controller 10 specifies the inclination of the electronic apparatus 1 in accordance with the output from the acceleration sensor. Then, the controller 10 determines in which and with which hand, right or left, the electronic apparatus 1 is held and operated in accordance with the specified inclination of the electronic apparatus 1.

In a case where the user holds the electronic apparatus 1 in the right hand and performs operations on the display area 2a with the right hand, the electronic apparatus 1 tends to incline in such a manner that its right edge portion points downward and its left edge portion points upward. In a case where the user holds the electronic apparatus 1 in the left hand and performs operations on the display area 2a with the left hand, meanwhile, the electronic apparatus 1 tends to incline in such a manner that its left edge portion points downward and its right edge portion points upward.

In a case where the electronic apparatus 1 inclines in such a manner that its right edge portion points downward and its left edge portion points upward, the controller 10 judges that the electronic apparatus 1 is held in and operated with the right hand, and causes the operation target image 51 to be displayed in the right edge portion of the display area 2a accordingly. In a case where the electronic apparatus 1 inclines in such a manner that its left edge portion points downward and its right edge portion points upward, meanwhile, the controller 10 judges that the electronic apparatus 1 is held in and operated with the left hand, and causes the operation target image 51 to be displayed in the left edge portion of the display area 2a accordingly.

The electronic apparatus 1 may include illuminance sensors on its right side surface and its left side surface, and the controller 10 may determine in which and with which hand, right or left, the electronic apparatus 1 is held and operated in accordance with the illuminance detected by the individual illuminance sensor.

Specifically, in a case where the illuminance detected by the illuminance sensor located on the right side surface of the electronic apparatus 1 is sufficiently smaller than the illuminance detected by the illuminance sensor located on the left side surface of the electronic apparatus 1, the controller 10 judges that the electronic apparatus 1 is held in and operated with the right hand, and causes the operation target image 51 to be displayed in the right edge portion of the display area 2a accordingly. In a case where the illuminance detected by the illuminance sensor located on the left side surface of the electronic apparatus 1 is sufficiently smaller than the illuminance detected by the illuminance sensor located on the right side surface of the electronic apparatus 1, meanwhile, the controller 10 judges that the electronic apparatus 1 is held in and operated with the left hand, and causes the operation target image 51 to be displayed in the left edge portion of the display area 2a accordingly.

In a case where the electronic apparatus 1 is held in and operated with the left hand, the split area on which operations can be performed easily with the thumb (the operator 60) is different from the above-mentioned split area. In a case where the electronic apparatus 1 is held in and operated with the left hand, the split area 44b being the leftmost and lowermost split area among the plurality of split areas is the split area on which operations can be most easily performed with the thumb (the operator 60). Thus, assuming that the electronic apparatus 1 is held in and operated with the left hand, the split areas may be resized in response to a partition line shifting operation performed on the left end of the first partition line 45 or the lower end of the second partition line 46. In this case, as illustrated in FIGS. 56 and 57, the display controller 31 may change the display positions of the first partition line 45 and the second partition line 46 in such a manner that the aspect ratios of the split area 44b and the split area 44d remain unchanged. In a case where a longitudinal drag operation is performed on the left end of the first partition line 45, the display positions of the first partition line 45 and the second partition line 46 are shifted in such a manner that the intersection of the first partition line 45 and the second partition line 46 is located on the diagonal line 52 (FIG. 57) extending from the upper right corner to the lower left corner of the first display area 2a. At this time, the first partition line 45 is displayed on the end point of the drag operation. In a case where a transverse drag operation is performed on the lower end of the second partition line 46, the display positions of the first partition line 45 and the second partition line 46 are shifted in such a manner that the intersection point of the first partition line 45 and the second partition line 46 is located on the diagonal line 52 (FIG. 57) extending from the upper right corner to the lower left corner of the first display area 2a. At this time, the second partition line 46 is displayed on the end point of the drag operation. FIGS. 56 and 57 correspond to FIGS. 51 and 52, respectively.

The electronic apparatus 1 may determine in which and with which hand, right or left, the electronic apparatus 1 is held and operated and may decide, in accordance with the determination result, in which manner the display positions of the first partition line 45 and the second partition line 46 are shifted: the display positions are shifted in such a manner that the intersection of the first partition line 45 and the second partition line 46 is located on the diagonal line 52 (FIG. 52) extending from the upper left corner to the lower right corner of the first display area 2a; or the display positions are shifted in such a manner that the intersection of the first partition line 45 and the second partition line 46 is located on the diagonal line 52 (FIG. 57) extending from the upper right corner to the lower left corner of the first display area 2a.

Specifically, upon determining that the electronic apparatus 1 is held in and operated with the right hand on the basis of the output from the acceleration sensor and the like as mentioned above, the electronic apparatus 1 shifts the display positions of the first partition line 45 and the second partition line 46 in such a manner that the intersection of the first partition line 45 and the second partition line 46 is located on the diagonal line 52 (FIG. 52) extending from the upper left corner to the lower right corner of the first display area 2a. Upon determining that the electronic apparatus 1 is held in and operated with the left hand, meanwhile, the electronic apparatus 1 shifts the display positions of the first partition line 45 and the second partition line 46 in such a manner that the intersection point of the first partition line 45 and the second partition line 46 is located on the diagonal line 52 (FIG. 57) extending from the upper right corner to the lower left corner of the first display area 2a.

The split areas may be resized in response to a partition line shifting operation (a transverse drag operation) on the upper end of the second partition line 46 although such an operation is difficult to perform with the right hand or the left hand.

<<Modifications of Second Embodiment>>

In the second embodiment mentioned above, the plurality of split areas are resized in a case where the operation detector 30 detects a partition line shifting operation on one end of the first partition line 45 or the second partition line 46. In place of or in addition to the resizing in such a manner, the resizing of the plurality of split areas may be performed in a case where the operation detector 30 detects a predetermined operation on the operation target image 51. Specifically, the display controller 31 resizes the plurality of spilt areas by shifting the display positions of the first partition line 45 and the second partition line 46 in such a manner that the position of the intersection of the first partition line 45 and the second partition line 46 is shifted in accordance with a slide operation on the operation target image 51 detected by the operation detector 30.

FIGS. 58 and 59 illustrate exemplary display contents of the display 16. With reference to FIGS. 58 and 59, the operation target image 51 is displayed in a position convenient for the right hand operation, such as the lower right corner portion of the display area 2a, assuming that the electronic apparatus 1 is operated with the right hand. FIGS. 58 and 59 illustrate examples of resizing the plurality of split areas in such a manner that the aspect ratio of the split area 44c being the rightmost and lower most split area among the plurality of split areas and the aspect ratio of the split area 44a remain unchanged.

In a case where the operation detector 30 detects a slide operation in an upward direction (in the vertical direction) on the operation target image 51 as illustrated on the left side of FIG. 58, the display controller 31 shifts the position of the intersection of the first partition line 45 and the second partition line 46 in the upper left direction on the diagonal line 52. Consequently, the split area 44c is expanded and the split area 44a is contracted, with their respective aspect ratios remain unchanged.

Meanwhile, in a case where the operation detector 30 detects a slide pertain in a leftward direction (in the horizontal direction) on the operation target image 51 as illustrated on the left side of FIG. 59, the display controller 31 shifts the position of the intersection of the first partition line 45 and the second partition line 46 in the lower right direction on the diagonal line 52 as illustrated on the right side of FIG. 59. Consequently, the split area 44c is contracted and the split area 44a is expanded, with their respective aspect ratios remain unchanged.

Contrary to the above-mentioned examples, a specified split area may be contracted in a case where the operation detector 30 detects a slide operation in the vertical direction, and the specified split area may be expanded in a case where the operation detector 30 detects a slide operation in the horizontal direction.

With the operation target image 51 being displayed in a position convenient for the left hand operation, such as the lower left corner portion of the display area 2a, the display controller 31 shifts the position of the intersection of the first partition line 45 and the second partition line 46 in the upper right direction on the diagonal line 52 (FIG. 57) extending from the upper right corner to the lower left corner of the display area 2a in a case where the operation detector 30 detects a slide operation in an upward direction (in the vertical direction) on the operation target image 51. Consequently, the split area 44b is expanded and the split area 44d is contracted, with their respective aspect ratios remain unchanged. On the same assumption, the display controller 31 shifts the position of the intersection of the first partition line 45 and the second partition line 46 in the lower left direction on the diagonal line 52 (FIG. 57) extending from the upper right corner to the lower left corner of the display area 2a in a case where the operation detector 30 detects a slide operation in a rightward direction (in the horizontal direction) on the operation target image 51. Consequently, the split area 44b is contracted and the split area 44d is expanded, with their respective aspect ratios remain unchanged.

In an modification, the position of the intersection of the first partition line 45 and the second partition line 46 can be changed, in other words, the plurality of split areas can be resized in response to operations on the operation target image 51 displayed in a position in which operations can be easily performed. This enhances the usability of the electronic apparatus 1.

<<Third Embodiment>>

Figure 60:
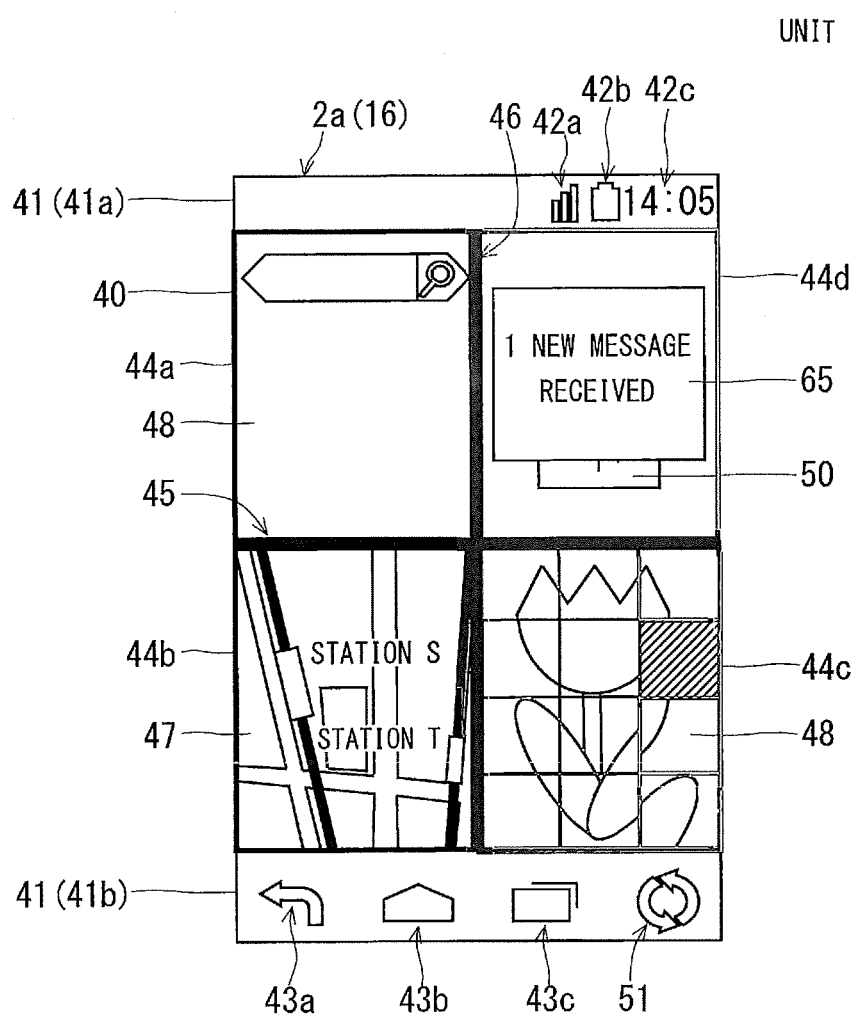
FIG. 60 illustrates exemplary display contents of the electronic apparatus according to one embodiment.

The following describes a display style for the display 16 to display, in the split display mode 36, predetermined information including incoming call information, notification information provided by the alarm application, information indicating the low battery condition in the electronic apparatus 1. In a case where the display 16 displays the predetermined information, the display controller 31 causes the display 16 to display the predetermined information in a split area out of the plurality of split areas other than the lower right split area and the lower left split area. FIGS. 60 and 61 illustrate exemplary display contents of the display 16. The details of the description in the third embodiment are also applicable to the first and second embodiments.

As illustrated in FIG. 60, the display controller 31 causes predetermined information 65 to be displayed in the split area 44d, which is not the split area 44b on the lower left nor the split area 44c on the lower right on which operations can be easily performed with one hand. The predetermined information 65 in FIG. 60 is the information for notifying the user of the receipt of an incoming email through the email application. As described above, the predetermined information 65 is displayed in a split area other than the lower right split area and the lower left split area on which the user can easily perform operations, so that the displaying of the predetermined information 65 is prevented from interfering the display contents of the split area on the lower left and the split area on the lower right on which the user can easily perform operations.

Upon determining that the electronic apparatus 1 is held in and operated with the right hand, the electronic apparatus 1 may cause predetermined information 66 to be displayed, as illustrated in FIG. 61, in the split area 44b, which is not the split area 44c on which operations can be most easily performed. The predetermined information 66 in FIG. 61 is schedule information set by the user and provided at a time of day set by the user through the schedule application. As described above, the display controller 31 may cause the predetermined information 66 to be displayed in a split area other than the split area on which the user can most easily perform operations.

In a case where the user performs a voice communication using earphones, the user does not need to move the receiver hole 4 of the electronic apparatus 1 close to the ear in order to listen to reception sound output from the electronic apparatus 1. In this case, the user can perform a voice communication while performing operations on the display area 2a.

In a case where the user performs a voice communication without using earphones, meanwhile, the user needs to move the receiver hole 4 of the electronic apparatus 1 close to the ear in order to listen to reception sound output from the electronic apparatus 1. In this case, the user cannot perform a voice communication while performing operations on the display area 2a.

With the connection of earphones to the electronic apparatus 1 being determined by the controller 10 that determines whether the earphones are connected to the electronic apparatus 1, in a case where the display controller 31 causes notification information 67 for providing notification of an incoming voice call to be displayed, the display controller 31 causes the notification information 67 to be displayed in a split area other than the split areas on which the user can easily perform operations as mentioned above. Thus, the user can be notified of the incoming voice call while the displaying of the notification information 67 is prevented from interfering with the display contents of the split areas on which the user can easily perform operations. This means that the notification of the incoming voice call can be provided to the user without hindering the user from performing operations.

With the disconnection of the earphones from the electronic apparatus 1 being determined by the controller 10, in a case where the display controller 31 causes the notification information 67 for providing notification of an incoming voice call to be displayed, the display controller 31 releases the split display mode 36 and causes the notification information 67 to be displayed in the first display area 40 as illustrated in FIG. 62. This allows for enlarged displaying of the notification information 67, and thus the user can easily notice the incoming voice call to the electronic apparatus 1.

Connection between the electronic apparatus 1 and earphones may be established by connecting the electronic apparatus 1 with earphones through the earphone terminal 8 mentioned above or by wirelessly connecting the electronic apparatus 1 with earphones capable of performing wireless communication with the electronic apparatus 1.

<<Fourth Embodiment>>

In the above-mentioned embodiments, in a case where the operation detector 30 detects an operation on the operation target image 51, the display controller 31 performs processing correlated with the operation (specifically, transposition of images displayed in the split areas and the like) on the individual split areas. Alternatively, as a type of processing correlated with a predetermined operation on the operation target image 51, the display controller 31 may cause the display 16 to display a list of settings available for the individual split areas.

Specifically, examples of settings displayed on the display 16 include switching to the setting mode, transposition of images displayed in the split areas, setting of a lock screen in a specified split area, and displaying of the first partition line 45 and the second partition line 46 in predetermined positions (in other words, setting for changing the sizes of the plurality of split areas into predetermined sizes).

In a case where the operation detector 30 detects an operation for selecting a setting out of the list of the settings displayed on the display 16, the display controller 31 executes the processing corresponding to the selected setting.

The details described in the fourth embodiment are applicable to each of the first to third embodiments.

<<Other Modifications>>

Although embodiments of the present disclosure have been applied to mobile phones in the above description, embodiments of the present disclosure are also applicable to other electronic apparatuses. For example, embodiments of the present disclosure are also applicable to a tablet terminal, a personal computer (PC), a personal digital assistant (PDA), and a television receiver (TV).

While the electronic apparatus 1 has been described above in detail, the above description is in all aspects illustrative and not restrictive. In addition, various modifications described above are applicable in combination as long as they are not mutually inconsistent. It is understood that numerous modifications which have not been exemplified can be devised without departing from the scope of the present disclosure.

The invention claimed is:

1. An electronic apparatus comprising:
a display that displays at least one image in a display area;
an operation detector that detects at least one operation on the display area; and
a controller that controls the display, wherein
the controller has a setting mode and a split display mode,
wherein in the split display mode the controller splits the display area into a plurality of split areas and controls display contents of each of the plurality of split areas independently of one another, and
in the split display mode, the controller causes the display to display an operation target image with which a setting for each of the plurality of split areas is made,
wherein a first area of the plurality of split areas displays an application execution image, and
wherein in the setting mode, the controller causes the application execution image to be displayed in the first area in response to a dragging operation on an icon corresponding to the application execution image, and
wherein the icon is displayed on the display and the dragging operation drags the icon to the first area from an area outside of the first area, and
wherein the controller further causes an application corresponding to the application execution image to be executed when it is displayed in the first area in the split display mode,
wherein in the split display mode, the controller causes the display to display a first partition line and a second partition line that split the display area, the first partition line extending in one of a horizontal direction and a vertical direction, the second partition line extending in the other one of the horizontal direction and the vertical direction, and
wherein in the split display mode, the controller causes the display to display the operation target image on an intersection point of the first and second partition lines.

2. The electronic apparatus according to claim 1, wherein in the split display mode, the controller causes the display to display the operation target image in a lower edge portion or a side edge portion of the display area.

3. The electronic apparatus according to claim 1, wherein in a case where the operation detector detects a predetermined operation on the display area in the split display mode, the controller causes the display to display the operation target image.

4. The electronic apparatus according to claim 1, wherein in a case where the operation detector detects a shift operation on the operation target image in the split display mode, the controller causes the display to shift the first and second partition lines in such a manner that a destination reached by the operation target image agrees with the intersection point of the first and second partition lines.

5. The electronic apparatus according to claim 1, wherein in a case where the operation detector detects an operation that is performed on the operation target image to shift the operation target image to a corner of the display area in the split display mode, the controller causes the display not to display the operation target image.

6. The electronic apparatus according to claim 1, wherein in a case where the operation detector detects a predetermined operation on the operation target image in the split display mode, the controller causes the display to transpose images displayed in the plurality of split areas.

7. The electronic apparatus according to claim 1, wherein in a case where the operation detector detects a predetermined operation on the first partition line in the split display mode, the controller causes the display to transpose images displayed in two split areas that are included in the plurality of split areas and sandwich an operation target point on the first partition line.

8. The electronic apparatus according to claim l, wherein in a case where the operation detector detects a predetermined operation on two sides of one split area out of the plurality of split areas in the split display mode, the controller sets the one split area as a lock screen that does not undergo transposition of images.

9. The electronic apparatus according to claim 1, wherein in a case where the operation detector detects a predetermined operation on the operation target image in the split display mode, the controller switches to a setting mode in which settings of images displayed in the plurality of split areas are made.

10. The electronic apparatus according to claim 9, wherein in the setting mode, the controller causes the display to display a plurality of corresponding images corresponding to the plurality of split areas, in a case where the operation detector detects a predetermined operation on two corresponding images included in the plurality of corresponding images, the controller causes the display to transpose images displayed in two split areas that are included in the plurality of split areas and correspond to the two corresponding images.

11. The electronic apparatus according to claim 9, wherein in the setting mode, the controller causes the display to display a plurality of first corresponding images corresponding to the plurality of split areas and a plurality of second corresponding images corresponding to a plurality of kinds of candidate images that are displayable in the plurality of split areas, and in a case where the operation detector detects, in the setting mode, a predetermined operation on one first corresponding image included in the plurality of first corresponding images and one second corresponding image included in the plurality of second corresponding images, the controller causes the display to display, in a split area that is included in the plurality of split areas and corresponds to the one first corresponding image, a candidate image that is included in the plurality of kinds of candidate images and corresponds to the one second corresponding image.

12. The electronic apparatus according to claim 1, wherein in the split display mode, the controller causes the display to display, in the plurality of split areas, a plurality of application execution images obtained by execution of a plurality of application programs correlated with one another.

13. The electronic apparatus according to claim 1, wherein in a case where the operation detector detects, in the split display mode, a predetermined operation on two sides of one split area, out of the plurality of split areas, in which an application execution image obtained by execution of an application program is displayed, the controller causes the display not to display the application execution image displayed in the one split area.

14. The electronic apparatus according to claim 1 wherein in a case where the operation detector detects a selection operation on a predetermined image displayed in the display area, the controller switches to the split display mode.

15. The electronic apparatus according to claim 1, wherein in the split display mode, the controller is capable of causing the display to obscure information displayed in at least one of the plurality of split areas.

16. The electronic apparatus according to claim 1, wherein in the split display mode, the controller is capable of causing the display to replace display contents of at least one of the plurality of split areas with different display contents.

17. The electronic apparatus according to claim 1, wherein in a case where the controller causes the display to display predetermined information in the display area in the split display mode, the controller causes the display to display the predetermined information in a split area out of the plurality of split areas other than a lower right split area and a lower left split area.

18. A display method of an electronic apparatus including a display area, the display method comprising:

splitting at least a part of the display area into a plurality of split areas;

controlling display contents of each of the plurality of split areas independently of one another;

displaying, in the display area, an operation target image with which a setting for each of the plurality of split areas is made;

detecting at least one operation on the display area; and displaying an application execution image in a first area of the plurality of split areas, wherein in a setting mode, the application execution image is set to be displayed in the first area in response to a dragging operation on an icon corresponding to the application execution image to the first area from an area outside of the first area, and wherein an application corresponding to the application execution image is executed when it is displayed in the first area in a split display mode, wherein in the split display mode, causing the display to display a first partition line and a second partition line that split the display area, the first partition line extending in one of a horizontal direction and a vertical direction, the second partition line extending in the other one of the horizontal direction and the vertical direction, and wherein in the split display mode, causing the display to display the operation target image on an intersection point of the first and second partition lines.

* * * * *